US012677347B2

(12) United States Patent
Jeon et al.

(10) Patent No.: US 12,677,347 B2
(45) Date of Patent: Jul. 7, 2026

(54) TRIGGER OF BEAM FAILURE RECOVERY FOR PRECONFIGURED RESOURCE IN RADIO RESOURCE CONTROL INACTIVE STATE

(71) Applicant: Ofinno, LLC, Reston, VA (US)

(72) Inventors: Hyoungsuk Jeon, Centreville, VA (US); Esmael Hejazi Dinan, McLean, VA (US); Taehun Kim, Fairfax, VA (US); Kyungmin Park, Vienna, VA (US); Hua Zhou, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 399 days.

(21) Appl. No.: 18/106,057

(22) Filed: Feb. 6, 2023

(65) Prior Publication Data

US 2023/0189387 A1      Jun. 15, 2023

Related U.S. Application Data

(63) Continuation of application No. PCT/US2021/044913, filed on Aug. 6, 2021.

(60) Provisional application No. 63/062,124, filed on Aug. 6, 2020.

(51) Int. Cl.
| | |
|---|---|
| *H04B 7/08* | (2006.01) |
| *H04W 24/10* | (2009.01) |
| *H04W 72/23* | (2023.01) |
| *H04W 76/27* | (2018.01) |

(52) U.S. Cl.
CPC ............. *H04W 76/27* (2018.02); *H04B 7/088* (2013.01); *H04W 24/10* (2013.01); *H04W 72/23* (2023.01)

(58) Field of Classification Search
CPC ...... H04B 7/088; H04B 7/0617; H04B 7/063; H04W 72/23; H04W 76/27; H04W 24/10; H04W 76/30
See application file for complete search history.

(56) References Cited

U.S. PATENT DOCUMENTS

| | | | |
|---|---|---|---|
| 2019/0394082 A1 | 12/2019 | Cirik et al. | |
| 2020/0045674 A1* | 2/2020 | Tseng ..................... | H04W 76/14 |
| 2020/0137821 A1 | 4/2020 | Cirik et al. | |
| 2020/0196349 A1* | 6/2020 | He ...................... | H04W 72/1268 |
| 2021/0153173 A1* | 5/2021 | Baek ...................... | H04W 72/23 |
| 2021/0274525 A1* | 9/2021 | Wei ........................ | H04W 76/27 |
| 2021/0337625 A1* | 10/2021 | Tsai ....................... | H04W 76/27 |
| 2022/0022247 A1* | 1/2022 | Agiwal ............. | H04W 72/0453 |

(Continued)

OTHER PUBLICATIONS

3GPP TS 36.321 V16.0.0 (Mar. 2020); Technical Specification; 3rd Generation Partnership Project; Technical Specification Group Radio Access Network; Evolved Universal Terrestrial Radio Access (E-UTRA); Medium Access Control (MAC) protocol specification; (Release 16).

(Continued)

*Primary Examiner* — Andrew Lee
(74) *Attorney, Agent, or Firm* — Matthew Fernandez; Kavon Nasabzadeh; Jacob L. Mangan

(57) ABSTRACT

A wireless device receives, in a radio resource control (RRC) connected state, an RRC release message indicating a configured grant for use in an RRC inactive state. The wireless device measures, in the RRC inactive state and based on a time duration started in response to a data transmission via the configured grant, a downlink signal for detection of a beam failure instance.

20 Claims, 28 Drawing Sheets

(56) References Cited

U.S. PATENT DOCUMENTS

2022/0210822 A1*  6/2022  Hassan ............... H04W 72/542
2023/0037995 A1*  2/2023  Awad ............... H04W 74/0841

OTHER PUBLICATIONS

3GPP TS 36.423 V16.0.0 (Dec. 2019); Technical Specification; 3rd Generation Partnership Project; Technical Specification Group Radio Access Network; Evolved Universal Terrestrial Radio Access Network (E-UTRAN); X2 application protocol (X2AP); (Release 16).

3GPP TS 38.300 V16.0.0 (Dec. 2009); Technical Specification; 3rd Generation Partnership Project; Technical Specification Group Radio Access Network; NR; NR and NG-RAN Overall Description; Stage 2; (Release 16).

3GPP TS 38.321 V15.8.0 (Dec. 2019); Technical Specification; 3rd Generation Partnership Project; Technical Specification Group Radio Access Network; NR; Medium Access Control (MAC) protocol specification; (Release 15).

3GPP TS 38.331 V16.0.0 (Mar. 2020); Technical Specification; 3rd Generation Partnership Project; Technical Specification Group Radio Access Network; NR; Radio Resource Control (RRC) protocol specification; (Release 16).

3GPP TS 38.423 V16.1.0 (Mar. 2020); Technical Specification; 3rd Generation Partnership Project; Technical Specification Group Radio Access Network; NG-RAN; Xn application protocol (XnAP); (Release 16).

DraftR2-2005737; 3GPP TSG-RAN WG2 Meeting #110 electronic; Online, Jun. 1-Jun. 12, 2020; Agenda Item: 8.7; Source: Session Chair (Huawei); Title: [draft] Report NB-IoT breakout session; Document for: Approval.

R2-2004632; 3GPP TSG-RAN WG2 Meeting #110-e; Electronic meeting, Jun. 1-12, 2020; Agenda Item: 7.2.3; Source: Ericsson; Title: [E906, E907] Remaining open issues in PUR; Document for: Discussion, Decision.

R2-2004633; 3GPP TSG-RAN WG2 #110-e; Online, Jun. 1-12, 2020; Title: Draft LS reply on PUR transmission for NB-IoT/eMTC; Response to: R2-2004345/R1-2002944 and R2-2004342/R1-2002846; Release: Release 16; Work Item: NB_IOTenh3-Core, LTE_eMTC5-Core.

R2-2004817; 3GPP TSG-RAN WG2 Meeting #110 electronic; Online, Jun. 11-Jun. 12, 2020; Agenda Item: 7.2.3; Source: ITL; Title: Remaining issue on NB-IoT Preconfigured resources; Document for: Discussion and decision.

R2-2005019; 3GPP TSG-RAN WG2 Meeting #110-e; Online, Jun. 1-12, 2020; Agenda Item: 7.2.3; Source: Huawei, HiSilicon; Title: Discussion on start offset and requested TBS for PUR; Document for: Discussion and Decision.

R2-2005020; 3GPP TSG-RAN WG2 Meeting #110-e; Online, Jun. 1-12, 2020; Agenda Item: 7.2.3; Source: Huawei, HiSilicon; Title: RRC-MAC interactions for PUR; Document for: Discussion and Decision.

R2-2005021; 3GPP TSG-RAN WG2 Meeting #110-e; Online, Jun. 1-12, 2020; Agenda Item: 7.2.3; Source: Huawei, HiSilicon; Title: Discussion on RAN1 LSs for PUR; Document for: Discussion and Decision.

R2-2005022; 3GPP TSG-RAN WG2 Meeting #110-e; Online, Jun. 1-12, 2020; Title: [Draft] Reply LS on PUR working assumption for NB-IoT and eMTC; Response to: R2-2004345/R1-2002944; Release: Release 16; Work Item: NB_IOTenh3-Core, LTE_eMTC5-Core.

R2-2005023; 3GPP TSG-RAN WG2 Meeting #110-e; Online, Jun. 1-12, 2020; Title: [Draft] Reply LS on open PUR issues for NB-IoT/eMTC; Response to: R2-2004342/R1-2002846; Release: Release 16; Work Item: NB_IOTenh3-Core, LTE_eMTC5-Core.

R2-2005035; 3GPP TSG-RAN WG2 Meeting#110 e-Meeting; Jun. 1-12, 2020; Source: ZTE Corporation, Sanechips; Title: Remaining FFSs for PUR; Agenda item: 7.2.3; Document for: Discussion and Decision.

R2-2005206; 3GPP TSG-RAN2 Meeting #110-e; Online, Jun. 1-12, 2020; Agenda Item: 7.2.3; Source: Qualcomm Incorporated; Title: [H810] [H840] [H854] PUR start time offset; Document for: Discussion/Decision.

R2-2005569; 3GPP TSG-RAN WG2 Meeting #110 electronic; Online, Jun. 1-Jun. 12, 2020; Agenda Item: 7.2.3; Source: ASUSTek; Title: Remaining issue of D-PUR TA timer in RRC; Document for: Discussion and Decision.

R2-2005570; Revision of R2-2003653; 3GPP TSG-RAN WG2 Meeting #110 electronic; Online, Jun. 1-Jun. 12, 2020; Agenda Item: 7.2.3; Source: ASUSTek; Title: PUR configuration maintenance during RRC state transition; Document for: Discussion and Decision.

R2-2005571; 3GPP TSG-RAN WG2 Meeting #110e; Electronic Jun. 1-12, 2020; Agenda Item: 7.2.3; Source: ASUSTek; Title: HARQ feedback in RRC_IDLE; Document for: Discussion and Decision.

R2-20057236; 3GPP TSG-RAN WG2 Meeting #110; Online, Jun. 1-12, 2020; Agenda: 7.2.3; Source: Ericsson (Summary rapporteur); Title: Summary for 7.2.3 Preconfigured uplink resources; Document for: Discussion, Decision.

R2-2005936; 3GPP TSG-RAN WG2 Meeting #110; Online, Jun. 1-12, 2020; Agenda: 7.2.3; Source: Ericsson (Summary rapporteur); Title: [ATT110-e][313] PUR open issues; Document for: Discussion, Decision.

R2-2005937; 3GPP TSG-RAN WG2 #110-e; Online, Jun. 1-12, 2020; Title: Draft LS reply on PUR transmission for NB-IoT/eMTC; Response to: R2-2004345/R1-2002944 and R2-2004342/R1-2002846; Release: Release 16; Work tem: NB_IOTenh3-Core, LTE_eMTC5-Core.

R2-2005940; 3GPP TSG-RAN WG2 Meeting #110; Online, Jun. 1-12, 2020; Agenda: 7.2.3; Source: Ericsson (Summary rapporteur); Title: [ATT110-e][313] PUR open issues—Phase 2; Document for: Discussion, Decision.

R2-2005945; 3GPP TSG-RAN WG2 Meeting #110; Online, Jun. 1-12, 2020; Agenda: 7.2.3; Source: Ericsson (Summary rapporteur); Title: [ATT110-e][313] PUR open issues—Phase 3; Document for: Discussion, Decision.

R2-2005946; 3GPP TSG-RAN WG2 #110-e; Online, Jun. 1-12, 2020; Title: LS reply on PUR transmission for NB-IoT/eMTC; Response to: R2-2004345/R1-2002944 and R2-2004342/R1-2002846; Release: Release 16; Work Item: NB_IOTenh3-Core, LTE_eMTC5-Core.

3GPP TS 36.331 V16.0.0 (Mar. 2020); Technical Specification; 3rd Generation Partnership Project; Technical Specification Group Radio Access Network; Evolved Universal Terrestrial Radio Access (E-UTRA); Radio Resource Control (RRC); Protocol specification; (Release 16).

R2-2003257; 3GPP TSG-RAN2 Meeting #109-e-Bis; Online, Apr. 20, 2020-Apr. 30, 2020; CR-Form-v12.0; Change Request; 36.321 CR; rev -; Current version: 16.0.0.

R2-2003258; 3GPP TSG-RAN2 Meeting #109-e-Bis; Online, Apr. 20, 2020-Apr. 30, 2020; CR-Form-v12.0; Change Request; 36.321 CR; rev -; Current version: 16.0.0.

R2-2003267; 3GPP TSG-RAN2 Meeting #109-e-Bis; Online, Apr. 20, 2020-Apr. 30, 2020; CR-Form-v12.0; Change Request; 36.321 CR; rev -; Current version: 16.0.0.

R2-2003278; 3GPP TSG-RAN2 Meeting #109-e-Bis; Online, Apr. 20, 2020-Apr. 30, 2020; CR-Form-v12.0; Change Request; 36.331 CR; rev -; Current version: 16.0.0.

International Search Report and Written Opinion of the International Searching Authority mailed Nov. 25, 2021, in International Application No. PCT/US2021/044913.

* cited by examiner

Downlink

Uplink

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

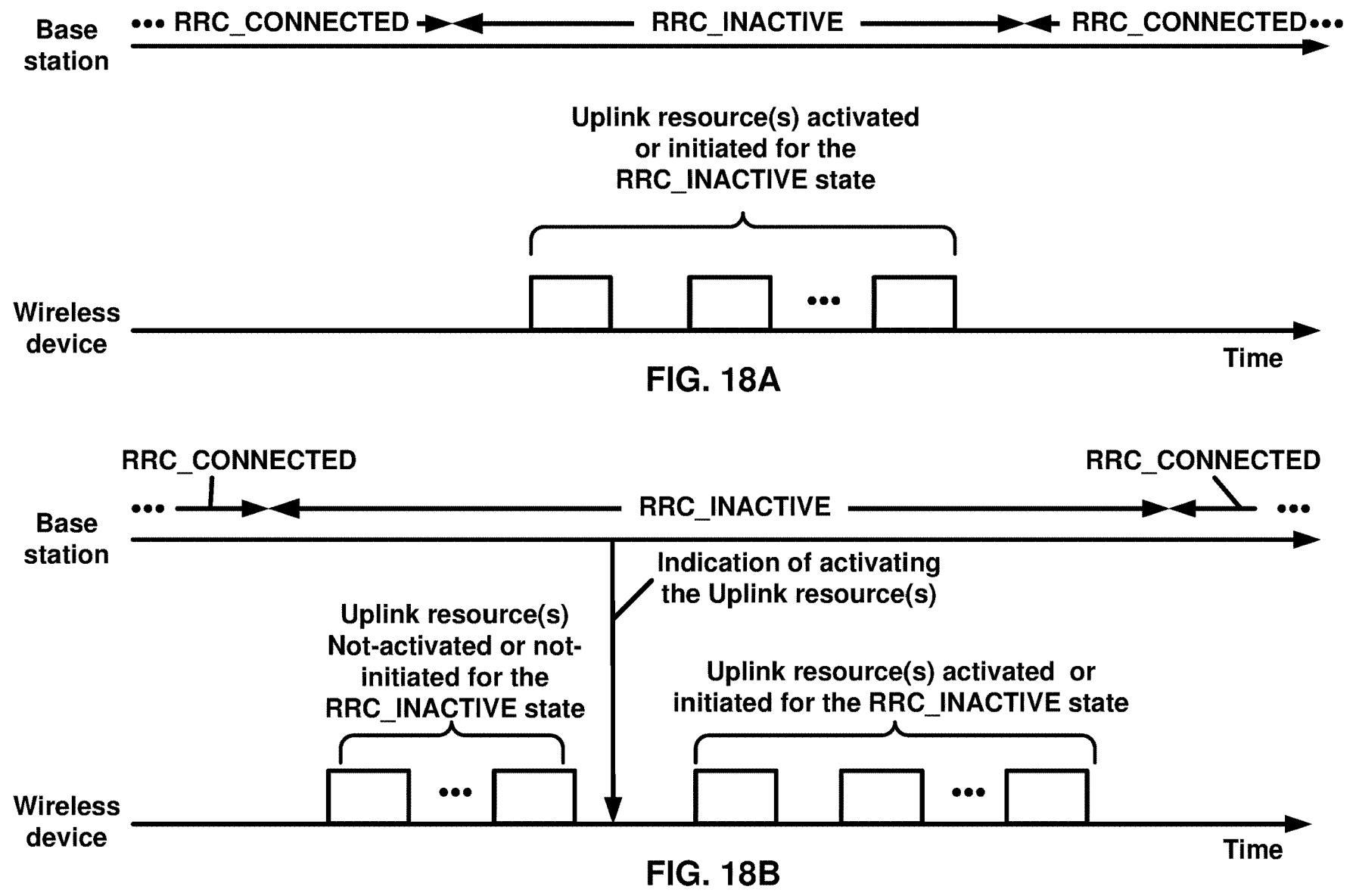

Base station

••• RRC_CONNECTED ← RRC_INACTIVE → RRC_CONNECTED •••

Time

Uplink resource(s) activated or initiated for the RRC_INACTIVE state

Wireless device

FIG. 18A

Base station

RRC_CONNECTED ← RRC_INACTIVE → RRC_CONNECTED •••

Indication of activating the Uplink resource(s)

Time

Uplink resource(s) activated or initiated for the RRC_INACTIVE state

Uplink resource(s) Not-activated or not-initiated for the RRC_INACTIVE state

Wireless device

FIG. 18B

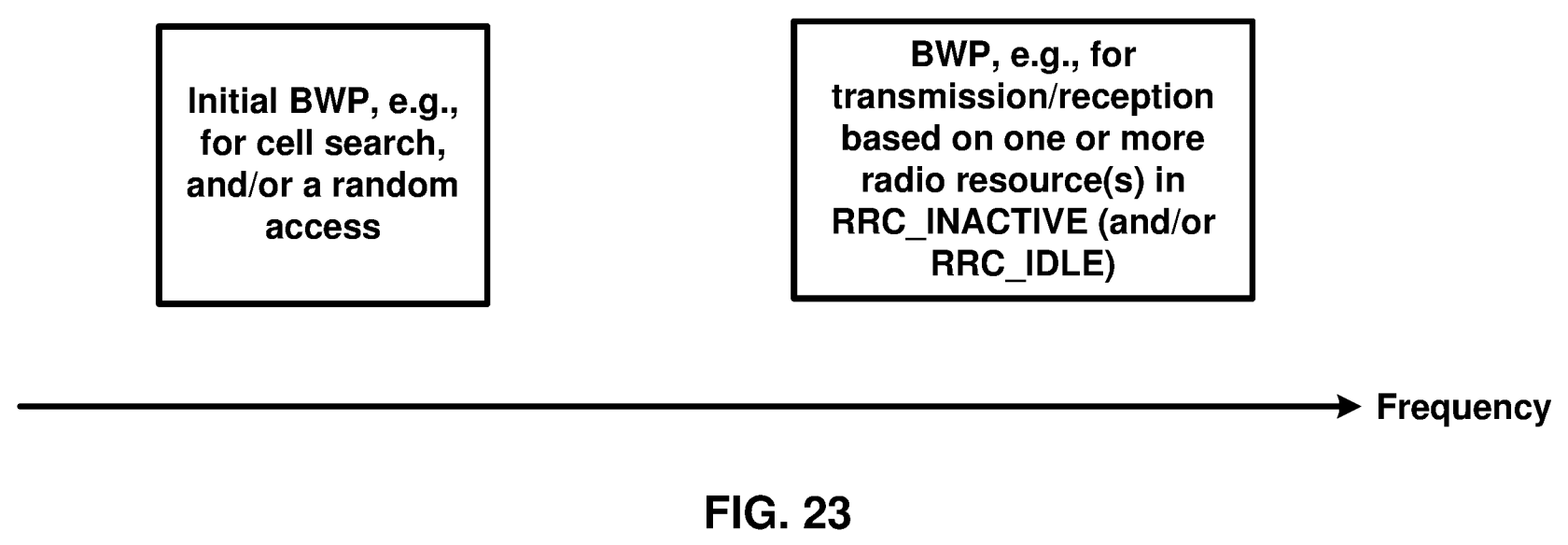

BWP, e.g., for transmission/reception based on one or more radio resource(s) in RRC_INACTIVE (and/or RRC_IDLE)

Initial BWP, e.g., for cell search, and/or a random access

Frequency

FIG. 23

TRIGGER OF BEAM FAILURE RECOVERY FOR PRECONFIGURED RESOURCE IN RADIO RESOURCE CONTROL INACTIVE STATE

CROSS-REFERENCE TO RELATED APPLICATIONS

This application is a continuation of International Application No. PCT/US2021/044913, filed Aug. 6, 2021, which claims the benefit of U.S. Provisional Application No. 63/062,124, filed Aug. 6, 2020, which are hereby incorporated by reference in their entireties.

BRIEF DESCRIPTION OF THE DRAWINGS

Examples of several of the various embodiments of the present disclosure are described herein with reference to the drawings.

FIG. 7 illustrates an example configuration of an NR frame into which OFDM symbols are grouped.

FIG. 18A illustrates an example of (pre-)configured grant(s) indicating one or more uplink radio resources in a Non-RRC_CONNECTED (e.g., RRC_INACTIVE state and/or an RRC_IDLE state), according to some embodiments.

FIG. 18B illustrates an example of (pre-)configured grant(s) indicating one or more uplink radio resources in a Non-RRC_CONNECTED (e.g., RRC_INACTIVE state and/or an RRC_IDLE state), according to some embodiments.

FIG. 23 illustrates an example of one or more radio resource(s) in a BWP (e.g., DL BWP and/or UL BWP), according to some embodiments.

DETAILED DESCRIPTION

Figures 1A, 1B:
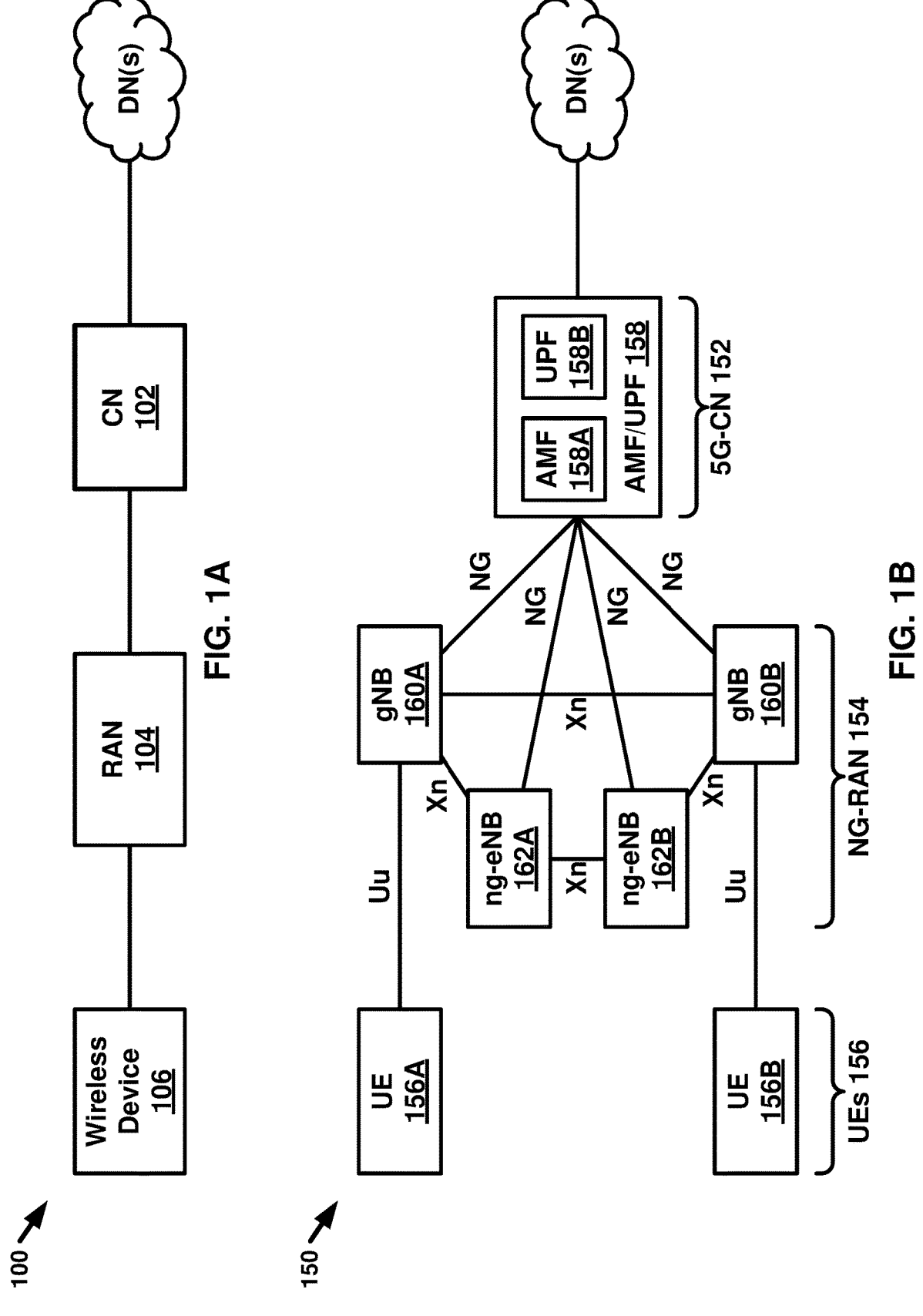
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings.

Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS).

Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
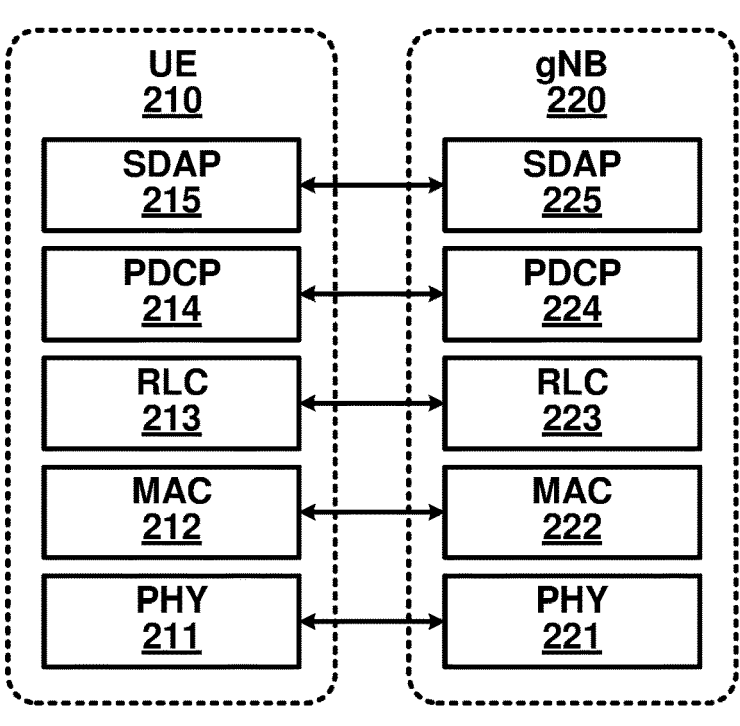
FIG. 2A and FIG. 2B respectively illustrate a New Radio (NR) user plane and control plane protocol stack.
Figure 2B:
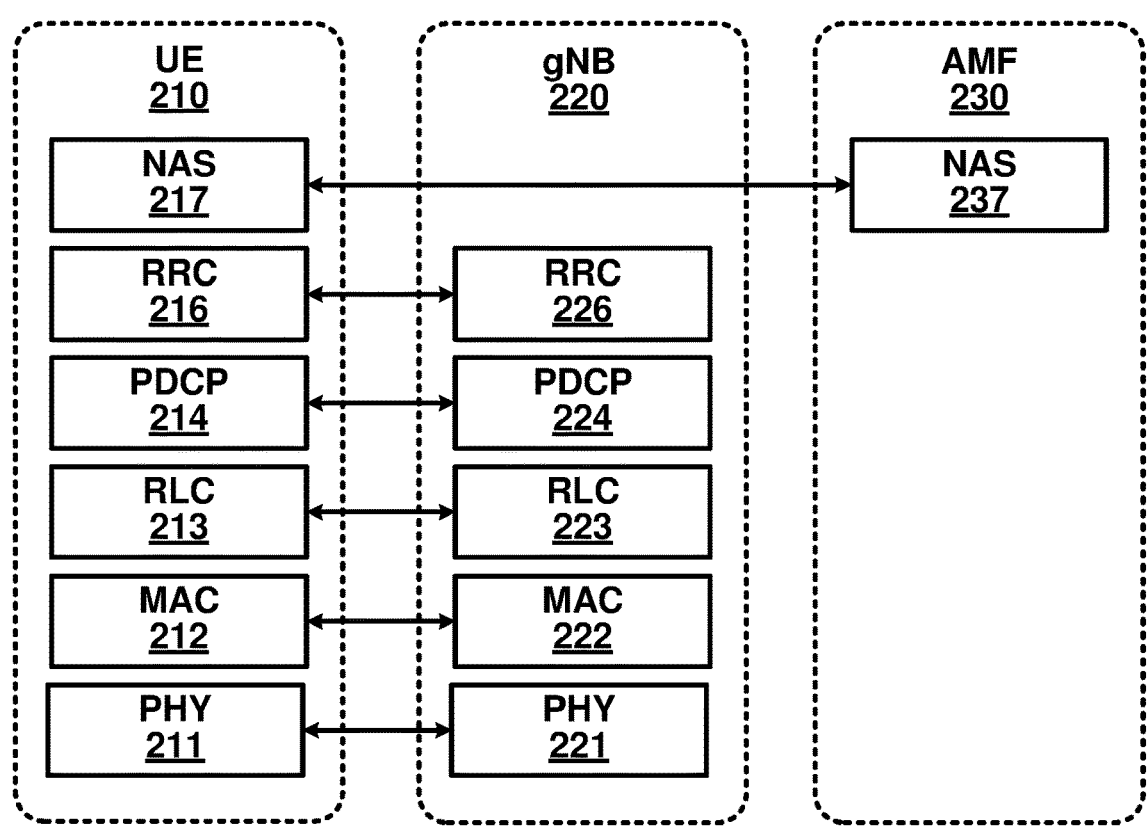

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
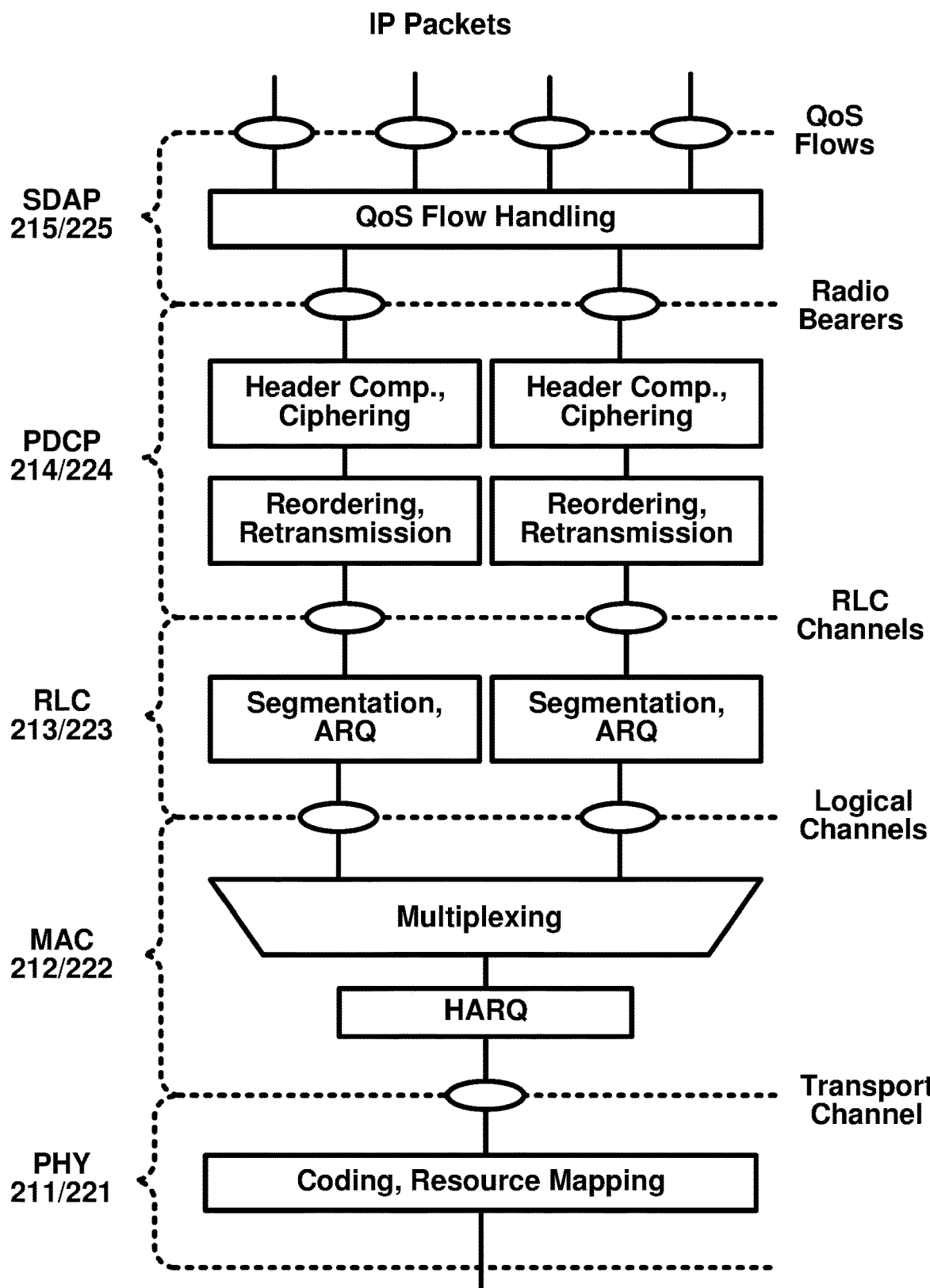
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
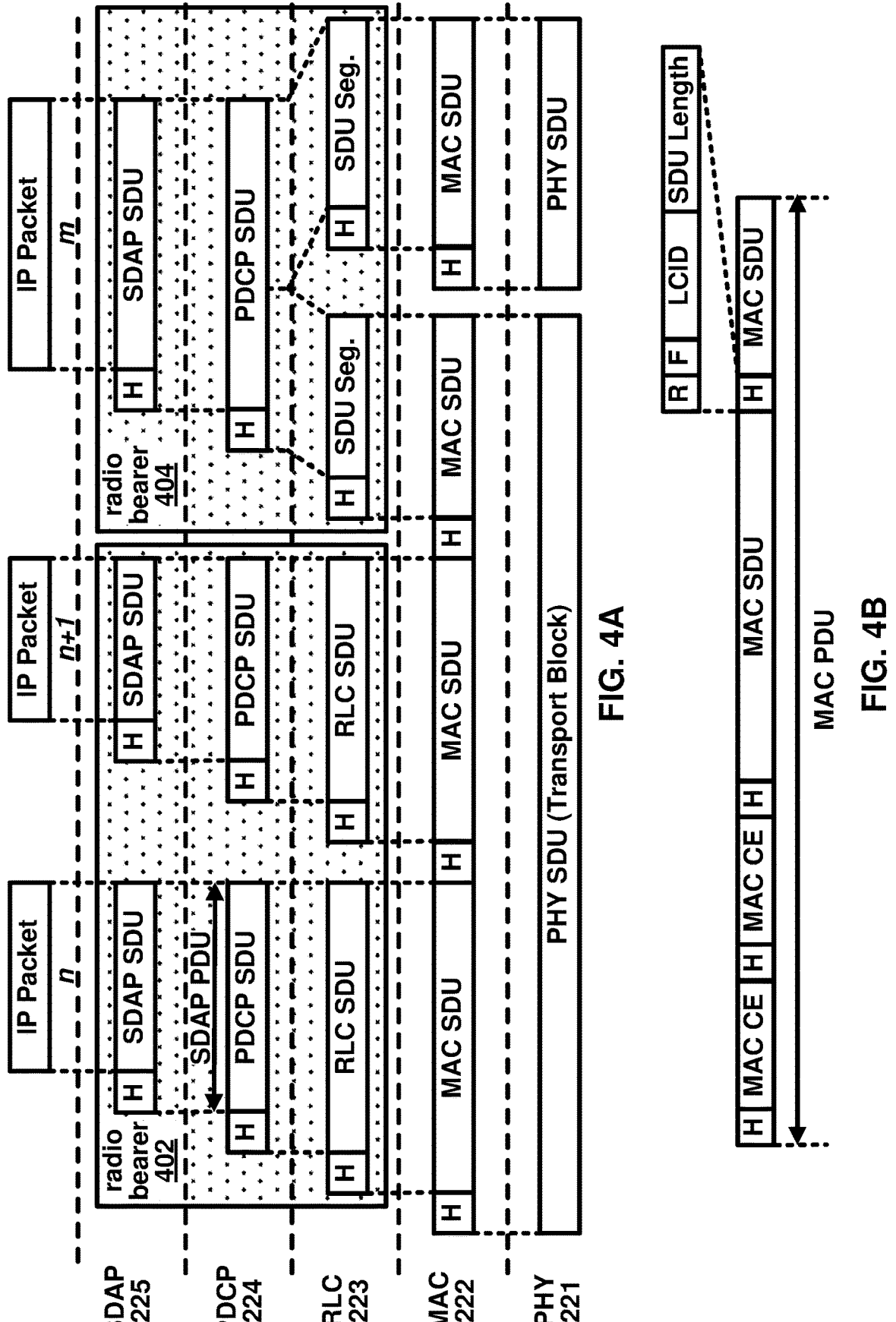
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCD) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior config-ured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCD field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
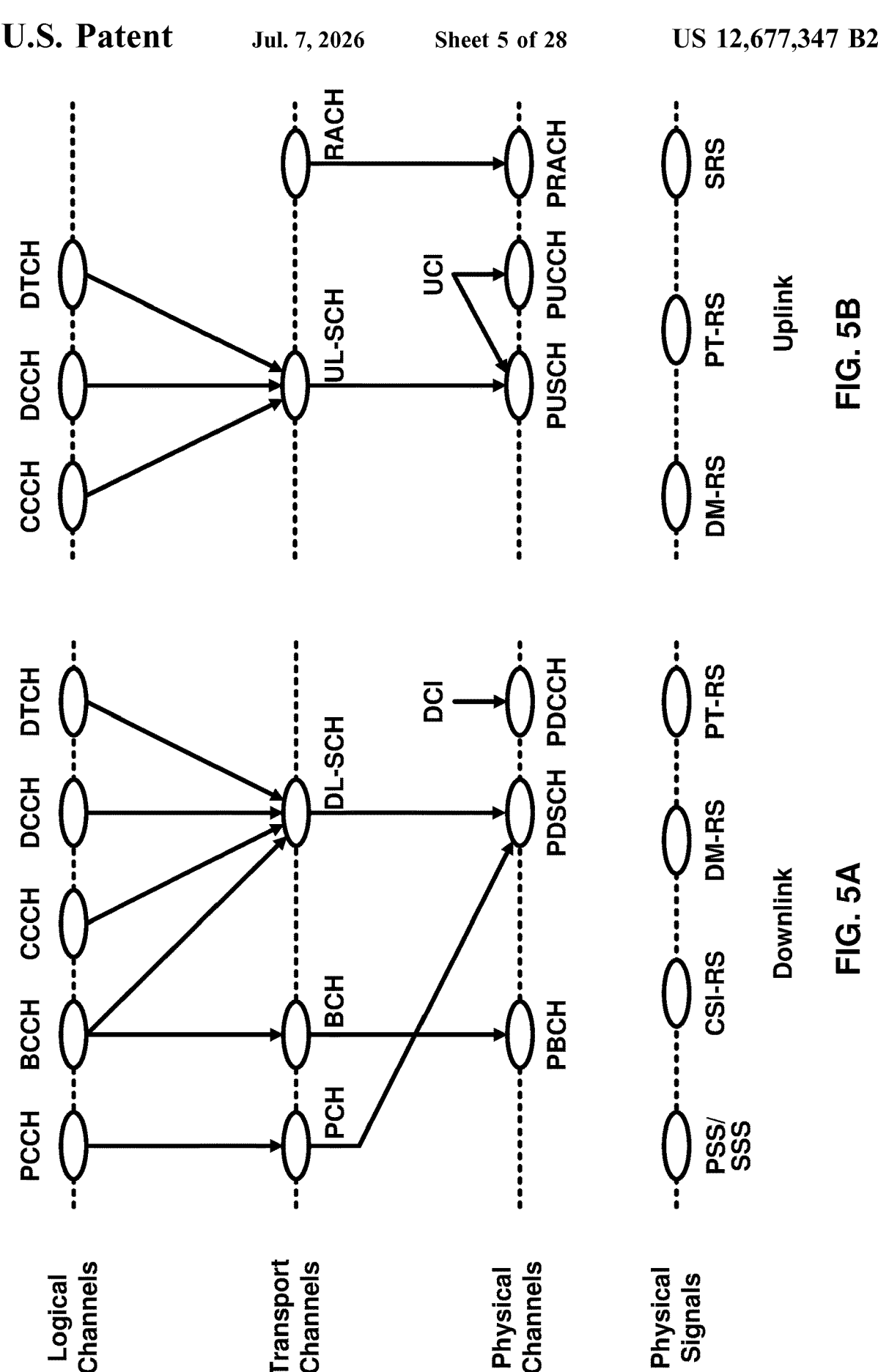
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master informa-tion block (MIB) and several system information blocks (SIBs), wherein the system information mes-sages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying down-link data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carry-ing downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
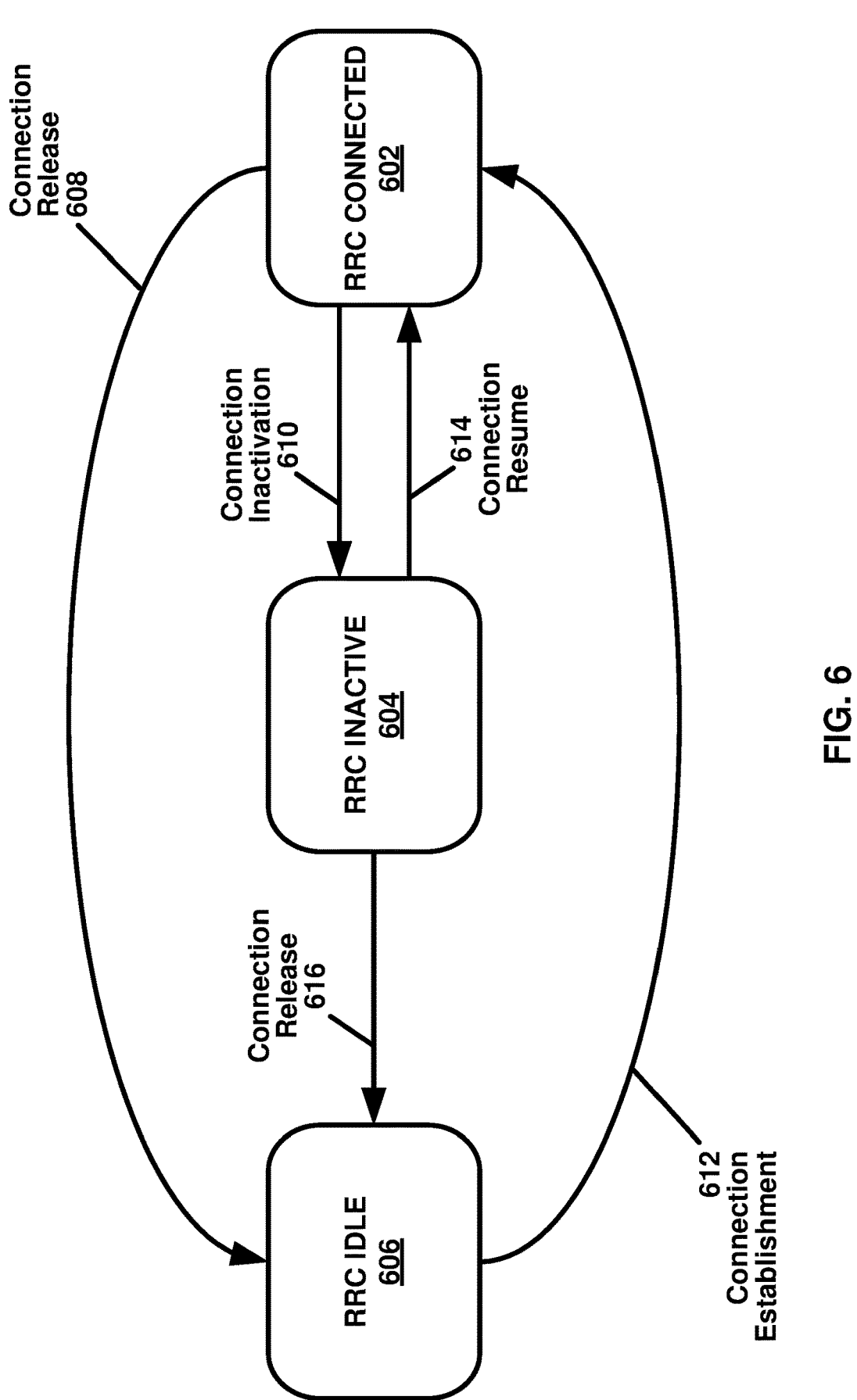
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
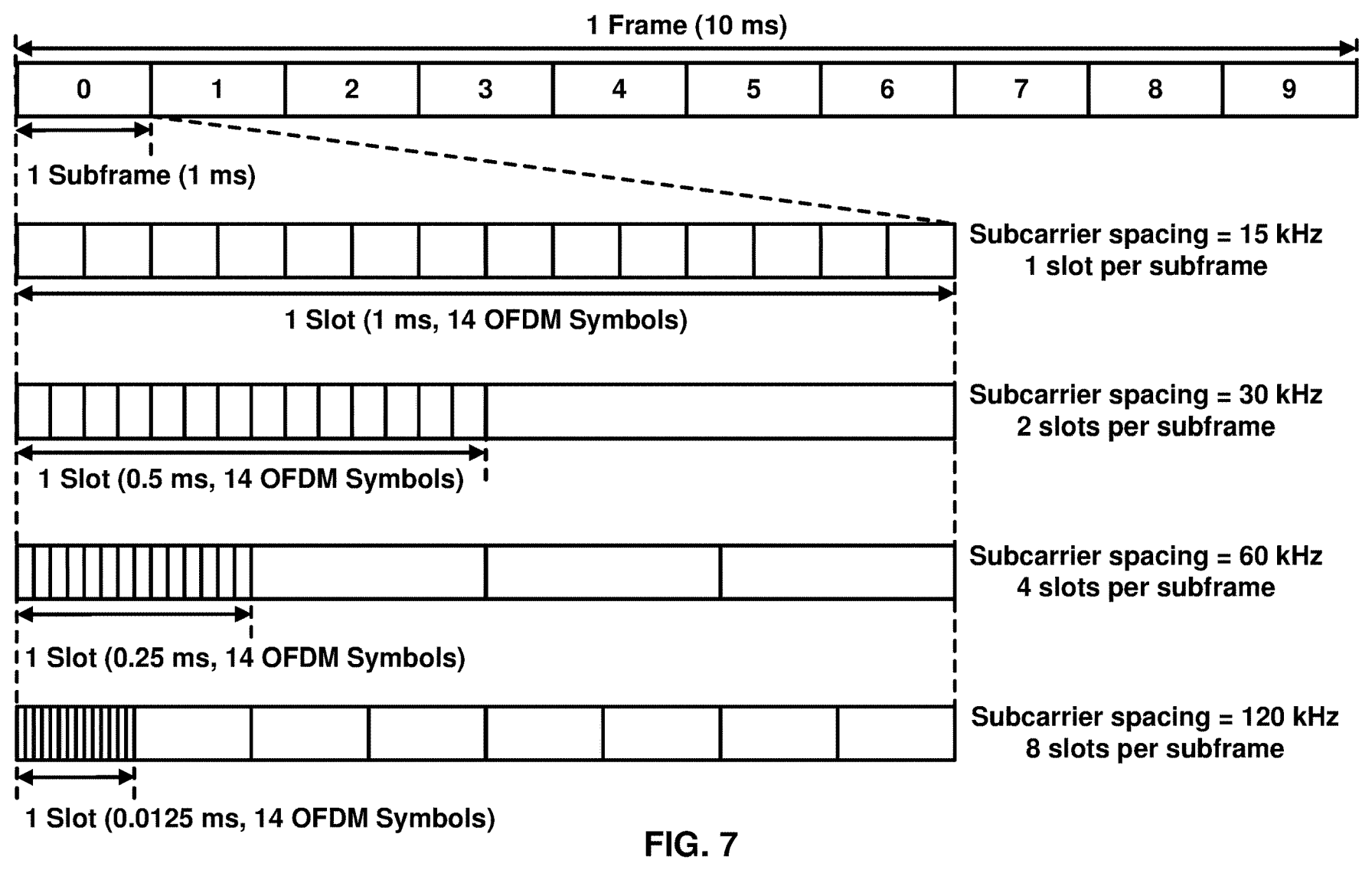

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
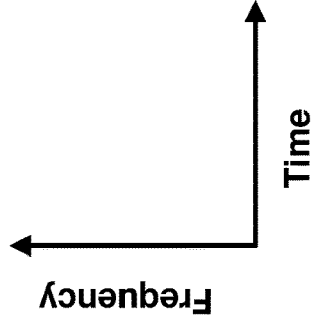
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
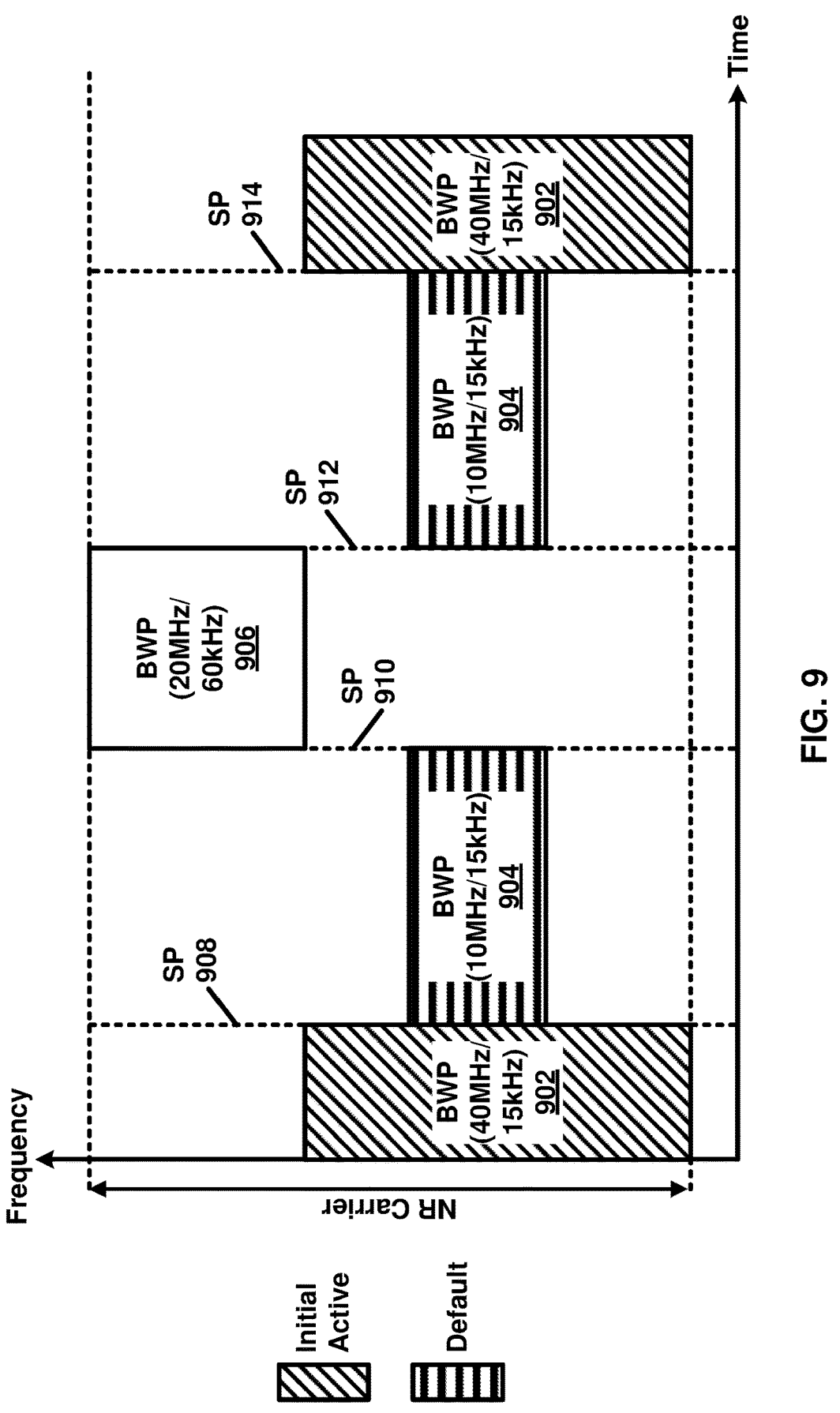
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
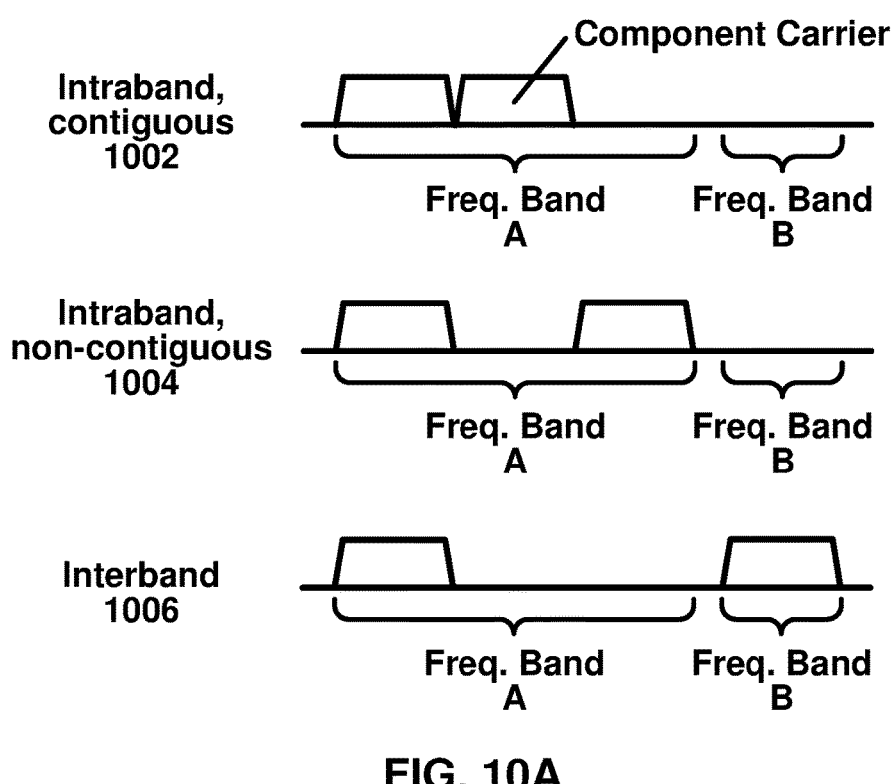
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
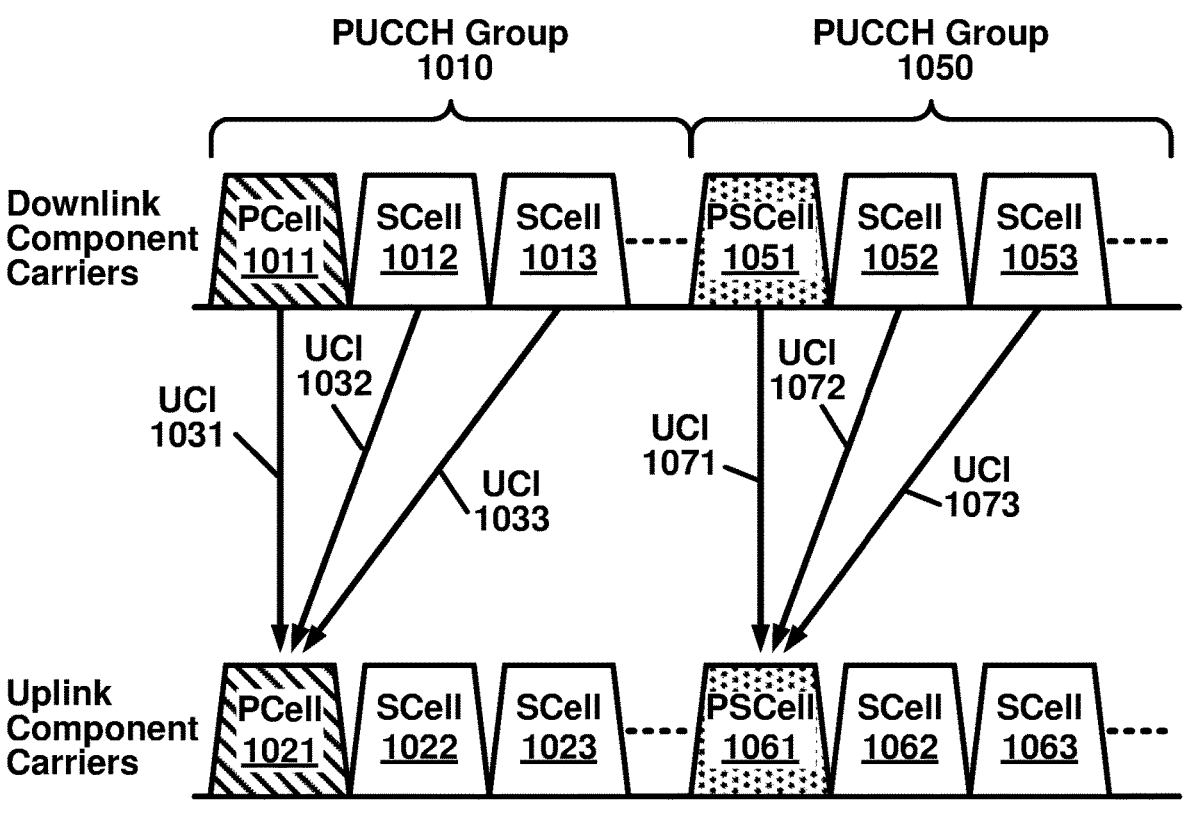
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
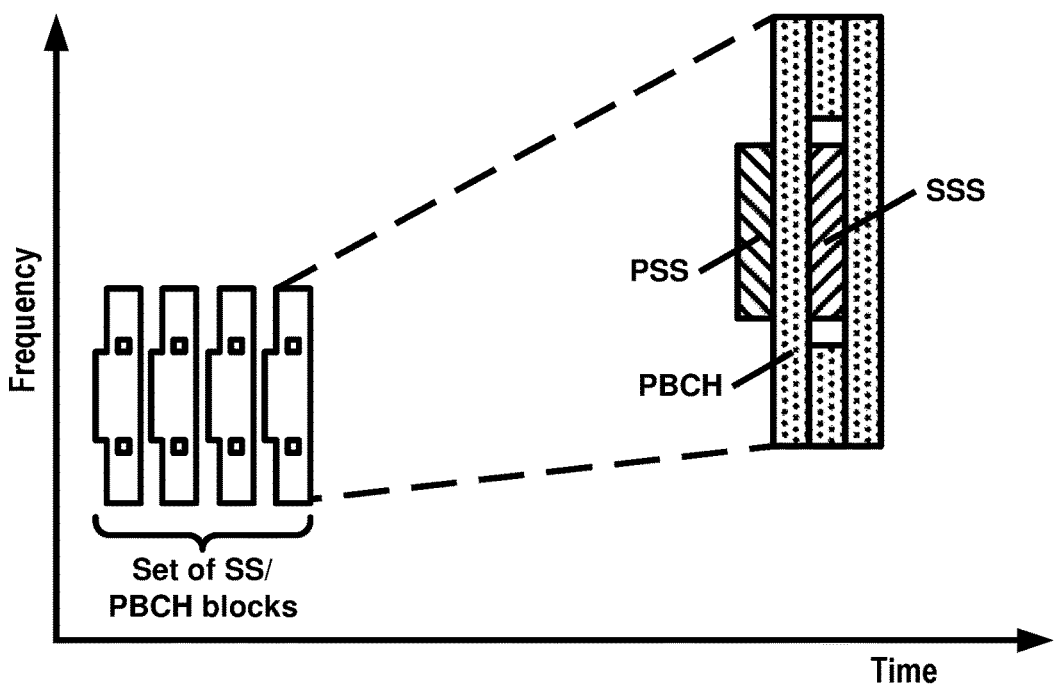
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
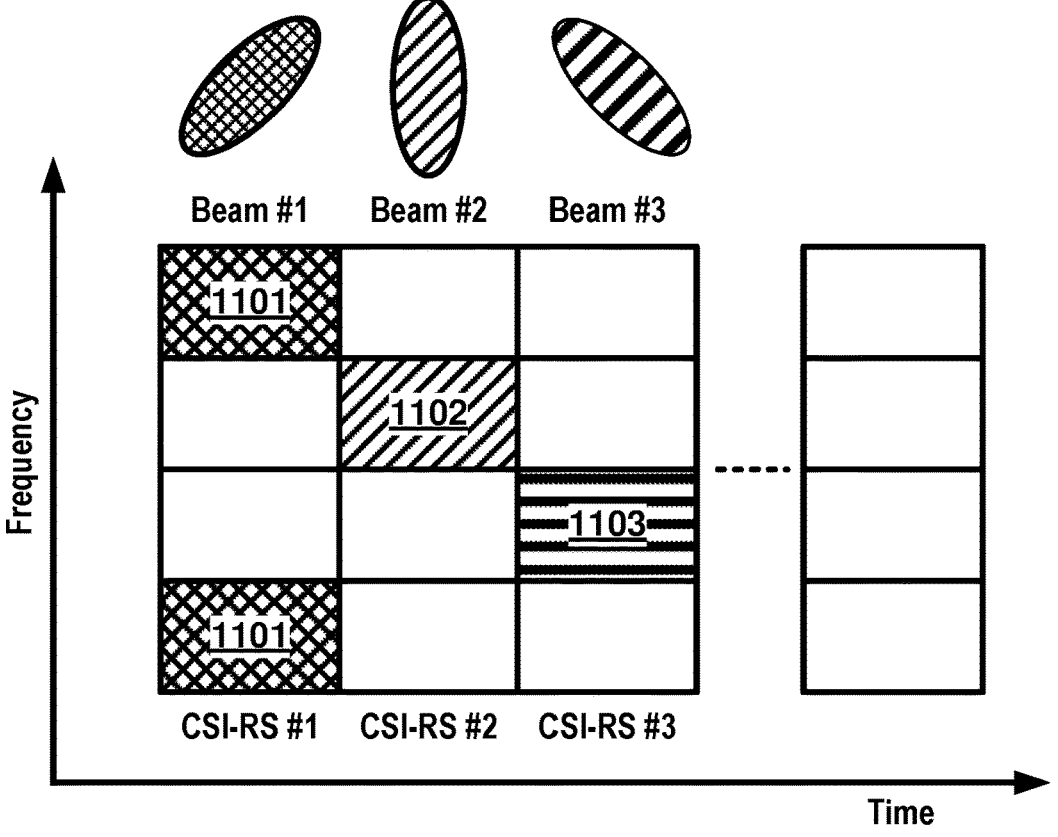
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
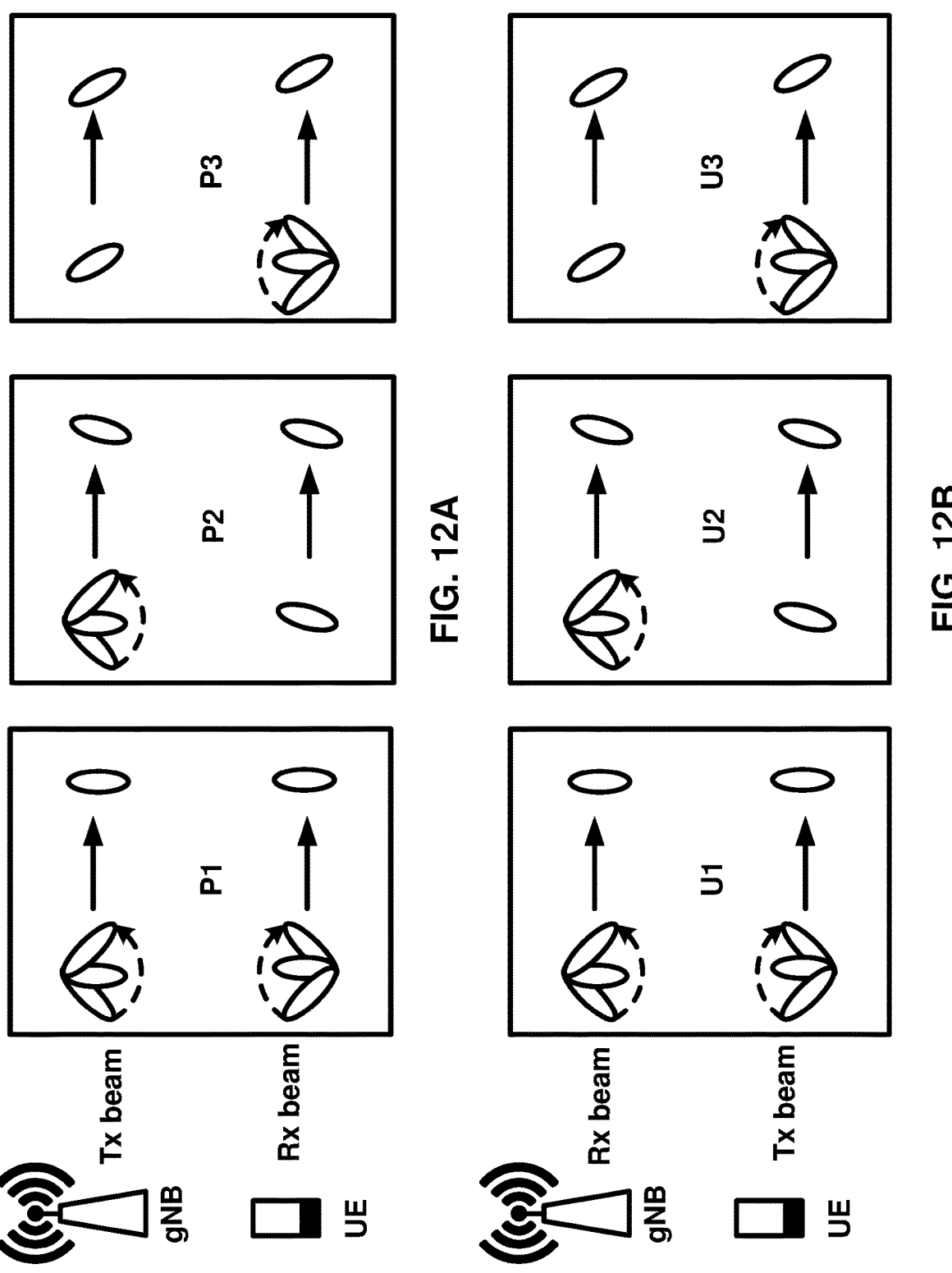
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
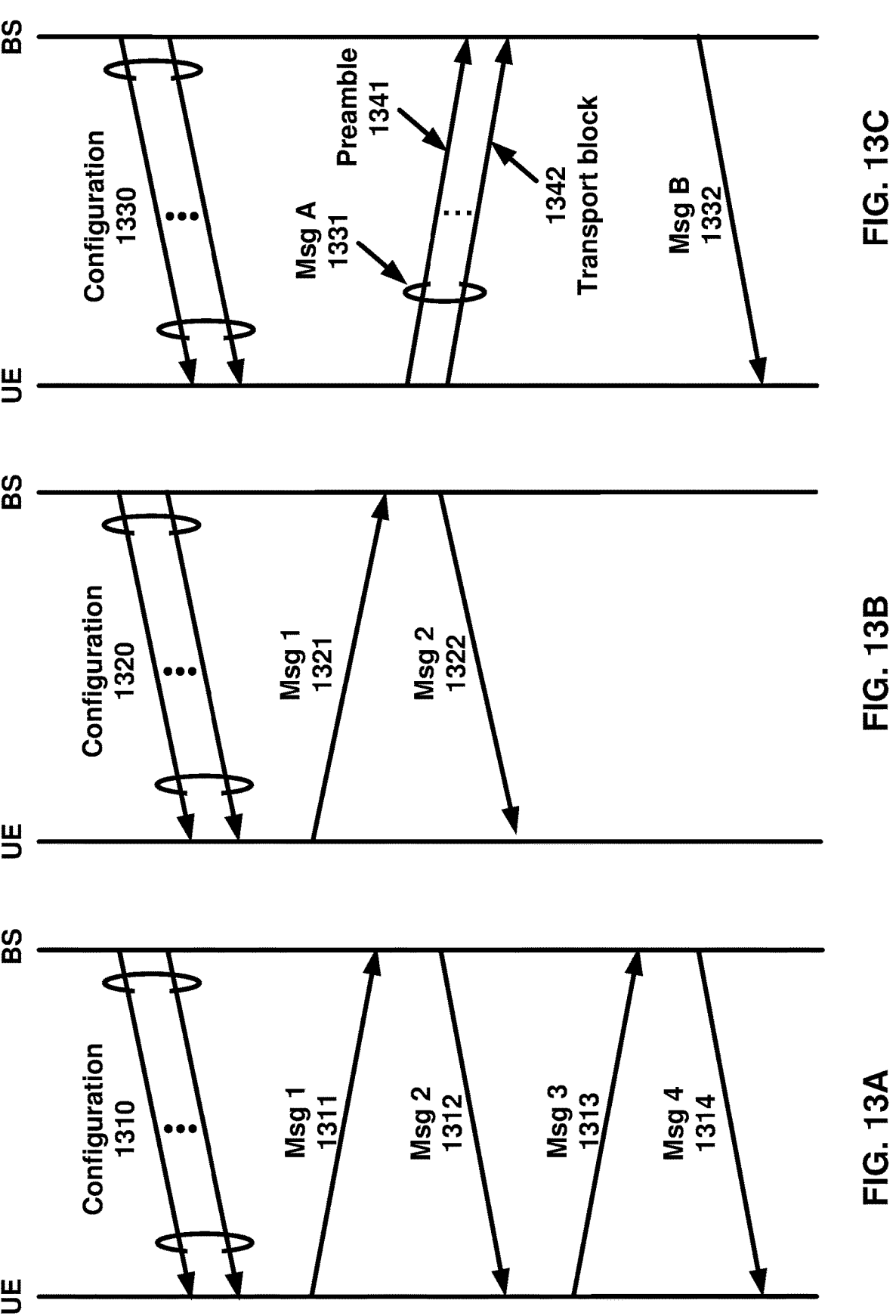
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id,$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recovery SearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
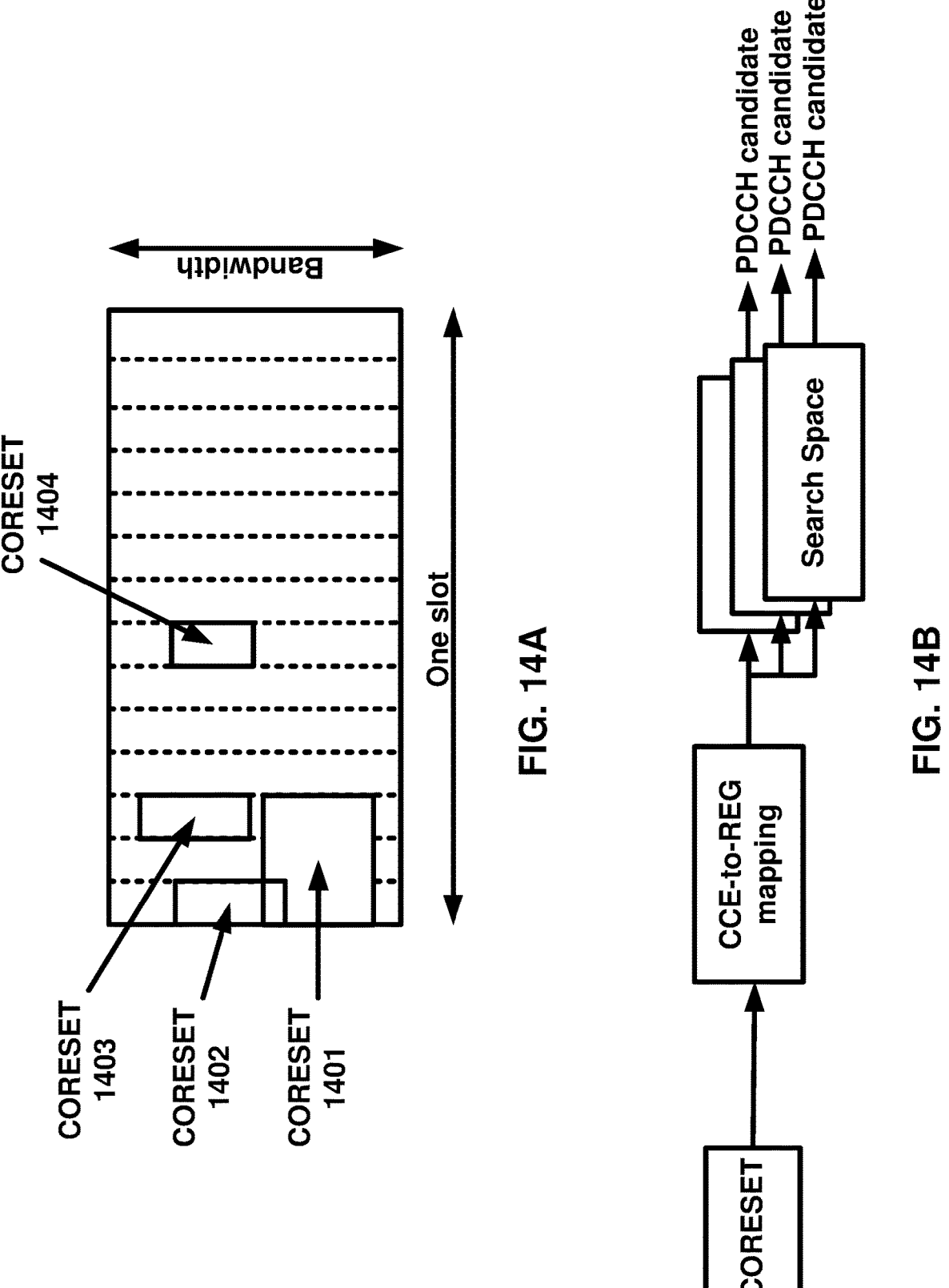
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1)

received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
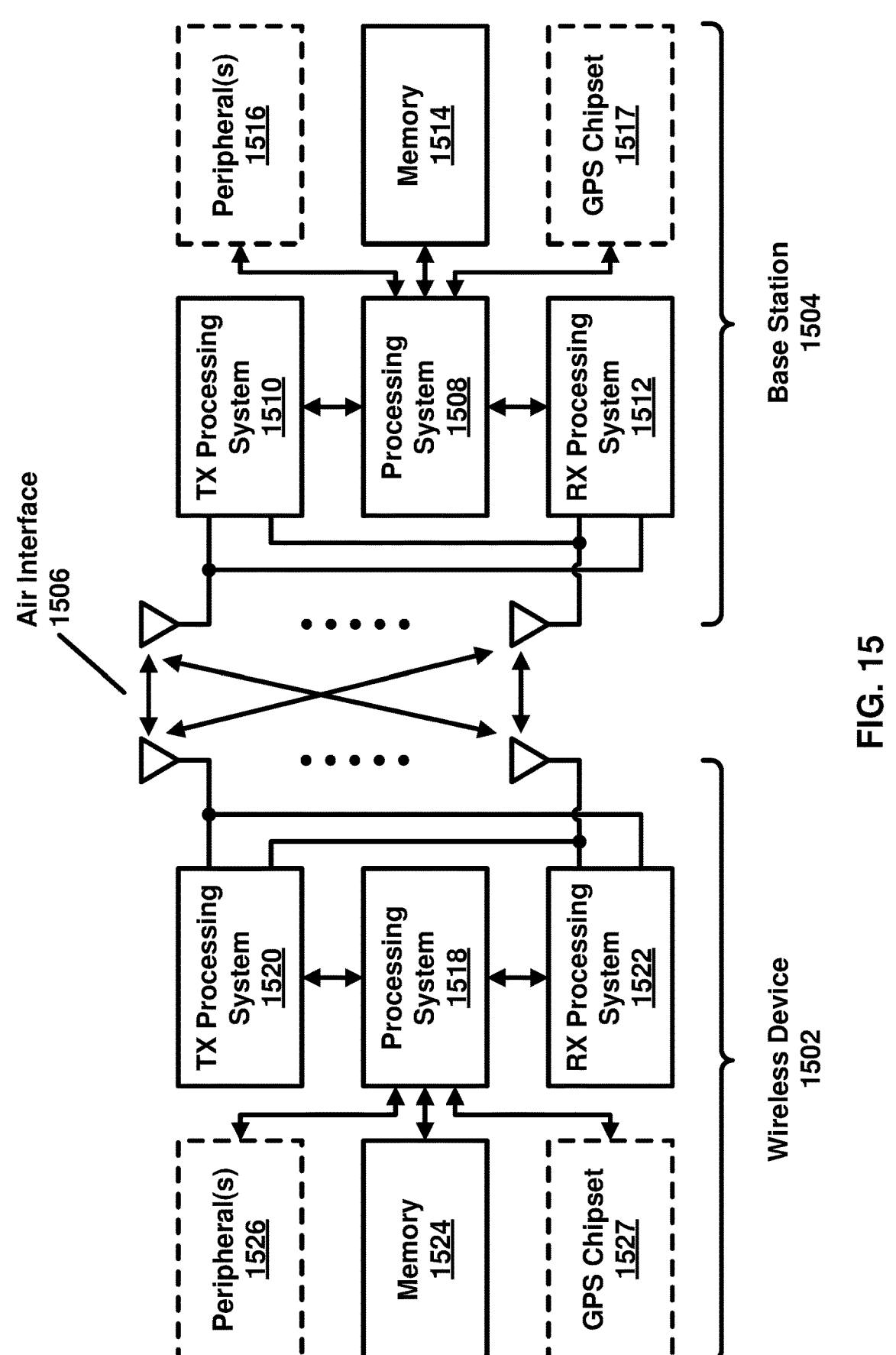
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
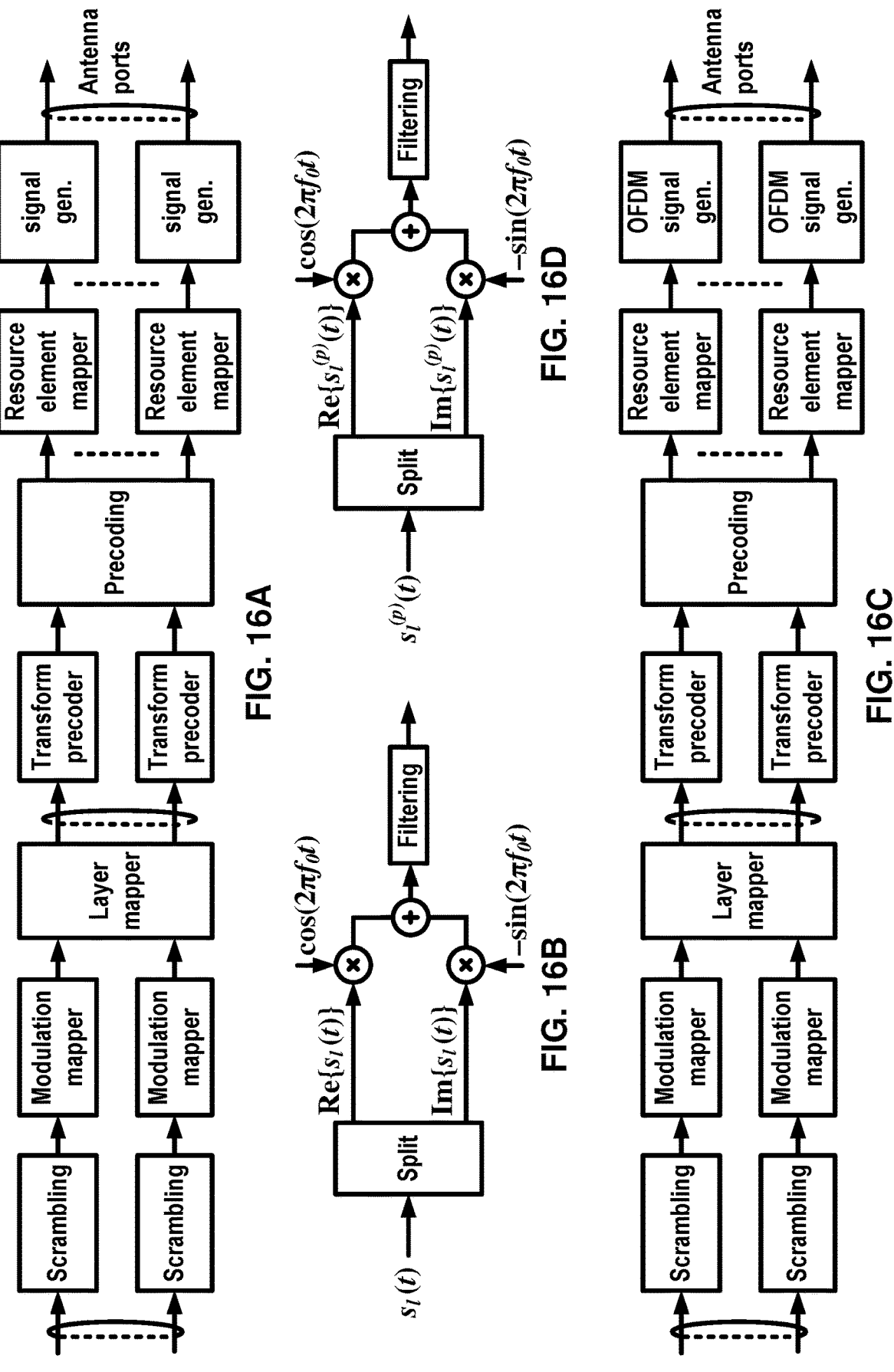
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A wireless device may not perform (e.g., may not be allowed to perform or may prohibit) an uplink data transmission in an RRC_INACTIVE state and/or an RRC_IDLE state. In such a case, the wireless device may make (e.g., set up, (re-)establish, and/or resume) a connection to a network for transmission(s) of DL (e.g., mobile terminated (MT)) data and/or UL (e.g., mobile originated (MO)) data. For example, a wireless device may perform one or more procedures (e.g., connection setup procedure) to make the connection to the network in the RRC_INACTIVE state (or the RRC-IDLE state). For example, the wireless device may perform the one or more procedures (e.g., connection setup or resume procedure), e.g., when DL (e.g., mobile terminated (MT)) and/or UL (e.g., mobile originated (MO)) data are available in a buffer. Based on the one or more procedures (e.g., in response to successfully completing the connection setup or resume procedure), the RRC state of the wireless device may transition to RRC_CONNECTED state from an RRC_INACTIVE state (or from an RRC_IDLE state). The wireless device may perform a reception of DL transmission(s) (e.g., receive DL data) and/or UL transmission (e.g., transmit UL data) in the RRC_CONNECTED state. The wireless device may transition to the RRC_INACTIVE state (or to the RRC_IDLE state) from RRC_CONNECTED state, e.g., after or in response to no more DL data (e.g., to be received) and/or UL data (e.g., to be transmitted) in buffer(s). To transition to the RRC_INACTIVE state from the RRC_CONNECTED state, the wireless device may perform a connection release procedure. The connection release procedure (e.g., an RRC release procedure) may result in transitioning the RRC state to the RRC_INACTIVE state (or to the RRC_IDLE) from the RRC_CONNECTED state.

A frequent RRC state transition between an RRC_INACTIVE state (or an RRC_IDLE state) and the RRC_CONNECTED state may require a wireless device to transmit and/or receive a plurality of control signals in different layers (e.g., RRC messages, MAC CEs, and/or DCIs). For example, for an RRC connection setup, the wireless device may transmit, to a base station, an RRC connection setup request and receive an RRC connection setup message as a respond to the RRC connection setup request. For example, for an RRC connection resume, the wireless device may transmit, to a base station, an RRC connection resume request and receive an RRC connection resume message as a respond to the RRC connection resume request. For example, for an RRC connection release, the wireless device may receive, from a base station, an RRC connection release request. For example, for DL and/or UL transmission of small data available (or arrival) in the RRC_INACTIVE state (or in the RRC_IDLE state), it may be inefficient for a wireless device to make (or resume) an connection to a network (e.g., transition to RRC_CONNECTED from RRC_INACTIVE or RRC_IDLE) and release the connection (e.g., transition to RRC_INACTIVE or RRC_IDLE from RRC_CONNECTED) after or in response to perform the DL and/or UL transmission of small data in RRC_CONNECTED. This may result in increasing unnecessary power consumption and/or signaling overhead. For example, the signaling overhead (e.g., control signaling overhead) required to transmit a payload may be larger than the payload. For example, a frequent RRC state transition for the small and infrequent DL and/or UL data packet(s) may cause unnecessary power consumption and signaling overhead for the wireless device.

Examples of small and infrequent data packets may be such traffic generated from smartphone applications, Instant Messaging (IM) services, heart-beat/keep-alive traffic from IM/email clients and other apps, push notifications from various applications, non-smartphone applications, wearables (e.g., positioning information), sensors (e.g., for transmitting temperature, pressure readings periodically or in an event triggered manner), and/or smart meters and smart meter networks sending meter readings.

A wireless device may perform uplink data transmission(s) in an RRC_INACTIVE state (or in an RRC_IDLE state). For example, a wireless device may transmit one or more data packets in an RRC_INACTIVE state (and/or an RRC_IDLE state). For example, the wireless device may receive, from a base station, scheduling information (e.g., RRC message) indicating one or more uplink radio resources in the RRC_INACTIVE state for the wireless device. The one or more uplink radio resources may be for infrequent data transmission. The one or more uplink radio resources may be for non-periodic data transmission. The one or more uplink radio resources may be for periodic data transmission. The wireless device may transmit the one or more data packets via the one or more radio resources while keeping its RRC state as the RRC_INACTIVE state (and/or RRC_IDLE state). For example, the wireless device may not transition its RRC state to the RRC_CONNECTED to transmit the one or more data packets via the one or more radio resources. The uplink transmission(s) via the one or more radio resources in an RRC_INACTIVE state (or in an RRC_IDLE state) may be efficient and flexible (e.g., for low throughput short data bursts). The uplink transmission(s) via the one or more radio resources in an RRC_INACTIVE state (or in an RRC_IDLE state) may provide efficient signaling mechanisms (e.g. signaling overhead is less than payload). The uplink transmission(s) via the one or more radio resources in an RRC_INACTIVE state (or in an RRC_IDLE state) may reduce signaling overhead. The uplink transmission(s) via the one or more radio resources in an RRC_INACTIVE state (or in an RRC_IDLE state) may improve the battery performance of the wireless device. For example, a wireless device that has intermittent small data packets in the RRC_INACTIVE state (or the RRC_IDLE state) may benefit from such uplink transmission(s) in the RRC_INACTIVE state (or the RRC_IDLE state).

In this specification, uplink data transmission(s) in an RRC_INACTIVE state may be interchangeable with uplink data transmission(s) in an RRC_IDLE state. For example, the procedure(s), configuration parameter(s), and/or feature description(s) that are related to uplink data transmission(s) in an RRC_INACTIVE state may be applicable to and/or available to an RRC_IDLE state, e.g., unless specify them for an RRC_IDLE state. In this specification, the procedure(s), configuration parameter(s), and/or feature description(s) that are related to uplink data transmission(s) in an RRC_IDLE state may be applicable to and/or available to an RRC_INACTIVE state, e.g., unless specify them for an RRC_INACTIVE state. For example, if RRC_CONNECTED and/or RRC_IDLE state are RRC states that a wireless device has, the procedure(s), configuration parameter(s), and/or feature description(s) that are related to uplink data transmission(s) in an RRC_INACTIVE state described in this specification may be applicable to and/or available for an RRC_IDLE state of the wireless device. For example, if RRC_CONNECTED, RRC_INACTIVE, and/or RRC_IDLE state are RRC states that a wireless device has, the procedure(s), configuration parameter(s), and/or feature description(s) that are related to uplink data transmission(s) described in this specification may be applicable to and/or available for an RRC_INACTIVE and/or an RRC_IDLE state of the wireless device.

Figure 17:
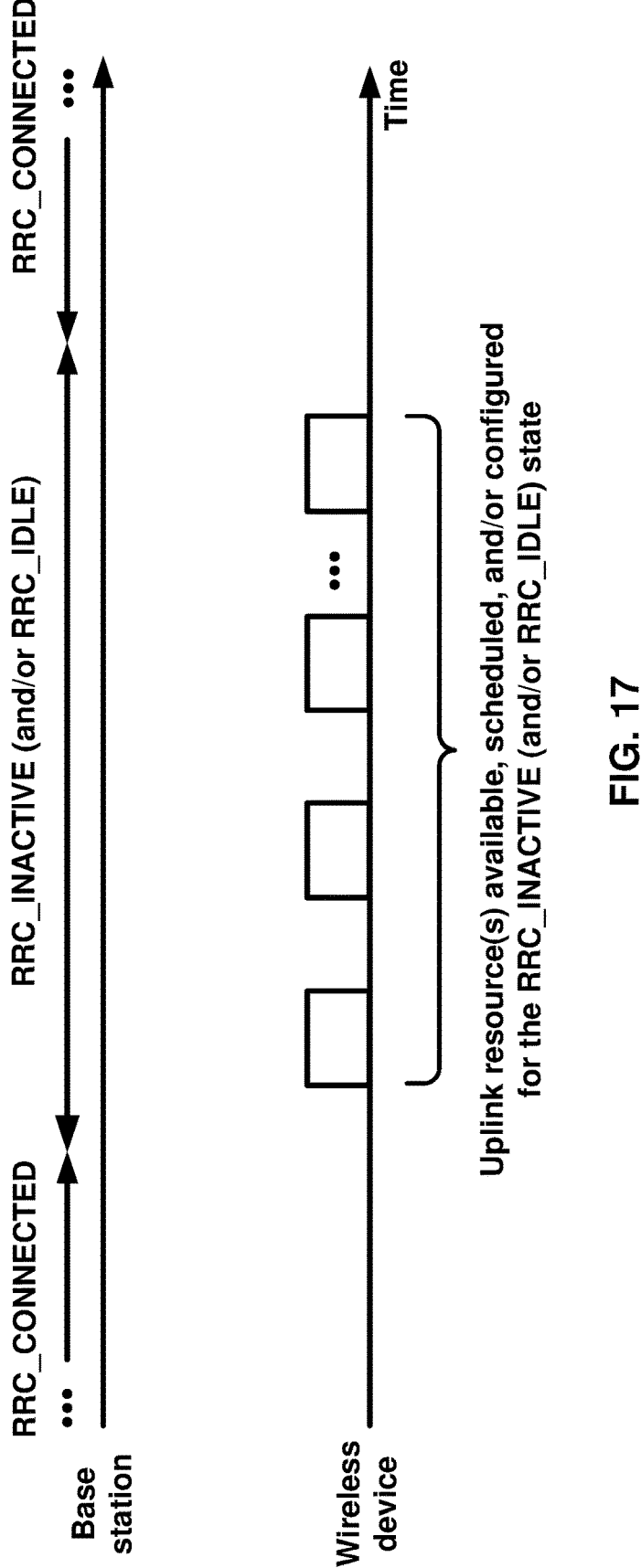
FIG. 17 illustrates an example of one or more data packet transmission(s) in an RRC_INACTIVE state (or an RRC_IDLE state), according to some embodiments.

FIG. 17 is an example of one or more data packet transmission(s) in an RRC_INACTIVE state (or an RRC_IDLE state) as per an aspect of an embodiment of the present disclosure. The one or more data packet transmission(s) in FIG. 17 may be applicable to one or more example embodiments in this specification. A wireless device may receive RRC message(s) configuring uplink resource(s). The uplink resource(s) may be available, scheduled, and/or configured in the RRC_INACTIVE state (and/or RRC_IDLE state). For example, the wireless device may determine whether to use (and/or initiate, and/or activate) or stop to use (and/or clear, and/or suspend, and/or deactivate) the uplink resource(s) based on an RRC state of the wireless device. The wireless device may receive radio resource configuration parameters of one or more uplink radio resources that the wireless device may use in the RRC_INACTIVE state (or an RRC_IDLE state). For example, the one or more uplink radio resources may be (pre-)configured while the wireless device is in the RRC_CONNECTED state, the RRC_INACTIVE state, and/or RRC_IDLE state. For example, the wireless device may receive an RRC message comprising the radio resource configuration parameters of the one or more uplink radio resources while the wireless device in the RRC_CONNECTED. The wireless device may not initiate (or activate) the one or more uplink radio resources while the wireless device is in the RRC_CONNECTED state. For example, an RRC release message may comprise radio resource configuration parameters of the one or more uplink radio resources. The wireless device may initiate (or activate) the one or more uplink radio resources after and/or in response to receiving the RRC release message. The wireless device may initiate (and/or activate and/or use) the one or more uplink radio resources after and/or in response to the RRC state of the wireless device being the RRC_INACTIVE state (or an RRC_IDLE state). The wireless device may transmit one or more data packets via the one or more uplink radio resources while keeping the RRC state as the RRC_INACTIVE state (or an RRC_IDLE state), e.g., without transitioning to the RRC_CONNECTED state). The wireless device may determine to transition the RRC state to the RRC_CONNECTED state from the RRC_INACTIVE state (or an RRC_IDLE state). After or in response to transitioning the RRC state to the RRC_CONNECTED state, the wireless device may determine to stop to use (and/or clear, and/or suspend, and/or deactivate) the one or more uplink resource(s).

In FIG. 17, a wireless device may determine to transition an RRC state of the wireless device to an RRC_INACTIVE state (or an RRC_IDLE state) from an RRC_CONNECTED state. The wireless device may determine to transition an RRC state to the RRC_INACTIVE state (or an RRC_IDLE state) after or in response to receiving an RRC message. For example, the wireless device may receive, from a base station, an RRC message (e.g., RRC release message). The RRC message (e.g., RRC release message) may indicate a release of an RRC connection from a network. In response to receiving the RRC message, the wireless device may perform an RRC release procedure. The RRC release procedure may comprise a release of an established radio bearers and/or configured radio resources. The RRC release procedure may comprise a suspension of the RRC connection (e.g., if a signaling radio bearer (SRB) (e.g., SRB2) and/or at least one dedicated radio bearer (DRB) are setup) and/or a suspension of the established radio bearer(s). After and/or in response to receiving the RRC message (or performing the RRC release procedure), the wireless device may determine to transition an RRC state of the wireless devices to an RRC_INACTIVE state (or an RRC_IDLE state) from an RRC_CONNECTED state.

In FIG. 17. a wireless device may determine to transition an RRC state of the wireless device from an RRC_INACTIVE state (or an RRC_IDLE state) to an RRC_CONNECTED state. For example, the wireless device may perform a random access procedure to transition to the RRC_CONNECTED state. The wireless device may perform (and/or initiate) the random access procedure for uplink transmission of uplink data, e.g., that arrives during the RRC_INACTIVE state (or the RRC_IDLE state). The wireless device may perform the random access procedure after or in response to receiving a paging message in the RRC_INACTIVE state (or an RRC_IDLE state). The wireless device may, e.g., periodically, monitor a downlink control channel for the paging message. The wireless device may receive, from a base station (or a network), the paging message that indicates an identifier of the wireless device. The paging message may indicate that the wireless device performs the random access procedure, e.g., for making a connection to the network.

A wireless device may receive a message comprising one or more configurations. A configuration of the one or more configurations may comprise an identifier (or index) of the configuration. each of the one or more configurations may comprise radio resource configuration parameters of one or more uplink radio resources that the wireless device may use in the RRC_INACTIVE state (or an RRC_IDLE state).

A wireless device may receive an RRC message indicating one or more uplink radio resources that a wireless device uses in a Non-RRC_CONNECTED state (e.g., RRC_INACTIVE and/or RRC_IDLE). The one or more uplink radio resources in the Non-RRC_CONNECTED state may be one time use resource, e.g., for a single transmission. The one or more uplink radio resources in the Non-RRC_CONNECTED state may be periodic resources, e.g., for one or more uplink transmission(s). The one or more uplink radio resources in the Non-RRC_CONNECTED state may be referred to as a variety of names in different systems and/or implementations. The one or more uplink radio resources in the Non-RRC_CONNECTED state may be referred to as preconfigured uplink resources (PURs). Uplink grants indicating the one or more uplink radio resources in the Non-RRC_CONNECTED state may be referred to as (pre-)configured grant(s). The (pre-) configured grant(s) may comprise a plurality of types. For example, the (pre-)configured grant(s) may comprise a (pre-)configured grant Type 1 and/or a (pre-)configured grant Type 2. The one or more uplink radio resources determined (and/or indicated) by the (pre-)configured grant Type 1 may not require an indication of (re-)initiating (and/or (re-)activating) the one or more uplink radio resources, e.g., after or in response to receiving the RRC message indicating the one or more uplink radio resources in the Non-RRC_CONNECTED state. For example, the wireless device may (re-)initiate (and/or (re-)activate) the one or more uplink radio resources after or in response to receiving the RRC message comprising the (pre-)configured grant Type 1 that indicates the one or more uplink radio resources in the Non-RRC_CONNECTED state. The one or more uplink radio resources determined (and/or indicated) by the (pre-)configured grant Type 2 may require an indication of (re-)initiating (and/or (re-)activating) the one or more uplink radio resources, e.g., after or in response to receiving the RRC message indicating the one or more uplink radio resources. For example, the wireless device may not (re-)initiate (and/or (re-)activate) the one or more uplink radio resources after or in response to receiving the RRC message comprising the (pre-)configured grant Type 2 that indicates the one or more uplink radio resources. For example, the wireless device may (re-)initiate (and/or (re-)activate) the one or more uplink radio resources after or in response to receiving the indication of (re-)initiating (and/or (re-)activating) the one or more uplink radio resources in the Non-RRC_CONNECTED state. The wireless device may receive the indication after or in response to receiving the RRC message comprising the (pre-)configured grant Type 2 that indicates the one or more uplink radio resources. The uplink grant(s) indicating the one or more uplink radio resources in the Non-RRC_CONNECTED state may be referred to as (pre-)configured grant(s) with a particular type indicator, e.g., a (pre-)configured grant type 3, 4, or etc. For example, the (pre-)configured grant Type 1 and the (pre-)configured grant Type 2 may indicate one or more (periodic) uplink grants in the RRC_CONNECTED state. For example, the (pre-)configured grant Type 3 (and/or other types of (pre-)configured grant) may indicate one or more (periodic) uplink grants in the Non-RRC_CONNECTED state.

Uplink data transmission(s) via the one or more uplink radio resources (and/or the (pre-) configured grant(s)) in a Non-RRC_CONNECTED state may be referred to as small data transmission (SDT), early data transmission (EDT), and/or data transmission via PUR(s). For example, in example embodiment(s) of the present disclosure herein, an SDT and/or an EDT may be interchangeable with uplink data transmission(s) via the one or more uplink radio resources (and/or the (pre-)configured grant(s)) in a Non-RRC_CONNECTED state. For example, in example embodiment(s) of the present disclosure herein, radio resource(s) used for an SDT in a Non-RRC_CONNECTED state may be referred to as PUR(s). For example, uplink data transmission(s) based on a RA procedure in a Non-RRC_CONNECTED state may be referred to as an RA-based SDT, an RA-based EDT, an EDT, and/or the like. For example, an uplink data transmission based on (pre-)configured grant(s) in a Non-RRC_CONNECTED state may be referred to as (pre-)configured grant based SDT (CG-based SDT). One or more radio resources of the (pre)configured grant(s) may be referred to as (pre)configured uplink resources (PURs), SDT resources, resources of SDT, and/or the like.

FIG. 18A is an example of (pre-)configured grant(s) indicating one or more uplink radio resources in a Non-RRC_CONNECTED (e.g., RRC_INACTIVE state and/or an RRC_IDLE state) as per an aspect of an embodiment of the present disclosure. The (pre-)configured grant(s) in FIG. 18A may not require an additional activation message (e.g., DCI, MAC CE, and/or RRC) that activates (and/or initiates) the one or more uplink radio resources (and/or (pre-)configured grant(s)). For example, a wireless device may receive an RRC message comprising configuration parameters of the (pre-)configured grant(s) of a cell. For example, the RRC message may be an RRC release message. After or in response to receiving the RRC message, the wireless device may determine (and/or store) the (pre-)configured grant(s) for the cell. After or in response to receiving the RRC message, the wireless device may (re-)initiate (or activate) the (pre-)configured grant. The one or more uplink radio resources (and/or (pre-) configured grant(s)) may be activated and/or initiated (or valid) in an RRC_INACTIVE state. For example, the wireless device may (re-)initiate (or activate) the (pre-)configured grant to start in (and/or from) a time reference. For example, the time reference may be a symbol, a slot, a subframe, an SFN, and/or a hyper-SFN (H-SFN). For example, the H-SFN comprise one or more SFNs (e.g., 1024 SFNs). For example, the time reference may be a combination of one or more of a symbol, a slot, a subframe, an SFN, and/or a hyper-SFN (H-SFN). For example, the time reference may be a symbol of a slot of an SFN of a H-SFN indicated by the configuration parameters (e.g., a time domain offset (e.g., indicating the H-SFN, the SFN and/or the slot) and a symbol number S (e.g., indicating the symbol). For example, the wireless device may determine that the (pre-)configured grant (re-)occurs with a periodicity indicated by the configuration parameters. The wireless device may make a connection to a network (or a base station). The wireless device may perform an RRC connection setup procedure and/or RRC connection resume procedure to make the connection. For example, the wireless device may transmit an RRC connection setup request (e.g., for the RRC connection setup procedure) and/or an RRC connection resume request (e.g., for the RRC connection resume procedure). The wireless device may receive, from the base station, a response indicating a complete of making the RRC connection. For example, the wireless device may receive an RRC connection setup complete (e.g., for the RRC connection setup procedure). For example, the wireless device may receive an RRC connection resume complete (e.g., for the RRC connection resume procedure). In an RRC_CONNECTED state, the one or more uplink radio resources (and/or (pre-)configured grant(s)) may be deactivated and/or suspended (cleared, and/or invalid) in an RRC_CONNECTED state. For example, the one or more uplink radio resources (and/or (pre-) configured grant(s)) may be deactivated and/or suspended (cleared, and/or invalid) after or in response to making the connection to the base station in FIG. 18A (e.g., after or in response to receiving RRC connection setup and/or resume complete).

FIG. 18B is an example of (pre-)configured grant(s) indicating one or more uplink radio resources in a Non-RRC_CONNECTED (e.g., RRC_INACTIVE state and/or an RRC_IDLE state) as per an aspect of an embodiment of the present disclosure. The (pre-)configured grant(s) in FIG.

18B may require an additional activation message (e.g., DCI, MAC CE, and/or RRC) that activates (and/or initiates) the one or more uplink radio resources (and/or (pre-) configured grant(s)). For example, a wireless device may receive an RRC message comprising configuration parameters of the (pre-)configured grant(s) of a cell. After or in response to receiving the RRC message, the wireless device may determine (and/or store) the (pre-) configured grant(s) for the cell. For example, the RRC message may be an RRC release message. After or in response to receiving the RRC message, the wireless device may not (re-) initiate (or activate) the (pre-)configured grant, e.g., until the wireless device receives the additional activation message (e.g., DCI, MAC CE, and/or RRC). The wireless device may monitor a PDCCH in the Non-RRC_CONNECTED state to receive the additional activation message. The wireless device may receive the additional activation message (e.g., DCI, MAC CE, and/or RRC) after or in response to receiving the RRC message. A DCI carried by the PDCCH may be the additional activation message. An MAC CE, and/or RRC message received based on a downlink assignment of a DCI carried by the PDCCH may be the additional activation message. The configuration parameters in the RRC message may indicate time and frequency resource allocation of the PDCCH, monitoring occasion(s) of the PDCCH, and/or a monitoring periodicity of the PDCCH. The wireless device may determine that the (pre-)configured grant (re-)occurs with a periodicity indicated by the configuration parameters and/or timing offset references (e.g., a H-SFN, a SFN, a slot and/or a symbol). For example, a wireless device may determine the SFN (e.g., of the H-SFN), the slot and/or the symbol based on a reception timing of the additional activation message received via the PDCCH. The wireless device may receive a deactivation message that indicates to deactivate and/or suspend (clear, and/or invalidate) the one or more uplink radio resources (and/or (pre-)configured grant(s)). The wireless device may receive the deactivation message in the Non-RRC_CONNECTED state. The wireless device may make a connection to a network (or a base station). The wireless device may perform a RRC connection setup procedure and/or RRC connection resume procedure to make the connection. For example, the wireless device may transmit an RRC connection setup request (e.g., for the RRC connection setup procedure) and/or an RRC connection resume request (e.g., for the RRC connection resume procedure). The wireless device may receive, from the base station, a response indicating a complete of making the RRC connection. For example, the wireless device may receive an RRC connection setup complete (e.g., for the RRC connection setup procedure). For example, the wireless device may receive an RRC connection resume complete (e.g., for the RRC connection resume procedure). After or in response to making the connection to, an RRC state of the wireless device may be transitioned to an RRC_CONNECTED state. The one or more uplink radio resources (and/or (pre-)configured grant(s)) may be deactivated and/or suspended (cleared, and/or invalid), e.g., after or in response to the RRC state being an RRC_CONNECTED state. For example, the one or more uplink radio resources (and/or (pre-)configured grant(s)) may be deactivated and/or suspended (cleared, and/or invalid) after or in response to making the connection to the base station in FIG. 18B (e.g., after or in response to receiving RRC connection setup and/or resume complete).

One or more uplink radio resources in a Non-RRC_CONNECTED state may be configured by upper layer(s), e.g., RRC layer and/or MAC layer. For example, the wireless device may receive, from a base station, message(s) (e.g., RRC message) comprising one or more configuration parameters for transmission of uplink data via the one or more uplink radio resources in an Non-RRC_CONNECTED state.

In an example, the one or more configuration parameters may indicate an RNTI for transmission(s) of uplink data via the one or more uplink radio resources in a Non-RRC_CO-NNECTED state. The RNTI may be an identifier of the wireless device. C-RNTI. The RNTI may be C-RNTI. The RNTI may be preconfigured uplink resource C-RNTI (PUR-C-RNTI or PUR-RNTI). The wireless device may monitor a PDCCH using the RNTI. For example, the wireless device may monitor the PDCCH using the RNTI after or in response to transmission of uplink data via the one or more uplink radio resources. For example, the wireless device may receive, via the PDCCH, DCI with CRC scrambled by the RNTI. The DCI may indicate a positive acknowledge-ment of the transmission of the uplink data. The DCI may indicate a negative acknowledgement of the transmission of the uplink data. The DCI may indicate a retransmission of the transmission of the uplink data. The DCI may indicate an uplink grant for the retransmission. The DCI may indicate an updated parameter value(s) of the one or more configuration parameters. For example, the DCI may indicate a (e.g., new or updated) timing advance value for transmission of uplink data via the one or more uplink radio resources in an Non-RRC_CONNECTED state. The DCI may indicate a trigger of an RA procedure. The one or more configuration parameters may indicate a duration of a response window (e.g., example parameter name: ResponseWindowSize). The wireless device may monitor the PDCCH for the duration of the response window to receive, from a base station, a response (e.g., the DCI) to the transmission of data.

In an example, the one or more configuration parameters may indicate a number of skipped uplink grants (and/or resource occasions) (e.g., example parameter name: Implic-itReleaseAfter). Based on the indicated number, the wireless device may determine to release (clear, deactivate, discard, and/or suspend) the one or more uplink radio resources, uplink grant(s) indicating the one or more uplink radio resources, and/or the one or more configuration parameters. This releasing (clearing, deactivating, discarding, and/or suspending) mechanism may be referred to as an implicit resource release, an implicit preconfigured uplink resource release, or the like. The number of skipped uplink grants (or resource occasions) indicated by the one or more configu-ration parameters may be a number of consecutive skipped (and/or empty) uplink grants (and/or resource occasions). For example, after or in response to a determination that the wireless device may skip N occasions (e.g., N consecutive occasions) of the one or more uplink radio resources or may not transmit uplink packet(s) via the one or more uplink radio resources for N times (e.g., N=the number of skipped uplink grants and/or resource occasions), the wireless device may release (clear, deactivate, discard, and/or suspend) the one or more uplink radio resources, uplink grant(s) indicat-ing the one or more uplink radio resources, and/or the one or more configuration parameters. The wireless device may not apply (or use) the implicit resource release (e.g., implicit preconfigured uplink resource release or the like), e.g., if the one or more configuration parameters does not comprise parameter(s) indicating the number of skipped uplink grants (and/or resource occasions) (e.g., if ImplicitReleaseAfter is not present in the one or more configuration parameters).

Figure 19:
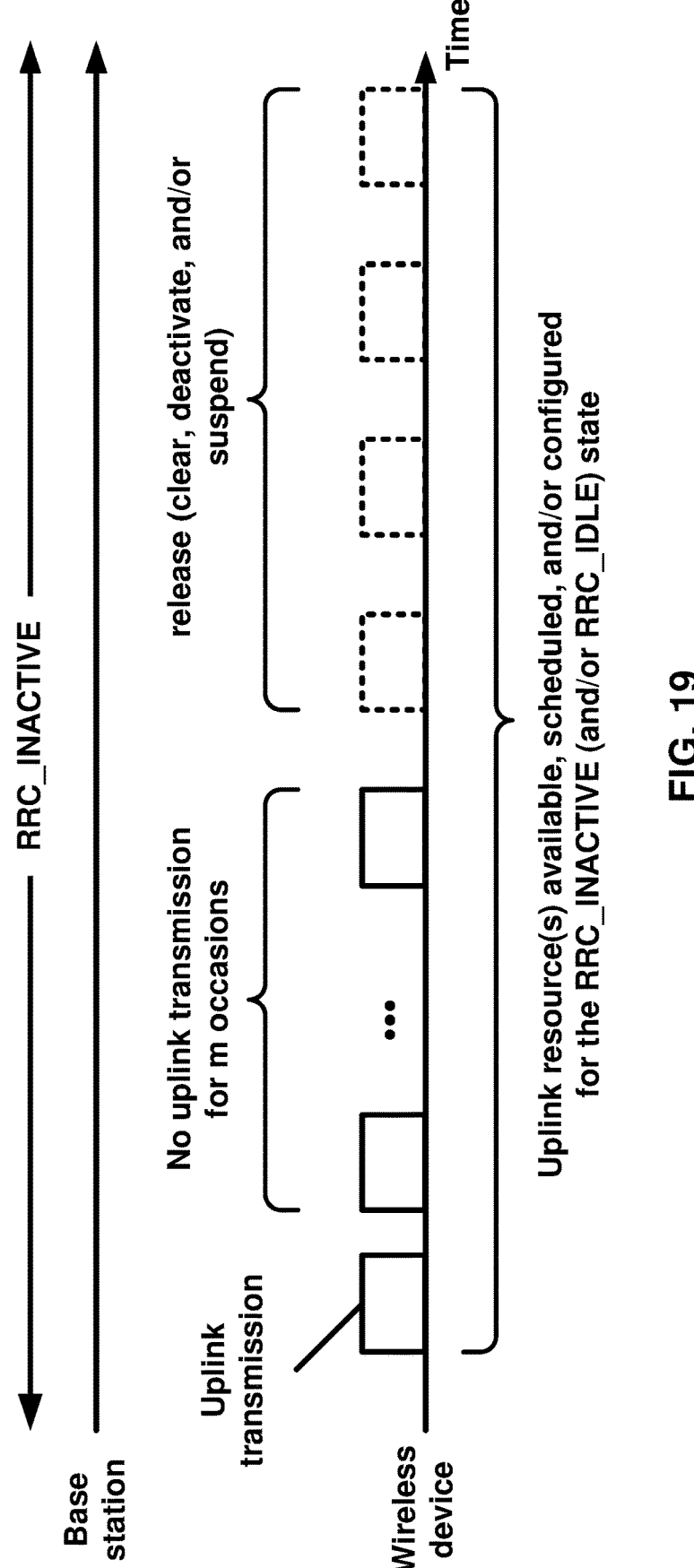
FIG. 19 illustrates an example of one or more data packet transmission(s) in a Non-RRC_CONNECTED (e.g., RRC_INACTIVE and/or an RRC_IDLE) state, according to some embodiments.

FIG. 19 is an example of one or more data packet transmission(s) in a Non-RRC_CONNECTED (e.g., RRC_INACTIVE and/or an RRC_IDLE) state as per an aspect of an embodiment of the present disclosure. A wire-less device may receive RRC message(s) configuring uplink resource(s). The uplink resource(s) may be available, sched-uled, and/or configured in the Non-RRC_CONNECTED state. The wireless device may not transmit uplink packet(s) one or more occasions of the uplink resource(s). The wire-less device may count the one or more occasions. The wireless device may determine to release (e.g., may deter-mine to at least one of release, clear, deactivate, and/or suspend) the uplink resource(s), e.g., if a number of the one or more occasions that the wireless device skip (and/or does not use) to transmit uplink packet(s) is equal to a threshold value. For example, the number of the one or more occasions may be a number of consecutive one or more occasions of the uplink resource(s) that the wireless device skips (and/or does not use).

The wireless device may count a number of skipped uplink grants (and/or resource occasions), e.g., to determine whether to release (clear, deactivate, discard, and/or sus-pend) the one or more uplink radio resources, uplink grant(s) indicating the one or more uplink radio resources, and/or the one or more configuration parameters. For example, m is the number of skipped uplink grants (and/or resource occasions) that the wireless device counts. The wireless device may determine to release (clear, deactivate, discard, and/or sus-pend) the one or more uplink radio resources, uplink grant(s), and/or the one or more configuration parameters, e.g., if m reaches (e.g., is equal to) a threshold value. The threshold value may be configurable, e.g., threshold value may be 1, 2, 3, 4, 8, and so on, by the one or more configuration parameters. For example, the one or more configuration parameters may indicate that the threshold value is not configured, e.g., threshold value=disabled. For example, the wireless device may determine that the implicit resource release is not applied (e.g., is disabled), e.g., if the one or more configuration parameters does not comprise the threshold value.

The wireless device may count a number of skipped uplink grants (and/or resource occasions) with a counter. A value of the counter may be referred to as m. The counter may be implemented in one or more ways. For example, the value of the counter may increase or decrease based on the implemented counter. For example, the counter may up-counter that counts a number of skipped uplink grants (and/or resource occasions) in increasing order. In this case, the wireless device may determine to release (clear, deacti-vate, discard, and/or suspend) the one or more uplink radio resources, uplink grant(s) indicating the one or more uplink radio resources, and/or the one or more configuration param-eters, e.g., if the value of counter, m, reaches the threshold value. For example, the counter may a down-counter that counts a number of skipped uplink grants (and/or resource occasions) in increasing order in the decreasing order. In this case, the wireless device may determine to release (clear, deactivate, discard, and/or suspend) the one or more uplink radio resources, uplink grant(s) indicating the one or more uplink radio resources, and/or the one or more configuration parameters, e.g., if the value of counter may start from the threshold value (or a first predetermined value) and reaches zero (or a second predetermined value). For both counters, the wireless device may determine to release (clear, deacti-vate, discard, and/or suspend) the one or more uplink radio resources, uplink grant(s) indicating the one or more uplink radio resources, and/or the one or more configuration param-eters, e.g., if a number of skipped uplink grants (and/or resource occasions) that the wireless device counters reaches the threshold value. In the example embodiments in this specification, a mechanism introduced based on the up-counter may be implemented based on the down-counter.

The wireless device may determine to increase m based on at least one of followings. The wireless device may increase m, e.g., if a radio resource occasion of the one or more uplink radio resource is not used (e.g., the wireless device may increase m if the wireless device does not transmit data packet(s) via the radio resource occasion of the one or more uplink radio resource). The wireless device may increase m, e.g., if a radio resource occasion of the one or more uplink radio resource is not used while the wireless device is in Non-RRC_CONNECTED. The wireless device may increase m, (e.g., uplink grant(s) of the one or more uplink radio resource and/or resource occasions of the one or more uplink radio resource skipped), e.g., if no MAC PDU is generated for the uplink grant(s) and/or the resource occasions. The wireless device may increase m, e.g., if an radio resource occasion of the one or more uplink radio resource is used (e.g., the wireless device transmits data packet(s) via the radio resource occasion of the one or more uplink radio resource) but no response (e.g., one or more of HARQ ACK, HARQ NACK, L2 (e.g., MAC CE) response, and/or L3 (e.g., RRC message) response) corresponding to the data packet(s) is received. The wireless device may increase m, e.g., if the wireless device skips a radio resource occasion of the one or more uplink radio resource due to access barring to a cell where the one or more uplink radio resources are configured. The wireless device may increase m, e.g., if the wireless device skips a radio resource occasion of the one or more uplink radio resource due to the wireless device being in a wait time (and/or extended wait time). The wait time (and/or extended wait time) may defines how many seconds the wireless device waits after or in response to reception of RRC Connection Reject until an RRC connection request message is sent.

A base station (e.g., network) may maintain the counter to be in-sync with a wireless device. The base station (e.g., network) may determine to increase m based on at least followings. The base station (e.g., network) may increase m, e.g., if the base station does not receive uplink packet(s) via a radio resource occasion of the one or more uplink radio resource. The base station (e.g., network) may increase m, e.g., while the wireless device is in Non-RRC_CON-NECTED. The base station (e.g., network) may increase m, e.g., if the base station (e.g., network) does not transmit a response (e.g., HARQ feedback (ACK and/or NACK)). For example, the base station (e.g., network) may increase m, e.g., if the base station receives uplink packet(s) via a radio resource occasion of the one or more uplink radio resource but does not transmit, to the wireless device, a response to uplink packet(s). For example, the response may be an HARQ ACK feedback. For example, the response may be an HARQ NACK feedback. For example, the response may be L2 (e.g., MAC CE) response and/or L3 (e.g., RRC message) response. The base station (e.g., network) may increase m, e.g., if a radio resource occasion of the one or more uplink radio resource is skipped by the wireless device due to access barring to a cell where the one or more uplink radio resources are configured. The base station (e.g., network) may increase m, e.g., if a radio resource occasion of the one or more uplink radio resource is skipped by the wireless device due to the wireless device being in a wait time (and/or extended wait time). The wait time (and/or extended wait time) may defines how many seconds the wireless device waits after or in response to reception of RRC Connection Reject until an RRC connection request message is sent.

The wireless device may determine not to increase m based on at least one of followings. The wireless device may not increase m, e.g., while the wireless device is in an RRC_CONNECTED state. The wireless device may not increase m, e.g., after or in response to the one or more uplink radio resource of the wireless device is suspended (deactivated, and/or cleared). The wireless device may not increase m, e.g., while a barring timer of the wireless device is running. For example, the wireless device determine, based on the barring timer (e.g., when the barring timer expires), the time before an access attempt is to be per-formed after or in response to an access attempt was barred at access barring check. A base station (e.g., network) may maintain the counter to be in-sync with a wireless device. The base station (e.g., network) may determine not to increase m based on at least followings. The base station (e.g., network) may not increase m, e.g., while the wireless device is in an RRC_CONNECTED state. The base station (e.g., network) may not increase m, e.g., after or in response to the one or more uplink radio resource of the wireless device is suspended (deactivated, and/or cleared). The base station (e.g., network) may not increase m, e.g., while a barring timer of the wireless device is running. For example, the wireless device determine, based on the barring timer (e.g., when the barring timer expires), the time before an access attempt is to be performed after or in response to an access attempt was barred at access barring check.

The wireless device may reset the counter based on at least one of followings. The wireless device resets (e.g., to zero in the case of the up-counter) after or in response to successful communication between the wireless device and a base station (e.g., network). For example, the wireless device resets (e.g., to zero in the case of the up-counter) after or in response to receiving an ACK corresponding to uplink transmission via the one or more uplink radio resource. The wireless device may be in an Non-RRC_CONNECTED state. For example, the wireless device resets (e.g., to zero in the case of the up-counter) after or in response to transmit an ACK corresponding to a reception of downlink data packet(s) from the base station (e.g., network) in the Non-RRC_CONNECTED state. For example, the wireless device may not reset after or in response to successful communi-cation while the wireless device in the RRC_CONNECTED state. The base station (e.g., network) may reset the counter based on at least one of followings. The base station (e.g., network) resets (e.g., to zero in the case of the up-counter) after or in response to successful communication between the wireless device and the base station (e.g., network). For example, the base station (e.g., network) resets (e.g., to zero in the case of the up-counter) after or in response to transmitting an ACK corresponding to uplink transmission performed by the wireless device via the one or more uplink radio resource. The wireless device may perform the uplink transmission in the Non-RRC_CONNECTED state. For example, the base station (e.g., network) resets (e.g., to zero in the case of the up-counter) after or in response to receiving, from the wireless device, an ACK corresponding to downlink data packet(s) transmitted to the wireless device while the wireless device in the Non-RRC_CONNECTED state. For example, the base station (e.g., network) may not reset after or in response to successful communication while the wireless device in the RRC_CONNECTED state.

In an example, the one or more configuration parameters may indicate a value of a time alignment timer (TAT) (e.g., example parameter name: TimeAlignmentTimer) for a cell (and/or a cell group comprising the cell) where the one or more uplink radio resources in a Non-RRC_CONNECTED (e.g., RRC_INACTIVE and/or RRC_IDLE) state are configured. The cell group comprising the cell may be referred to as a timing advance group (TAG). The value of the TAT may indicate how long a timing advance offset value is valid and/or is used for adjusting uplink timing for uplink transmission to the cell (and/or cell(s) in the cell group). For example, the value of the TAT may determine how long the wireless device determine the cell (and/or cell(s) belonging to the associated TAG) to be uplink time aligned. The wireless device may determine (or adjust), based on the timing advance offset value, uplink timing for uplink transmission (e.g., PRACH, PUSCH, SRS, and/or PUCCH transmission) on the cell (and/or cells in the cell group). For example, the timing advance offset value may indicate how much (and/or long) the uplink timing for uplink transmission is delayed or advanced for uplink synchronization. For example, the wireless device may run the TAT during a time interval (and/or duration) indicated by the value of the TAT. The wireless device may determine that the timing advance offset value is valid (and/or is used) for adjusting uplink timing for uplink transmission on the cell (or cell(s) in the cell group) while the TAT is running. The wireless device may determine that an uplink from the wireless device to the cell (e.g., base station) is out-of-synchronized, e.g., if the TAT associated with the cell group (e.g., TAG) to which the cell belongs is not running and/or expires. For example, the wireless device may stop to perform uplink transmission(s) on a cell (and/or cell(s) in the cell group), e.g., if the TAT associated with the cell group (e.g., TAG) to which the cell belongs is not running and/or expires. The wireless device may stop uplink transmissions for a cell, e.g., due to the fact that the (e.g., maximum) uplink transmission timing difference between TAGs of the wireless device or the (e.g., maximum) uplink transmission timing difference between TAGs of any MAC entity of the wireless device (e.g., two MAC entities configured for a dual connectivity) is exceeded, the wireless device may determine the TAT associated with the cell as expired. The wireless device may perform a random access preamble (re-)transmission and/or MSG A (re-)transmission, e.g., when the TAT associated with the cell group (e.g., TAG) to which the cell belongs is not running and/or expires. The wireless device may (re-) start the TAT after or in response to receiving a timing advance command that indicates a (new and/or updated) timing advance offset value of the cell (and/or cells in the cell group). The timing advance command may be received as an MAC CE and/or DCI. The timing advance command may indicate a timing advance offset value of a cell where the one or more uplink radio resources in a Non-RRC_CONNECTED (e.g., RRC_INACTIVE and/or RRC_IDLE) state.

The wireless device may (re-)start the time alignment timer after or in response to transition to a Non-RRC_CONNECTED, e.g., if the wireless device receives (and/or is configured with) the one or more uplink radio resources for the Non-RRC_CONNECTED state. For example, the wireless device may (re-)start the time alignment timer after or in response to receiving configuration parameter(s) (e.g., timer value of the time alignment timer) associated with the time alignment timer. The wireless device may (re-)start the time alignment timer after or in response to receiving a timing advance offset value. The wireless device may receive a lower layer control message (e.g., DCI or PDCCH) that indicates the timing advance offset value. The wireless device may receive an MAC layer control message (e.g., MAC CE and/or RAR) that indicates the timing advance offset value. For example, the wireless device may (re-)start the time alignment timer after or in response to receiving a timing advance command MAC control element and/or PDCCH indicating timing advance adjustment. The wireless device may determine that the timing advance offset value is valid at least while the TAT is running. The wireless device may validate a TA value based on one or more validation conditions. The wireless device may (re-)start the time alignment timer after or in response to a determination that the TA is validated. For example, if the TAT has run for a time interval (or duration) indicated by the value of the TAT, the wireless device may determine that the TAT expires. The wireless device may determine that the timing advance offset value is invalid in response to the expiry of the TAT.

Terminologies used in the specification may be interchangeable and/or referred to as one or more different ones. For example, the timing advance value may be referred to as a timing alignment value. For example, the timing advance offset value may be referred to as a timing alignment offset value. For example, the timing alignment timer may be referred to as a time alignment timer, a timing advance timer, and/or a time advance timer. For example, the timing advance group may be referred to as a timing alignment group.

In an example, the one or more configuration parameters may indicate a number of occasions of the one or more uplink radio resources (e.g., an example parameter name: NumOccasions). The number of occasions may indicate that the one or more uplink radio resources is one time use resource (or grant) for a single uplink transmission. The number of occasions may indicate that the one or more uplink radio resources is a plurality of uplink radio resources. The number of occasions may indicate that the one or more uplink radio resources is one or more periodic radio resources.

In an example, the one or more configuration parameters may indicate a time domain resource allocation of the one or more uplink radio resources. For example, the one or more configuration parameters may indicate a periodicity (e.g., example parameter name: Periodicity) of the one or more uplink radio resources in the Non-RRC_CONNECTED state. For example, the one or more configuration parameters may comprise a time offset. The time offset may be a time domain offset with respect to (and/or related to) a time reference. The time reference may be a particular SFN (e.g., of a H-SFN), a particular subframe number, a particular slot number, a particular symbol number, and/or a combination thereof. The time reference may be predefined (e.g., SFN=0 and/or H-SFN=0). The time reference may be a predefined value (e.g., SFN=0 and/or H-SFN=0), e.g., if a field of the time reference is not present in the one or more configuration parameters. For example, the wireless device may receive one or more uplink grant(s), e.g., indicated by the one or more configuration parameters. The one or more uplink grant(s) may indicate the one or more uplink radio resources. The one or more uplink radio resources may start from a symbol (of a slot of an SFN of a H-SFN) indicated by the time offset. The one or more uplink radio resources may occur from the symbol periodically with the periodicity. For example, the wireless device may, e.g., sequentially, determine that an $N^{th}$ uplink grant of the one or more uplink grant(s) occurs in an transmission time interval (TTI, e.g., slot(s), mini-slot(s), symbol(s)) based on the time offset and N*Periodicity. The time offset may be defined in terms of a number of symbols, a number of slots, a number of subframes, a number of SFNs, a number of H-SFNs, and/or a combination thereof. For example, the one or more configuration parameters may comprise a parameter, timeDomain- Offset or the like. For example, timeDomainOffset indicates the time offset that the wireless device received from a base station. For example, the one or more configuration parameters may comprise a parameter, timeReferenceSFN or the like (e.g., a time reference reference defined in terms of SFN(s) and/or H-SFN). For example, timeReferenceSFN indicates an SFN as the time reference used for determination of the time offset of a resource in time domain. For example, the SFN may repeat with a period of 1024 frames. For example, the wireless device may receive, via SFN=3, the one or more configuration parameters indicating timeReferenceSFN=0. For example, timeReferenceSFN=0 may indicate a time reference SFN=0 that is 3 SFNs before the SFN=3. For example, timeReferenceSFN=0 may indicate a time reference SFN=0 that is 1021 SFNs after the SFN=3. For example, the wireless device may determine the closest SFN with the indicated number preceding the reception of the configured grant configuration. For example, in the above example, the wireless device may determine that timeReferenceSFN=0 indicates a time reference SFN=0 that is 3 SFNs before the SFN=3. For example, the wireless device may, e.g., sequentially, determine that the $N^{th}$ uplink grant occurs (and/or the uplink grant recurs) in the symbol for which: [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+N× periodicity) modulo (1024×numberOfSlotsPerFrame×numberOfSymbolsPerSlot). For example, numberOfSlotsPerFrame is a number of slots in a frame. For example, numberOfSymbolsPerSlot, is a number of symbols in a slot. For example, periodicity is a periodicity of the one or more uplink radio resources indicated by the one or more configuration parameters. For example, S is a symbol number (or symbol offset) indicated by the one or more configuration parameters. The determination of the $N^{th}$ uplink grant above may be a case that (pre-)configured grant(s) in FIG. 18A may not require an additional activation message (e.g., DCI, MAC CE, and/or RRC) that activates (and/or initiates) the one or more uplink radio resources (and/or (pre-)configured grant(s)). For example, the wireless device may, e.g., sequentially, determine that the $N^{th}$ uplink grant occurs (and/or the uplink grant recurs) in the symbol for which: [(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity] modulo (1024×numberOfSlotsPerFrame×numberOfSymbolsPerSlot). The determination of the $N^{th}$ uplink grant above may be a case that (pre-)configured grant(s) in FIG. 18B may require an additional activation message (e.g., DCI, MAC CE, and/or RRC) that activates (and/or initiates) the one or more uplink radio resources (and/or (pre-)configured grant(s)). For example, SFNstart time, slotstart time, and symbolstart time are the SFN, slot, and symbol, respectively, at a time the one or more uplink grant(s) was (re-)initiated. For example, SFNstart time, slotstart time, and symbolstart time are the SFN, slot, and symbol, respectively, at a time where the wireless device receives an indication (e.g., DCI) of (re-)initiating (and/or (re-)activating) the one or more uplink grant(s). For example, SFNstart time, slotstart time, and symbolstart time are the SFN, slot, and symbol, respectively, of a transmission opportunity of PUSCH where the one or more uplink grant(s) was (re-)initiated. For example, the transmission opportunity of PUSCH is the first opportunity of PUSCH where the one or more uplink grant(s) was (re-)initiated.

The wireless device may (re-)initiate transmission via one or more uplink radio resources in the Non-RRC_CONNECTED state based on one or more conditions. For example, the wireless device may receive configuration parameter(s) indicating the one or more conditions. For example, the wireless device may determine if a cell, where one or more uplink radio resources in the Non-RRC_CONNECTED state are configured, supports transmission(s) via the one or more uplink radio resources. For example, the wireless device may receive RRC message(s) (e.g., SIB). The RRC message(s) may comprise configuration parameter(s) indicating whether the cell supports transmission(s) via the one or more uplink radio resources. The configuration parameter(s) may indicate which type of transmission is supported (or available) via the one or more uplink radio resources. For example, the type may comprise control plane (CP) transmission and/or user-plane (UP) transmission. The configuration parameter(s) may indicate which type of network, the cell is connected, supports the transmission via the one or more uplink radio resources. Depending on the type of network that the cell is connected, the wireless device may determine whether the transmission via the one or more uplink radio resources is supported in the cell. For example, the type of network may comprise one or more generations in a network system (e.g., 5G core, Evolved Packet Core (EPC), and/or the like) and/or one or more wireless technologies (e.g., Wifi, 5G, Bluetooth, and/or the like). For example, the configuration parameter(s) may indicate which type of spectrum (and/or frequency band) supports the transmission via the one or more uplink radio resources. For example, the type of spectrum may comprise licensed spectrum and/or unlicensed spectrum. For example, the type of spectrum may comprise a CBRS (Citizens Broadband Radio Service) band (e.g., a wideband in 3.5 GHz band). For example, the type of spectrum may comprise a millimeter wave band (e.g., over 30 GHz band). The configuration parameter(s) in the RRC message(s) may indicate a combination of the type of network, the type of spectrum, and/or the type of transmission. For example, parameter(s), cp-PUR-SGC (e.g., the parameter value may be 'true'/'false' or 'enabled'/'disabled'), in the RRC message(s) indicate whether CP transmission using PUR is supported in the cell when connected to 5G core network. For example, parameter(s), cp-PUR-EPC (e.g., the parameter value may be 'true'/'false' or 'enabled'/'disabled'), in the RRC message(s) indicate whether CP transmission using PUR is supported in the cell when connected to EPC. For example, if the RRC message(s) received from a cell indicates cp-PUR-EPC='true' (or 'enabled'), the wireless device determines that the PUR is supported in the cell when connected to EPC.

The wireless device may (re-)initiate transmission via one or more uplink radio resources in the Non-RRC_CONNECTED state based on one or more conditions. For example, the wireless device may (re-)initiate transmission via one or more uplink radio resources in the Non-RRC_CONNECTED state, e.g., if at least one of following conditions are satisfied: the wireless device has a valid configuration of the one or more uplink radio resources; the wireless device has a valid timing advance value; the wireless device triggers to request establishment of an RRC connection; the wireless device triggers to request resumption of an RRC connection; the wireless device has a stored value of a valid security parameter (e.g., nextHopChainingCount provided in the RRCConnectionRelease message with suspend indication during the preceding suspend procedure); the wireless device triggers the establishment or resumption request for mobile originating calls and/or the establishment cause is mo-Data or mo-ExceptionData or delayTolerantAccess; and/or a size of an MAC PDU (e.g., comprising the total UL data) is expected to be smaller than or equal to a transport block size (TBS) configured for PUR.

For example, the wireless device determines, based on one or more validation conditions (e.g., a TAT based validation and/or a measurement based validation), if the wireless device has a valid timing advance value. For example, the wireless device may determine the configuration of the one or more uplink radio resources is valid, e.g., based on configuration parameter(s) of the one or more uplink radio resources indicating a validity of the configuration. For example, the wireless device receives message(s) comprising the configuration parameter(s). the configuration is valid, e.g., if a field, config, in the message(s) is set to setup (e.g., true). For example, the configuration is valid, e.g., if the field, config, is set to release (e.g., false).

The wireless device may determine, based on one or more validation conditions, if a timing advance value is valid or not for transmission via the one or more uplink radio resources in the Non-RRC_CONNECTED state. For example, the one or more validation conditions may comprise a TAT based validation and/or a measurement based validation. The wireless device may determine to apply the configured condition(s) among the one or more validation conditions. For example, the wireless device receives message(s) comprising configuration parameters of a first validation condition (e.g., the TAT based validation) among the one or more validation conditions. The message(s) may not comprise configuration parameters of a second validation condition (e.g., the measurement based validation) among the one or more validation conditions. In this case, the wireless device may determine if the timing advance value is valid or not at least based on the first validation condition. For example, if the message(s) comprising configuration parameters of the first validation condition (e.g., the TAT based validation) and the second validation condition (e.g., the measurement based validation), the wireless device may determine if the timing advance value is valid or not at least based on the first validation condition and the second validation condition.

For example, for the TAT based validation, the wireless device determine a validity of the timing advance value based on a TAT. The wireless device may receive RRC message(s) comprising a value of the TAT. The TAT may be for a cell (and/or a TAG comprising the cell) where one or more uplink radio resources in the Non-RRC_CONNECTED state are configured. The wireless device may determine that the timing advance value for transmission via the one or more uplink radio resources is valid, e.g., if the TAT is running. The wireless device may determine that the validation of the timing advance value for transmission is not at least based on the TAT, e.g., if the value of the TAT is not configured (e.g., the RRC message(s) does not comprise the value of the TAT).

Figure 20:
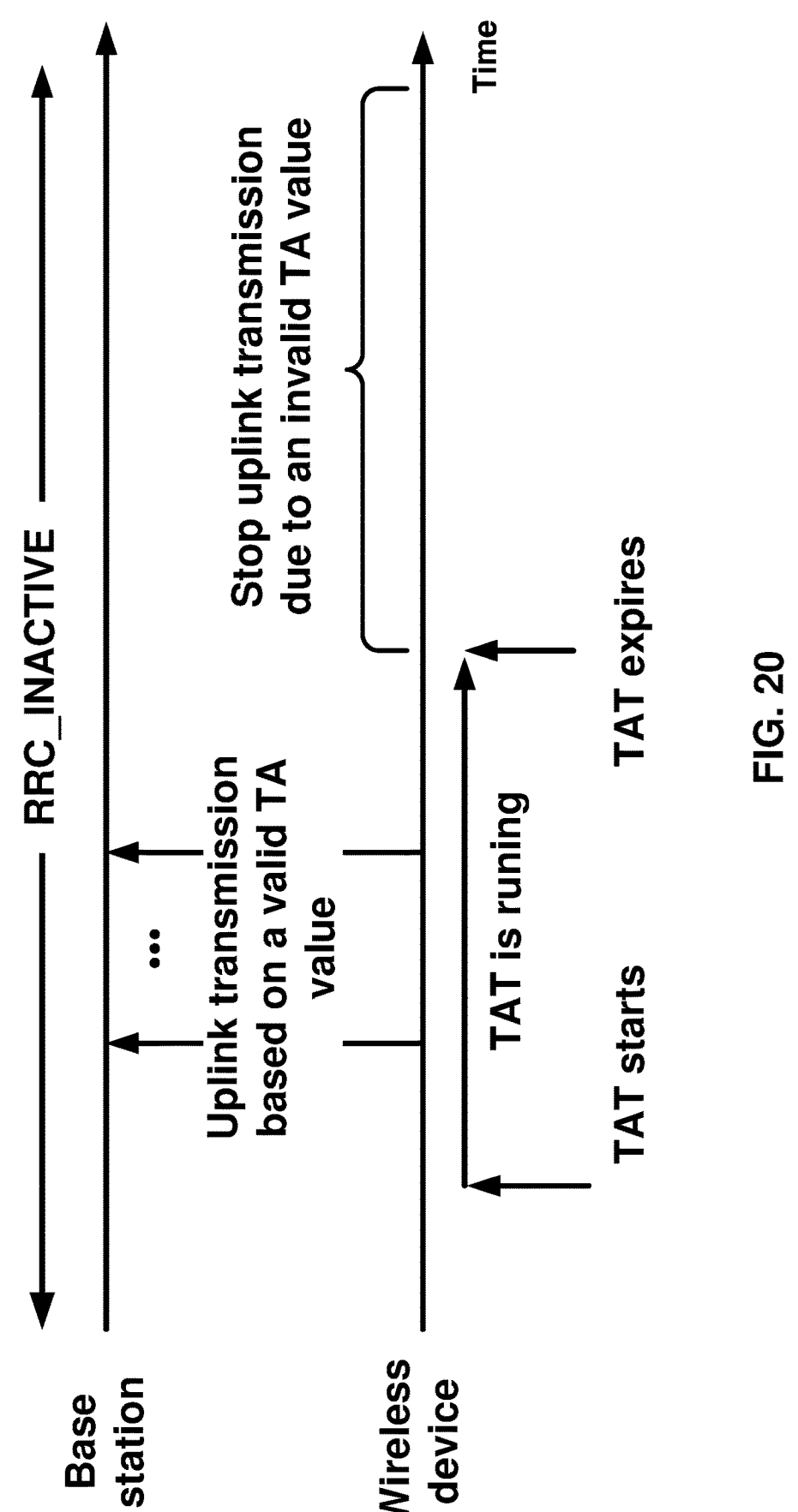
FIG. 20 illustrates an example of one or more data packet transmission(s) in a Non-RRC_CONNECTED (e.g., RRC_INACTIVE and/or an RRC_IDLE) state, according to some embodiments.

FIG. 20 is an example of one or more data packet transmission(s) in a Non-RRC_CONNECTED (e.g., RRC_INACTIVE and/or an RRC_IDLE) state as per an aspect of an embodiment of the present disclosure. The wireless device may receive RRC message(s) comprising configuration parameters of uplink resource(s) in the Non-RRC_CONNECTED state. The uplink resource(s) may be available, scheduled, and/or configured in the Non-RRC_CONNECTED state. The wireless device may transmit uplink packet(s) via one of occasions of the uplink resource(s), e.g., if a TA value for the transmission is validated. The wireless device may determine (e.g., validate) the TA value as valid to be used for one or more data packet transmission(s) in a Non-RRC_CONNECTED state, e.g., if a TAT is running. For example, the wireless device may transmit data via uplink resource(s) in a Non-RRC_CONNECTED state, e.g., if the wireless device may determine (e.g., validate) the TA value as valid and/or if the TAT is running. For example, if the TAT is not running (and/or expires), the wireless device may determine that the TA value is invalid. The wireless device may stop (e.g., is prohibited to perform) uplink transmission via the uplink resource(s).

For example, for the measurement based validation, the wireless device may determine, based on measurement(s) of DL RS(s) of a cell where the one or more uplink radio resources are configured. The DL RS(s) may be SSB(s), CSI-RS(s), cell-specific RS(s), and the like. For example, the wireless device may determine, based on the measured value(s) of DL RS(s), if the timing advance value for transmission via the one or more uplink radio resources is valid. For example, the measured value(s) of the DL RS(s) of the cell may be a cell measurement quantity value (e.g., RSRP, RSRQ, RSSI, and the like). The measured value(s) of the DL RS(s) may be referred to as a serving cell measurement, a measurement quantity of the cell, and/or the like. For example, the wireless device may receive RRC message(s) comprising one or more threshold values. For example, the wireless device may measure a received signal strength of at least one DL RS received from the cell (e.g., TRP), e.g., where the one or more uplink radio resources are configured. The at least one DL RS may comprise a synchronization signal (PSS and/or SSS), CSI-RS, and/or cell-specific RS. For example, the measured value of the received signal strength is an RSRP of the at least one DL RS. For example, the measured value is an RSRQ and/or RSSI (Received Signal Strength Indicator). The wireless device may determine that the timing advance value for transmission via the one or more uplink radio resources is valid, e.g., if the measured value is within a range indicated by the one or more threshold values. For example, the wireless device may determine that the timing advance value for transmission via the one or more uplink radio resources is valid, e.g., if the measured value has not changed more than a range indicated by the one or more threshold values since the wireless device measured a previous DL RS. For example, the wireless device measured the previous DL RS based on measurement configuration(s) that schedule one or more measurements, e.g., independent of resource allocation of the uplink resource(s). For example, the wireless device measured the previous DL RS for the last TA validation that the wireless device performed for the transmission via the one or more uplink radio resources.

The one or more threshold values of the measurement comprise an increase threshold value and/or a decrease threshold value. For example, the increase threshold value and/or the decrease threshold value may indicate the threshold value(s) for change in the measured value of the at least one DL RS in the cell. For example, the increase threshold value and/or the decrease threshold value indicates the range that the wireless device determines the TA value as valid (e.g., to be used for transmission via the one or more uplink radio resources in an Non-RRC_CONNECTED state). For example, the range may indicate a certain area of the cell (e.g., a certain coverage tier in a cell, e.g., center area, cell edge area, etc.), where the TA value is used for transmission via the one or more uplink radio resources in the Non-RRC_CONNECTED state.

The increase threshold value and/or the decrease threshold value may indicate value(s) of thresholds in dBm. For example, the wireless device determines the TA value as valid, e.g., if the measurement of DL RS of the cell is lower than the increase threshold value. For example, the wireless device determines the TA value as valid, e.g., if the measurement of DL RS of the cell is higher than or equal to the decrease threshold value. For example, the wireless device determines the TA value as invalid, e.g., if the measurement of DL RS of the cell is higher than or equal to the increase threshold value, and/or if the measurement of DL RS of the cell is lower than the decrease threshold value.

Figures 21A, 21B:
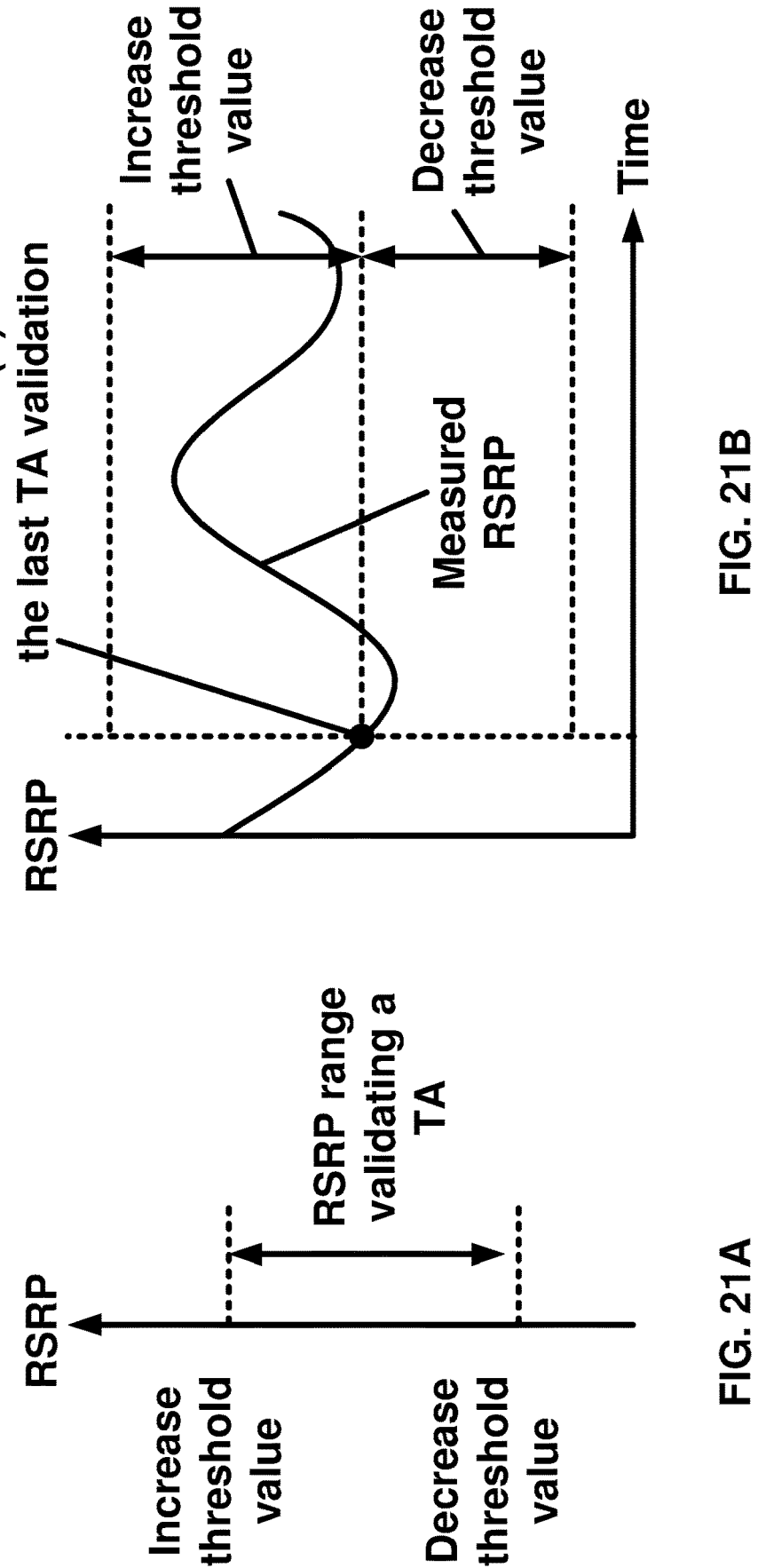
FIG. 21A illustrates an example of TA validation, according to some embodiments.
FIG. 21B illustrates an example of TA validation, according to some embodiments.

FIG. 21A is an example of TA validation as per an aspect of an embodiment of the present disclosure. The wireless device may receive message(s) (e.g., RRC message(s)) comprising an increase threshold value and/or a decrease threshold value. For example, the increase threshold value and/or decrease threshold value may be absolute value(s) of threshold(s) (e.g., in dBm). A TA value may be used for transmission in one or more radio resource(s) in a Non-RRC_CONNECTED state, e.g., if the measurement (e.g., RSRP) is in an RSRP range indicated by the increase threshold value and/or decrease threshold value. For example, if the measurement (e.g., RSRP) is less than the increase threshold value and/or higher than (or equal to) the decrease threshold value, the wireless device may determine that the TA value is valid. For example, if the measurement (e.g., RSRP) is higher than (or equal to) the increase threshold value and/or lower than the decrease threshold value, the wireless device may determine that the TA value is invalid.

The increase threshold value and/or the decrease threshold value may indicate value(s), e.g., in dB for the TA validation. For example, the wireless device determines the TA value as valid, e.g., if the measurement of DL RS of the cell has not increased by more than the increase threshold value. For example, the wireless device determines the TA value as valid, e.g., if the measurement of DL RS of the cell has not decreased by more than the decrease threshold value. For example, the wireless device determines the TA value as invalid, e.g., if the measurement of DL RS of the cell has increased by more than the increase threshold value, and/or if the measurement of DL RS of the cell has decreased by more than the decrease threshold value. The wireless device may determine how much the measurement has changed (e.g., has not increased and/or has not decreased) based on reference measurement(s). For example, the reference measurement(s) are one or more measurements performed for the last TA validation. For example, the last TA validation may be performed by the wireless device for transmission via the one or more uplink radio resources in a Non-RRC_CONNECTED state).

FIG. 21B is an example of TA validation as per an aspect of an embodiment of the present disclosure. The wireless device may receive message(s) (e.g., RRC message(s)) comprising an increase threshold value and/or a decrease threshold value. For example, the increase threshold value and/or decrease threshold value may be value(s) of threshold(s) relative to reference measurement(s) (e.g., in dB). For example, when the wireless device determines whether a TA value is valid to be used for transmission, the wireless device may compare measurement(s) with the reference measurement(s). For example, the wireless device may determine that the TA value is valid, e.g., if the measurement of DL RS of the cell has not increased by more than the increase threshold value, and/or if the measurement of DL RS of the cell has not decreased by more than the decrease threshold value. Otherwise, the wireless device may determine that the TA value is invalid to be used for the transmission via the one or more radio resource(s) in a Non-RRC_CONNECTED state.

Figure 22:
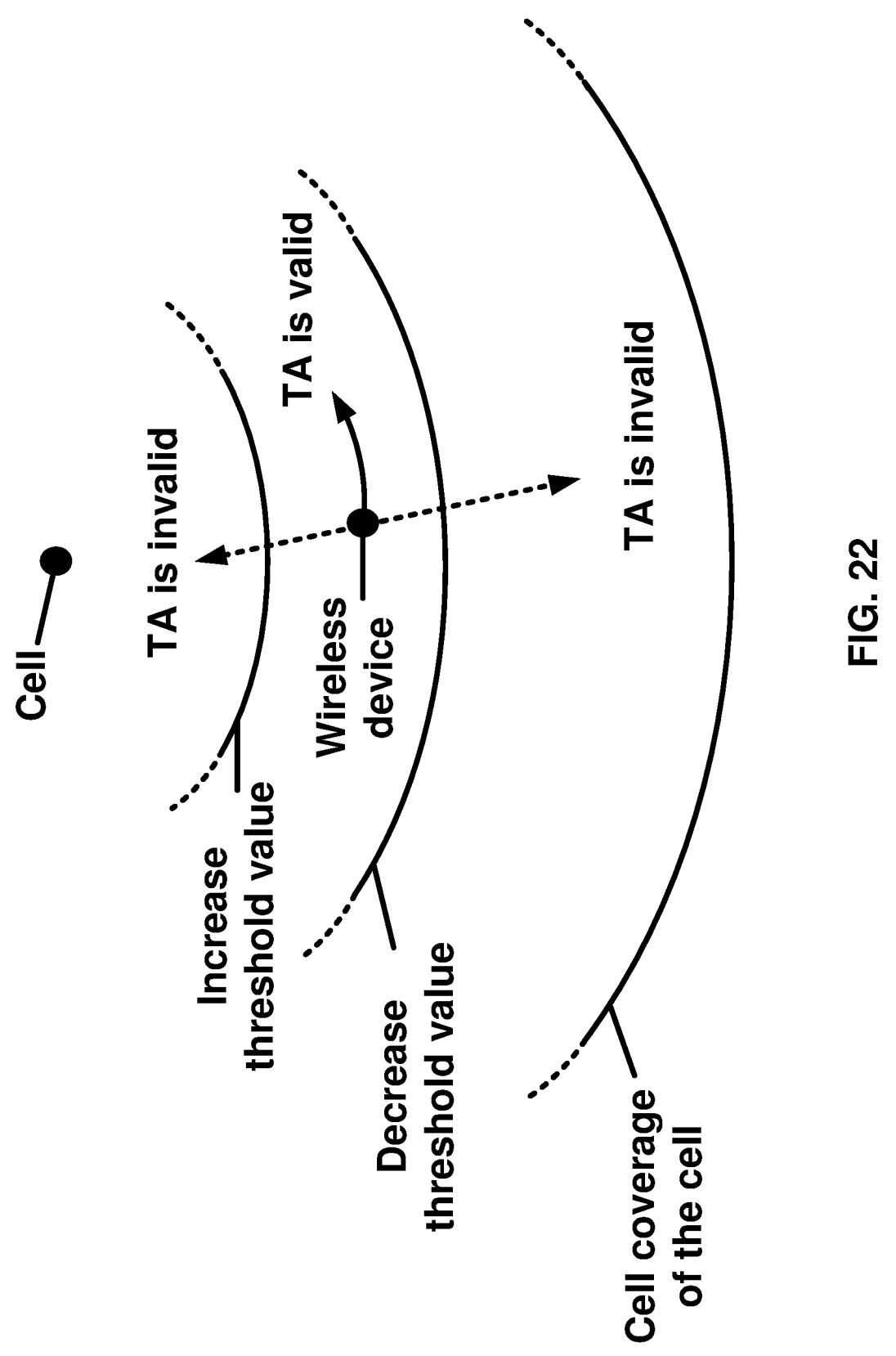
FIG. 22 illustrates an example geographical view of an increase threshold value and/or a decrease threshold value, according to some embodiments.

FIG. 22 is an example geographical view of an increase threshold value and/or a decrease threshold value as per an aspect of an embodiment of the present disclosure. A distance between a cell and a wireless device and a measured value of signal strength (e.g., RSRP) of DL RS transmitted from the cell may have an inverse proportionality. For example, the greater distance between the cell and the wireless device, the smaller the measured value (e.g., RSRP) of DL RS. For example, if the wireless device gets closer to the cell, the measured value may be larger. If the measured value (and/or a change of the measured value) is larger than the increase threshold value, the wireless device may determine that the TA value is invalid to be used for transmission. For example, if the wireless device moves away from the cell, the measured value may become smaller. If the measured value (and/or a change of the measured value) of received signal strength is smaller than the decrease threshold value, the wireless device may determine that the TA value is invalid to be used for transmission. As shown in FIG. 22, the wireless device may determine that the TA value is valid, e.g., if the wireless device moves around while keeping the distance from the cell. For example, in this case, the measured value (and/or a change of the measured value) is larger than or equal to the decrease threshold value and/or smaller than or equal to the increase threshold value.

The wireless device may receive a message comprising the increase threshold value and decrease threshold value. In this case the wireless device may use the increase threshold value and decrease threshold value for the TA validation as disclosed example(s) as per an aspect of embodiment(s) of the present disclosure. The wireless device may receive a message comprising one of the increase threshold value and/or decrease threshold value. In this case, the wireless device may use the one of the increase threshold value and/or decrease threshold value as disclosed example(s) as per an aspect of embodiment(s) of the present disclosure. For example, the wireless device in a cell edge area may receive a message comprising the increase threshold value. For example, the wireless device in a cell center area may receive a message comprising the decrease threshold value. The increase threshold value and decrease threshold value may be absent in the message. For example, the wireless device may receive a message comprising no field value for the increase threshold value and decrease threshold value. In this case, the wireless device may determine that TA validation is not at least based on the measurement(s) (e.g., RSRP, RSRP, and/or RSSI). For example, if the increase threshold value and decrease threshold value are not configured, the TA validation based on change in measurement(s) (e.g., RSRP, RSRP, and/or RSSI) of the cell is not applicable.

After or in response to transmitting data via the one or more uplink radio resources, the wireless device may monitor PDCCH identified by an RNTI during a response window. For example, the wireless device may receive message(s) (e.g., RRC message(s)) indicating the RNTI and/or the size of the response window (e.g., example parameter name: ResponseWindowTimer). The response window may start from a reference time associated with transmitting the data via the one or more uplink radio resources. For example, the reference time may be a transmission time interval (e.g., frame, subframe, slot, and/or symbol) where the wireless device transmits the data via the one or more uplink radio resources. For example, the reference time may comprise the end of the corresponding PUSCH transmission (e.g., the transmission of the data via the one or more uplink radio resources). For example, the reference time may be at the first PDCCH occasion from the end of the corresponding PUSCH transmission (e.g., the transmission of the data via the one or more uplink radio resources). The reference time may further comprise a time offset (e.g., predefined or RRC-configured). For example, the reference time may be the subframe (or slot) that comprise the end of the corresponding PUSCH transmission, plus time offset. For example, the reference time may be the first PDCCH occasion from the end of the corresponding PUSCH transmission, plus time offset.

The wireless device may receive a control message (e.g., DCI) via PDCCH during the time window (e.g., Response-WindowTimer is running). For example, the received control message (e.g., DCI) may be with CRC scrambled by the RNTI that the wireless device receives for transmission via the one or more radio resource(s) in a Non-RRC_CON-NECTED state. The control message (e.g., DCI) may comprise an uplink grant for retransmission of the data. The wireless device may (re-)start the time window (e.g., ResponseWindowTimer) after or in response to receiving the uplink grant. For example, the time window (re-)start at the last slot (subframe, symbol) of a PUSCH transmission corresponding to the retransmission indicated by the uplink grant. For example, the time window (re-)start at the first PDCCH occasion from the end of the PUSCH transmission corresponding to the retransmission indicated by the uplink grant. The control message (e.g., DCI) may indicate acknowledgement (e.g., L1 ACK) for the transmission of the data via the one or more radio resource(s) in the Non-RRC_CONNECTED state. In this case, the wireless device may determine to stop the time window (e.g., Response-WindowTimer), and/or determine that the transmission of the data via the one or more radio resources(s) is successful. The control message (e.g., DCI) may comprise a downlink assignment of PDSCH comprising the MAC PDU. If the wireless device decodes the MAC PDU successfully, the wireless device may determine to stop the time window (e.g., ResponseWindowTimer), and/or determine that the transmission of the data via the one or more radio resources(s) is successful. The control message (e.g., DCI) may indicate a failure of the transmission of the data (e.g., fallback). The wireless device may determine to stop the time window (e.g., ResponseWindowTimer), e.g., after or in response to receiving the control message indicating the failure (e.g., fallback). The wireless device may determine the transmission of the data via the one or more radio resource(s) has failed, e.g., after or in response to receiving the control message indicating the failure (e.g., fallback). The wireless device may initiate a random access procedure, e.g., after or in response to receiving the control message indicating the failure (e.g., fallback). The wireless device may initiate a random access procedure, e.g., after or in response to receiving the control message indicating the failure (e.g., fallback). The wireless device may determine that the time window (e.g., ResponseWindowTimer) expires. the wireless device may determine that the preconfigured uplink grant as skipped, the PUR transmission has failed, after or in response to the expiry of the time window.

A wireless device and/or a base station may use HARQ operation(s) and/or process(es) for one or more retransmissions of uplink transmission in a Non-RRC_CONNECTED state. For example, a wireless device may transmit data packet(s) via one or more uplink radio resources configured for the Non-RRC_CONNECTED state (e.g., as shown in FIG. 17). The wireless device may monitor a PDCCH after or in response to transmitting the data packet(s), e.g., while keeping an RRC state as a Non-RRC_CONNECTED state. The wireless device may receive, via the PDCCH, DCI that may indicate an uplink grant for a retransmission of the data packet(s). The uplink grant may indicate, as an uplink radio resource for the retransmission, one of the one or more uplink radio resources. The uplink grant may indicate, for the retransmission, the uplink radio resource that is independent of (e.g., allocated separately from) the one or more uplink radio resources. The wireless device may receive, e.g., instead of the uplink grant, an indication (e.g., different type of DCI) that indicates to perform an RA procedure. The indication may indicate a failure of the transmission of the data packet(s). The wireless device may transition to the RRC_CONNECTED state, e.g., an RRC connection setup procedure and/or an RRC resume procedure. The wireless device may initiate (or perform) the RRC connection setup procedure and/or the RRC resume procedure based on an RA procedure. The wireless device may initiate the RA procedure based on receiving the indication (e.g., that indicates that the wireless device performs the RA procedure). The wireless device may initiate the RA procedure based on receiving a paging message (e.g., that indicates that the wireless device performs the RA procedure) and/or based on an uplink packet arrival. The one or more uplink radio resources configured for the Non-RRC_CONNECTED state may not be used while the wireless device is in the RRC_CONNECTED state. The wireless device may not transmit (and/or may stop to transmit) a data packet via the one or more uplink radio resources, e.g., if the RRC state is the RRC_CONNECTED state. For example, the wireless device may release (clear, deactivate, suspend, and/or discard) the one or more uplink radio resources configured for the Non-RRC_CONNECTED state and/or uplink grant(s) indicating the one or more uplink radio resources after or in response to the RRC state is transitioned to the RRC CONNECTED state. For example, the wireless device may suspend the one or more uplink radio resources configured for the Non-RRC_CONNECTED state and/or uplink grant(s) indicating the one or more uplink radio resources after or in response to the RRC state is transitioned to the RRC_CONNECTED state.

The wireless device may transmit message(s) (e.g., RRC message(s) such as PURConfigurationRequest) that requests one or more parameters of (pre-)configured grant(s) indicating one or more uplink radio resources in a Non-RRC_CONNECTED state (e.g., RRC_INACTIVE and/or RRC_IDLE). The wireless device may initiate a procedure, e.g., UE-initiated procedure, to transmit the message(s). The wireless device may transmit the message(s) in response to receiving a request from a base station, e.g., B S-initiated procedure. The wireless device may transmit the message(s) while the wireless device is in any of RRC states, RRC_CONNECTED, RRC_INACTIVE, and/or RRC_IDLE. The wireless device may transmit the message(s) while the wireless device is in particular RRC state(s). For example, the wireless device may transmit the message(s) while the wireless device is in the Non-RRC_CONNECTED state. For example, the wireless device may transmit the message(s) while the wireless device is in the RRC_CON-NECTED state. The messages may indicate data traffic information. For example, the messages may indicate a number of occasions of one or more uplink radio resources in the Non-RRC_CONNECTED state, e.g., an example parameter, requestedNumOccasions. For example, the messages may indicate a periodicity of one or more uplink radio resources in the Non-RRC_CONNECTED state, e.g., an example parameter requestedPeriodicity. For example, the messages may indicate a TB size of data packet transmitted via one or more uplink radio resources in the Non-RRC_CONNECTED state, e.g., an example parameter, requestedTBS. For example, the messages may indicate a time offset for one or more uplink radio resources in the Non-RRC_CONNECTED state, e.g., an example parameter, requestedTimeOffset. The wireless device may not receive (e.g., expect to receive) a response to the message(s) from the base station. For example, the wireless device may receive, from the base station, one or more configuration parameters for transmission of uplink data via the one or more uplink radio resources in the Non-RRC_CONNECTED state.

A wireless device may be configured with an operating band of a cell for transmission in a Non-RRC_CONNECTED state. The operating band for the transmission may be a carrier bandwidth. The operating band may comprise a DL band and/or a UL band. The operating band for the transmission may be a BWP. The BWP may comprise a DL BWP (e.g., the DL band) and/or a UL BWP (e.g., the UL band). For example, the wireless device may receive message(s) (e.g., RRC message(s) and/or RRC release message) comprising a configuration of the operating band for transmission/reception with the Non-RRC_CONNECTED state in the cell. The message(s) may indicate the configuration based on the number of RB (or PRB) and a frequency location (e.g., a position of a center frequency). The configuration may indicate a numerology (e.g., subcarrier spacing) used in the operating band. The configuration may indicate separate numerologies (e.g., subcarrier spacings) for the DL band (e.g., DL BWP) and the UL band (e.g., UL BWP). The numerologies (e.g., subcarrier spacings) configured for the DL band (e.g., DL BWP) and the UL band (e.g., UL BWP) may be different or the same.

The message(s) may indicate the location and the range of the operating band (e.g., start, size and/or center frequency and bandwidth, and the like). The location and the range of the operating band (e.g., start, size and/or center frequency and bandwidth, and the like) may be defined in terms of a resource unit (e.g., RB and/or PRB), e.g., as the multiple of the resource unit. The location and the range of the operating band may be at least a part of one carrier of the cell. The message(s) may indicate the location and the range of the operating band based on a frequency offset and a bandwidth with respect to a center frequency of the carrier bandwidth of the cell. The message(s) may indicate the location and the range of the operating band based on the frequency offset and the bandwidth of the operating band with respect to the center frequency at which a synchronization signal detected by the wireless device is located (e.g., initial BWP).

The message(s) may indicate numerology information (e.g., μ and/or subcarrier spacing) used in the operating band. The wireless device may determine the RE structure from the numerology information. the message(s) may comprise configuration parameters of control channel(s) (e.g., PDCCH and/or PUCCH), data channel(s) (e.g., PDSCH and/or PUSCH), and/or reference signals (SSB(s), CSI-RS(s), and/or SRS(s)). The message(s) may indicate the frequency location(s) of the control channel(s), data channel(s), and/or reference signals based on frequency offset(s) with respect to a reference location in the operating band. For example, the reference location may be a start (and/or end) point of a first RB matches a start (and/or end) point of the operating band. For example, the one or more radio resource(s) in a Non-RRC_CONNECTED state may be allocated to the start point (e.g., with a frequency offset from the reference location) with a size defined in terms of the number of RBs (or PRBs). The wireless device may determine the location and/or size of the control channel(s), the data channel(s), and/or the reference signals based on the determined RE structure.

The one or more radio resource(s) in a Non-RRC_CONNECTED state may be allocated in the operating band comprising one or more sub-bands (e.g., BWPs). For example, the one or more radio resource(s) in the Non-RRC_CONNECTED state may be allocated to a particular sub-band in the operating band. For example, the message(s) that the wireless device receives may indicate the operating band comprising one or more sub-bands (e.g., BWPs). The message(s) may indicate one or more sub-bands with separate locations (e.g., in terms of frequency location), separate sizes (e.g., in terms of bandwidth), and/or separate numerology (e.g., subcarrier spacing). The RE structure for configuring the one or more sub-bands and the RE structure for configuring the operating band may be different. The DL band (e.g., DL BWP) and the UL band (e.g., UL BWP) may be configured separately. For example, the DL band and the UL band may have different configuration information, e.g., in terms of the frequency location and the numerology (e.g., subcarrier spacing). For example, the wireless device may receive a DL control message (e.g., DCI via PDCCH) and/or DL data (e.g., transport block via PDSCH) based on the information of the operating band (and/or sub-band) configured in the DL band. The wireless device may transmit a UL control (e.g., PUCCH) and/or UL data (e.g., transport block via PUSCH) based on the information of the operating band (and/or sub-band) configured in the UL band. For example, the one or more radio resource(s) in the Non-RRC_CONNECTED state may be allocated per a sub-band. For example, the frequency location and/or a size of the one or more radio resource(s) may be with respect to the sub-band.

For the transmission via the one or more radio resource(s) in a Non-RRC_CONNECTED state, a base station may transmit message(s) (e.g., RRC message(s)) to a wireless device to configure configuration parameters. The configuration parameters may comprise one or more fields indicating at least one of following: the antenna port(s) to be used for the transmission via one or more radio resource(s) in the Non-RRC_CONNECTED state; DMRS configuration used for the transmission via the one or more radio resource(s) in the Non-RRC_CONNECTED state; a value of the (pre-) configured grant timer (e.g., the (pre-) configured grant timer may be in multiples of periodicity); the frequency domain resource allocation; a frequency hopping configuration (e.g., Intra-slot frequency hopping and/or Inter-slot frequency hopping. If the field is absent, frequency hopping is not configured); frequency hopping offset, e.g., used when frequency hopping is enabled; the MCS table the wireless device may use for PUSCH (e.g., PUSCH with and/or without transform precoding) the transmission via the one or more radio resource(s) in the Non-RRC_CONNECTED state, e.g., if the field is absent the wireless device may determine a predefined MCS (e.g., qam64); The modulation order, code rate and/or TB size of the transmission via the one or more radio resource(s); The number of HARQ processes configured for the transmission via the one or more radio resource(s) in the Non-RRC_CONNECTED state; uplink power control parameter(s) for the transmission via the one or more radio resource(s), e.g., indicator and/or index of closed loop uplink power control, one or more reference power values (e.g., p0) and/or pathloss scaling value (e.g., Alpha); Periodicity of the one or more radio resource(s), e.g., a valid periodicity value may be determined (pre-defined) based on the numerology (e.g., subcarrier spacing), and/or the periodicity may be an absolute time value and/or defined in terms of TTI (symbol, slot, subframe, system frame, and/or any combination thereof); RBG size for PUSCH the transmission via the one or more radio resource(s); a redundancy version (RV) sequence (e.g., [0 2 3 1], [0 3 0 3]) for the transmission via the one or more radio resource(s); a number of repetitions of the transmission via the one or more radio resource(s); activation type indicator indicating whether an additional activation message (e.g., DCI, MAC CE, and/or RRC) is required to activate the one or more radio resource(s) (e.g., FIG. 18A and FIG. 18B); SRS resource indicator indicating the SRS resource to be used; time domain allocation indicating a start symbol (e.g., stat symbol number (or symbol offset) S used to determine that the Nth uplink grant) and length L (e.g., the value of the time domain allocation may be a combination of start symbol and length); PUSCH mapping type of the transmission via the one or more radio resource(s); a time domain offset defined with respect to a time reference (e.g., SFN=0 and/or timeReferenceSFN); an indicator indicating whether a beta offset value is configured dynamically or semi-statically, wherein the beta offset value is used to determine an uplink power of and/or UCI multiplexing of the PUSCH transmission via the one or more radio resource(s).

The one or more radio resource(s) may be configured with a particular BWP. For example, the wireless device may receive message(s) (e.g., RRC message(s)) comprising configuration parameters of the particular BWP. The particular BWP may comprise DL BWP and/or UL BWP. The configuration parameters may indicate a numerology (e.g., subcarrier spacing) used in the particular BWP. The configuration parameters may indicate a numerology applied to the DL BWP and/or the UL BWP. The configuration parameters may comprise separate fields and/or indicators indicating numerologies, each used in DL BWP and/or UL BWP. The numerologies used in DL BWP and/or UL BWP may be the same or different. The configuration parameters may indicate radio resource configuration parameters of DL and/or UL control channel (e.g., PDCCH and/or PUCCH) used for transmission via the one or more radio resource(s). The configuration parameters may radio resource configuration parameters of DL and/or UL data channel (e.g., PDSCH and/or PUSCH) used for transmission via the one or more radio resource(s). The DL control and/or data channels (e.g., PDCCH and/or PDSCH) may be configured within the DL BWP. The UL control and/or data channels (e.g., PUCCH and/or PUSCH) may be configured within the UL BWP.

The particular BWP may be an initial BWP. For example, the DL BWP of the particular BWP may be an initial DL BWP. For example, the UL BWP of the particular BWP may be an initial UL BWP. The particular BWP may be configured separately from the initial BWP. For example, the DL BWP of the particular BWP may be different form the initial DL BWP. For example, the UL BWP of the particular BWP may be different from initial UL BWP. For example, the one or more radio resource(s) may be associated with a DL BWP and/or a UL BWP. For example, PDCCH (e.g., ACK, NACK, and/or fallback response(s) to the transmission via the one or more radio resource(s)) and/or PDSCH (e.g., RRC response to the RRC message transmitted via the one or more radio resource(s)) related to the transmission via the one or more radio resource(s) may be configured with the DL BWP. For example, PUCCH (e.g., ACK and/or NACK response to the PDSCH) and/or PUSCH (e.g., data via the one or more radio resource(s)) related to the transmission via the one or more radio resource(s) may be configured with the UL BWP. The wireless device may determine that the particular BWP (e.g., DL BWP and/or UL BWP) is the initial BWP (e.g., initial DL BWP and/or initial UL BWP, respectively), e.g., if field(s) indicating the configuration (e.g., frequency location, bandwidth, and/or numerology (e.g., subcarrier spacing)) of the particular BWP, e.g., that is different from the initial BWP, are absent in the configuration parameters indicating the one or more radio resource(s).

The particular BWP may be a last BWP that the wireless device used in RRC_CONNECTED. For example, the DL BWP of the particular BWP may be a last DL BWP that the wireless device used in an RRC_CONNECTED state. For example, the UL BWP of the particular BWP may be a last UL BWP that the wireless device used in RRC_CONNECTED. For example, the wireless device may transition to a Non-RRC_CONNECTED (e.g., RRC_INACTIVE and/or RRC_IDLE) state from the RRC_CONNECTED state. The BWP (e.g., the last DL BWP and/or the last UL BWP) that the wireless device uses in the RRC_CONNECTED state may be used in the transitioned the Non-RRC_CONNECTED state. The wireless device may determine that the particular BWP (e.g., DL BWP and/or UL BWP) is the BWP (e.g., the last DL BWP and/or the last UL BWP, respectively), e.g., if field(s) indicating the configuration (e.g., frequency location, bandwidth, and/or numerology (e.g., subcarrier spacing)) of the particular BWP, e.g., that is different from the last BWP, are absent in the configuration parameters indicating the one or more radio resource(s).

The particular BWP may be configured separately from the initial BWP. For example, the DL BWP of the particular BWP may be different form the initial DL BWP. For example, the UL BWP of the particular BWP may be different from initial UL BWP. For example, the one or more radio resource(s) may be associated with a DL BWP and/or a UL BWP. For example, PDCCH (e.g., ACK, NACK, and/or fallback response(s) to the transmission via the one or more radio resource(s)) and/or PDSCH (e.g., RRC response to the RRC message transmitted via the one or more radio resource(s)) related to the transmission via the one or more radio resource(s) may be configured with the DL BWP. For example, PUCCH (e.g., ACK and/or NACK response to the PDSCH) and/or PUSCH (e.g., data via the one or more radio resource(s)) related to the transmission via the one or more radio resource(s) may be configured with the UL BWP.

FIG. 23 is an example of one or more radio resource(s) in a BWP (e.g., DL BWP and/or UL BWP) as per an aspect of an embodiment of the present disclosure. The wireless device may receive message(s) (e.g., broadcast message(s) and/or wireless device specific RRC message) comprising configuration parameters of an initial BWP (e.g., initial DL BWP and/or initial UL BWP). The initial BWP may be for a cell search and/or an initial/random access. For example, the wireless device may receive SSB(s) (e.g., cell-defining SSB) via the initial DL BWP. For example, the wireless device may perform a random access procedure via the initial BWP. For example, the wireless device may transmit Msg1, Msg3 and/or Msg A via the initial UL BWP. The wireless device may receive Msg2, Msg4 and/or Msg B via the initial DL BWP. The one or more radio resource(s) configured for transmission in Non-RRC_CONNECTED may be configured in a BWP different from the initial BWP. The BWP may be a last BWP that the wireless device uses in the RRC_CONNECTED state (e.g., before transitioning to the Non-RRC_CONNECTED state). The BWP may be for transmission and/or reception for the wireless device in Non-RRC_CONNECTED. The one or more radio resource(s) for the transmission may be configured in the UL BWP of the BWP. The PDCCH and/or PDSCH may be configured in the DL BWP of the BWP. The wireless device may deactivate the BWP, e.g., if an RRC state of the wireless device changes (e.g., to the RRC_CONNECTED state). The one or more radio resource(s) and/or PUCCH associated with the transmission in the Non-RRC_CONNECTED state may be configured in an initial UL BWP. The PDCCH and/or PDSCH associated with the transmission in the Non-RRC_CONNECTED state may be configured in an initial DL BWP. The message(s) may indicate whether the BWP is configured separately from the initial BWP.

A wireless device may perform, with a base station, a downlink and/or uplink beam management in the Non-RRC_CONNECTED state. The downlink and/or uplink beam management may comprise a downlink and/or uplink beam measurement procedure, (re-) configuration of one or more beams, a beam activation of the one or more beams, a beam selection among the one or more beams. The downlink and/or uplink beam management may comprise a beam failure detection and/or beam failure recovery procedure.

An indicator of a reference signal in the downlink and/or uplink beam management may indicate a beam (e.g., TX beam and/or RX beam of the wireless device) to use in a Non-RRC_CONNECTED state. For example, a wireless device may receive message(s) (e.g., RRC message(s)) comprising configuration parameters of one or more radio resource(s) in the Non-RRC_CONNECTED state. The configuration parameters may indicate one or more reference signals. The one or more reference signals may comprise an SSB identified by an SSB index/identifier, a CSI-RS identified by a CSI-RS index/identifier (and/or CSI-RS resource index/identifier). The one or more reference signals may comprise an SRS identified by an SRS index/identifier (e.g., SRS resource index/identifier, SRS resource set index/identifier, and/or a combination thereof). The reference signal may represent and/or indicate a particular beam. For example, the SSB may represent and/or indicate a wide beam. For example, the CSI-RS may represent and/or indicate a narrow beam. For example, the SRS may represent and/or indicate a TX beam of the wireless device.

The configuration parameters in the message(s) may comprise indicator(s) indicating which reference signal(s) are associated with which transmission (e.g., PUSCH, PUCCH, and/or SRS) and/or reception (e.g., PDCCH and/or PDSCH). A reference signal may be configured for radio link monitor, radio link recovery, and/or transmission and/or reception in an Non-RRC_CONNECTED state.

For example, the configuration parameters may comprise indicator(s) indicating which reference signal(s) are associated with data reception (e.g., PDSCH) and/or control signal (e.g., PDCCH) reception in a Non-RRC_CONNECTED state. For example, the data and/or the control signal may be associated with the transmission via the one or more radio resource(s) in the Non-RRC_CONNECTED state. For example, the reception may be for receiving a response (e.g., RRC response via PDSCH and/or L1 ACK/NACK/fallback via PDCCH) to the transmission. For example, the indicator(s) may parameter(s) for configuring a QCL relationship between one or more DL reference signals (e.g., SSBs and/or CSI-RSs) and the DM-RS ports of the PDSCH, the DM-RS port of PDCCH, and/or the CSI-RS port(s) of a CSI-RS resource. The parameter(s) may comprise one or more TCI states. Each of the one or more TCI state may comprise at least one of following: one or more DL RS(s) (e.g., SSB(s), CSI-RS(s), any combination thereof), cell index/identifier, BWP index/identifier, and/or QCL relationship type (e.g., the one or more large-scale properties). For example, the indicator(s) may be a TCI state of a particular channel configuration (e.g., PDSCH, PDCCH (e.g., CORE-SET)). For example, the PDSCH and/or PDCCH (e.g., CORESET) configuration may comprise at least one of the one or more TCI states. For example, a TCI state of PDSCH may indicate a QCL relationship between one or more DL reference signals (e.g., SSBs and/or CSI-RSs) and the DM-RS ports of the PDSCH. The wireless device may determine RX beam(s) used to receive data via the PDSCH based on the TCI state (e.g., QCL relationship of the TCI state). For example, a TCI state of PDCCH may indicate a QCL relationship between one or more DL reference signals (e.g., SSBs and/or CSI-RSs) and the DM-RS ports of the PDCCH. The wireless device may determine RX beam(s) used to receive control signal(s) via the PDCCH based on the TCI state (e.g., QCL relationship of the TCI state).

A wireless device may receive one or more message(s) that (re-)configures, updates, and/or activates the TCI state(s) of PDSCH and/or PDCCH (e.g., CORESET). For example, a first control message (e.g., an RRC message) that the wireless device receives may indicate at least one TCI state to be used for the PDSCH and/or PDCCH (e.g., CORESET). For example, a first control message (e.g., an RRC message) that the wireless device receives may indicate one or more TCI states. A second control message (e.g., another RRC message, a DCI and/or MAC CE) that the wireless device receives may indicate at least one of the one or more TCI states to be used for the PDSCH and/or PDCCH (e.g., CORESET). For example, a first control message (e.g., an RRC message) that the wireless device receives may indicate one or more TCI states. A second control message (e.g., an RRC message, MAC CE, and/or DCI) that the wireless device receives may indicate (or activate) at least first one of the one or more TCI states. A third control message (e.g., an RRC message, MAC CE, and/or DCI) that the wireless device receives may indicate at least second one of the at least first one of the one or more TCI states to be used for the PDSCH and/or PDCCH (e.g., CORESET).

The wireless device may receive the configuration parameters comprising indicator(s) indicating which reference signal(s) are associated with the data (e.g., PUSCH) and/or control signal (e.g., PUCCH) transmission associated with the transmission via the one or more radio resource(s).

For example, the indicator(s) may comprise a spatial relation information. The spatial relation information may be for transmission(s) via PUSCH, PUCCH, and/or SRS. The wireless device may determine (e.g., identify) a particular spatial relation information based an index and/or identifier of the particular spatial relation information. The spatial relation information may indicate at least one of following: cell index/identifier, one or more DL RSs (e.g., SSB(s), CSI-RS(s), and/or any combination thereof), SRS resource index/identifier, BWP index/identifier, pathloss reference RS index/identifier, and/or power control parameter(s). The wireless device may determine antenna ports and/or precoder used for transmission(s) via PUSCH and/or PUCCH based on the spatial relation information.

For example, the indicator(s) may be the spatial relation information of a particular channel configuration (e.g., srs-spatial-relation-information for PUSCH and/or pucch-spatial-relation-information of PUCCH). For example, the PUSCH configuration may comprise at least one spatial relation information. For example, the PUCCH configuration may comprise at least one spatial relation information. The spatial relation information of the PUSCH may be different from the one of the PUCCH. The spatial relation information of the PUSCH may be the same as the one of the PUCCH. The spatial relation information(s) of the PUSCH and PUCCH may be configured separately and/or independently. There may be one or more spatial relation information(s) applied to (and/or used for) the PUSCH and the PUCCH.

The wireless device may determine antenna ports and/or precoder used for the PUSCH based on the spatial relation information of the PUSCH. For example, the wireless device receives message(s) comprising configuration parameters of transmission via one or more radio resource(s) in a Non-RRC_CONNECTED state. The configuration parameters (e.g., SRS resource indicator) may indicate an SRS resource of an SRS resource set. The SRS resource may comprise spatial relation information. The wireless device may determine, for the transmission via the one or more radio resource(s), to use the same antenna port(s) as the SRS port(s) of the SRS resource. The wireless device may transmit, based on the determination, data via the one or more radio resource(s) using the same antenna port(s).

For example, the wireless device may determine antenna ports and/or precoder used for the PUCCH based on the spatial relation information of the PUCCH. For example, the wireless device receives message(s) comprising configuration parameters of PUCCH in a Non-RRC_CONNECTED state. The wireless device may transmit uplink control signal(s) via the PUCCH for HARQ feedback (e.g., ACK or NACK) to PDSCH in the Non-RRC_CONNECTED state, for SR transmission(s), and/or measurement report(s). The configuration parameters (e.g., PUCCH spatial relation information) may indicate the spatial setting (e.g., precoder and/or spatial domain filter) for PUCCH transmission and the parameters for PUCCH power control. The wireless device may determine, for the PUCCH transmission in the Non-RRC_CONNECTED state, a spatial domain filter used for a reception of a DL RS indicated by the spatial relation information. For example, if the spatial relation information for the PUCCH comprises an SSB index/identifier of an SSB, the wireless device may transmit the PUCCH using a same spatial domain filter as for a reception of the SSB for a cell. For example, if the spatial relation information for the PUCCH comprises a CSI-RS index/identifier (e.g., NZP-CSI-RS resource index/identifier) of a CSI-RS, the wireless device may transmit the PUCCH using a same spatial domain filter as for a reception of the CSI-RS for a cell. For example, if the spatial relation information for the PUCCH comprises an SRS index/identifier of an SRS (e.g., SRS resource), the wireless device may transmit the PUCCH using a same spatial domain filter as for a transmission of the SRS for a cell and/or UL BWP.

A wireless device may receive one or more message(s) that (re-)configures, updates, and/or activates the spatial relation information of PUSCH, PUCCH, and/or SRS. For example, a first control message (e.g., an RRC message) that the wireless device receives may indicate at least one spatial relation information to be used for the PUSCH, PUCCH, and/or SRS. For example, a first control message (e.g., an RRC message) that the wireless device receives may indicate one or more spatial relation information(s). A second control message (e.g., another RRC message, a DCI and/or MAC CE) that the wireless device receives may indicate at least one of the one or more spatial relation information(s) to be used for the PUSCH, PUCCH, and/or SRS. For example, a first control message (e.g., an RRC message) that the wireless device receives may indicate one or more spatial relation information(s). A second control message (e.g., an RRC message, MAC CE, and/or DCI) that the wireless device receives may indicate (or activate) at least first one of the one or more spatial relation information(s). A third control message (e.g., an RRC message, MAC CE, and/or DCI) that the wireless device receives may indicate at least second one of the at least first one of the one or more spatial relation information(s) to be used for the PUSCH, PUCCH, and/or SRS.

Figure 24:
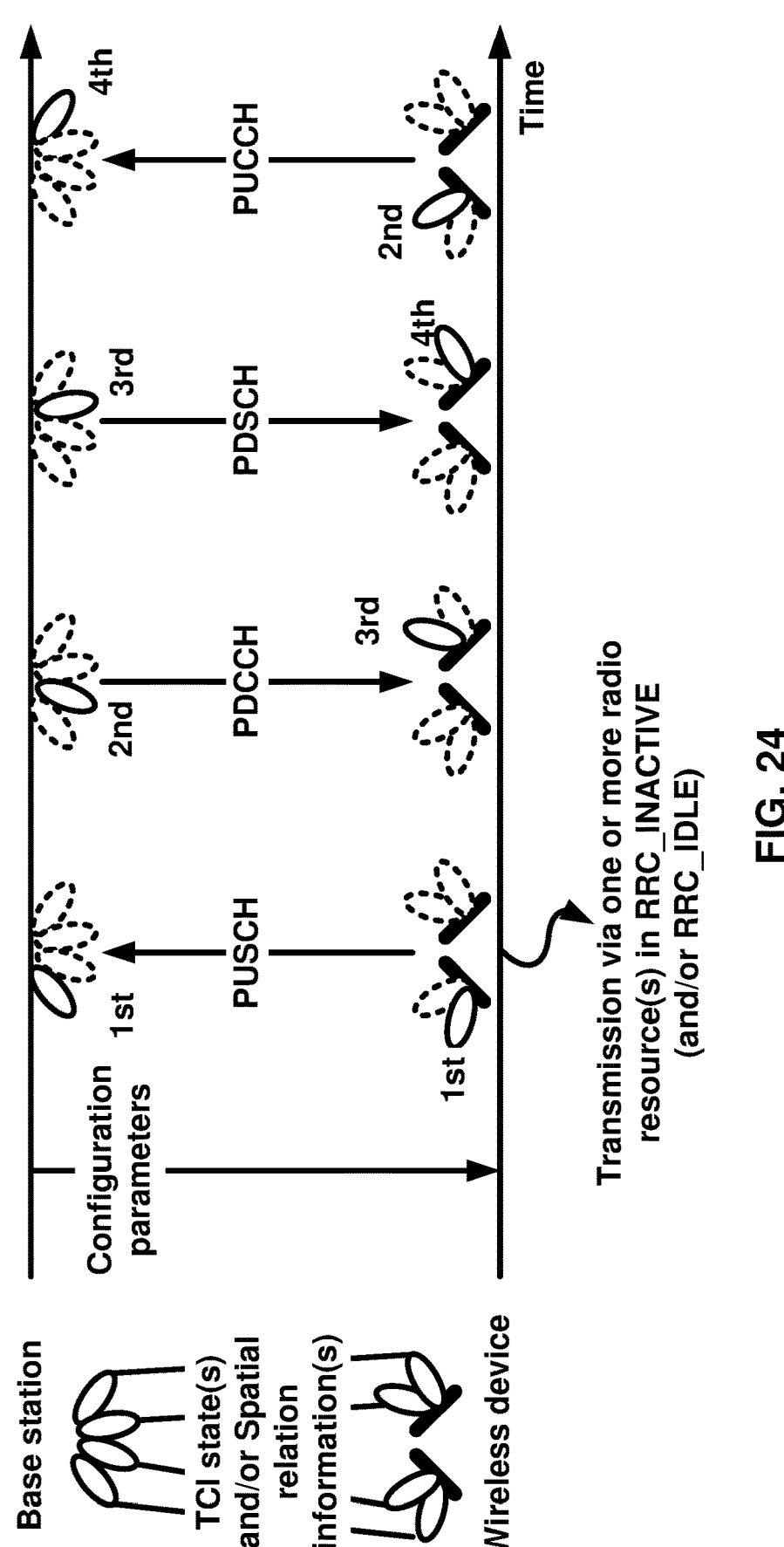
FIG. 24 illustrates an example of beam management for transmission and/or reception in a Non-RRC_CONNECTED state, according to some embodiments.

FIG. 24 is an example of beam management for transmission and/or reception in an Non-RRC_CONNECTED state as per an aspect of an embodiment of the present disclosure. The wireless device may receive message(s) comprising configuration parameters of transmission/reception in the Non-RRC_CONNECTED state. The configuration parameters may indicate configurations of radio resources of PUSCH, PDCCH, PDSCH, and/or PUCCH used in the Non-RRC_CONNECTED state. The configuration parameters may indicate one or more radio resource(s) for uplink transmission (e.g., via PUSCH) in the Non-RRC_CONNECTED state. The configuration parameters may indicate which beam(s) (e.g., reference signal(s)) are used to transmit (e.g., via PUSCH and/or PUCCH) or receive (e.g., via PDSCH and/or PDCCH) in the Non-RRC_CONNECTED state. For example, in FIG. 24, the wireless device transmits, using the 1st beam, data via one or more radio resource(s) in the Non-RRC_CONNECTED state. The wireless device may start to monitor PDCCH using the 3rd beam. The wireless device may receive, via the PDCCH, DCI that comprise downlink assignment of PDSCH. The wireless device may receive the PDSCH using the 4th beam. The wireless device may transmit, via PUCCH, an HARQ feedback (e.g., ACK or NACK) using the 2nd beam. The base station may receive or transmit data using different beams and/or a same beam, e.g., the 1st beam for PUSCH reception, the 2nd beam for PDCCH transmission, the 3rd beam for PDSCH transmission, and/or the 4th beam for PUCCH reception. The wireless device may receive second message(s) (e.g., RRC message, MAC CE, DCI, and/or a combination thereof) reconfigure, change, activate/deactivate, and/or update the beam configuration of the PUSCH, PDCCH, PDSCH, and/or PUCCH.

In multi-beam operations, a cell may transmit a plurality of DL RSs (e.g., a plurality of SSBs, CSI/RS, and/or the like), e.g., using a plurality of beams (e.g., TX beams of the cell). One or more radio resources in a Non-RRC_CONNECTED state that are configured in the cell may be configured with a plurality of beams. For example, channel(s) (e.g., the PDCCH, PDSCH, PUSCH and/or PUCCH) for transmission and/or reception in the Non-RRC_CONNECTED state may be associated with a first beam of the plurality of the beams. For example, a wireless device may receive message(s) (e.g., RRC message, MAC CE, DCI, and/or any combination thereof) comprising radio resource configuration parameters indicating the association between the channel(s) and the first beam. For example, the radio resource configuration parameters may indicate that a beam configuration (e.g., TCI and/or spatial relation information) of the channel(s) comprises a first DL RS of the plurality of DL RSs. The first DL RS may represent and/or indicate the first beam (e.g., as shown in FIG. 24). For example, one of the plurality of DL RS may be associated with one or more channels (e.g., the PDCCH, PDSCH, PUSCH, and/or PUCCH). The wireless device may determine, based on the association, antenna port(s) and/or precoder (e.g., spatial domain filter) to be used for the transmission and/or the reception performed via the channel(s). For example, the wireless device may determine the antenna port(s) and/or the precoder (e.g., spatial domain filter) based on one(s) that used for receiving the first DL RS.

A wireless device may perform, with a base station, beam failure detection and/or beam failure recovery procedures in the Non-RRC_CONNECTED state. In the present disclosure, beam failure detection and/or beam failure recovery procedures may be referred to as radio link monitoring and/or link recovery procedures. For example, the wireless device determines the beam failure detection via the radio link monitoring procedure. The wireless device may perform the beam failure recovery procedure to determine a better beam as the link recovery procedure. A cell that the wireless device performs the beam failure detection and/or beam failure recovery procedures may be the one where the wireless device is configured with one or more uplink radio resources in the Non-RRC_CONNECTED state In an example, a wireless device may receive message(s) (e.g., RRC message(s)) comprising configuration parameters of one or more radio resource(s) of a cell in the Non-RRC_CONNECTED state. The configuration parameters may indicate one or more reference signals of the cell. The one or more reference signals may comprise an SSB identified by an SSB index/identifier, a CSI-RS identified by a CSI-RS index/identifier (and/or CSI-RS resource index/identifier). The one or more reference signals may comprise an SRS identified by an SRS index/identifier (e.g., SRS resource index/identifier, SRS resource set index/identifier, and/or a combination thereof). The reference signal may indicate a particular beam used for the beam failure detection and/or beam failure recovery procedures of the cell. For example, the SSB may represent and/or indicate a wide beam of the cell. For example, the CSI-RS may represent and/or indicate a narrow beam of the cell. For example, the SRS may represent and/or indicate a TX beam of the wireless device. A wireless device may determine a reference signal associated with a particular channel as the one used for the beam failure detection and/or beam failure recovery procedures. The particular channel may be a PDCCH of the cell. The particular channel may be one or more uplink radio resources (e.g., PUSCH) used for uplink transmission in a Non-RRC-CONNECTED state.

The configuration parameters in the message(s) may comprise indicator(s) indicating which reference signal(s) are associated with radio link monitoring (e.g., beam failure detection procedure) of the cell and/or link recovery (e.g., beam failure recovery procedure) of the cell. For example, the radio link monitoring and/or link recovery may be for transmission and/or reception performed in the Non-RRC_CONNECTED state. A reference signal configured for the radio link monitoring may be referred to as a radio link monitoring RS and/or beam failure detection resource (or DL RS). For example, the wireless device may determine a beam failure detection of the cell based on monitoring (and/or measuring) a beam measurement quantity (e.g., RSRP, RSRQ, RSSI, BLER, and/or the like) of the reference signal configured for the radio link monitoring. The reference signal may be configured for the radio link recovery. The reference signal configured for the radio link recovery may be referred to as a candidate beam RS and/or resource. For example, the wireless device may select one of reference signals configured for the radio link recovery as a candidate beam to recover. The wireless device may determine the one of the reference signals based on beam measurement quantities (e.g., RSRP, RSRQ, RSSI, BLER, and/or the like) of the reference signals configured for the radio link recovery.

A wireless device may perform a beam failure detection procedure, e.g., after or in response to receiving RRC message(s) (e.g., RRC release message) comprising configuration parameters of the beam failure detection procedure of a cell. The wireless device may determine, based on the beam failure detection procedure, whether current beam(s) (e.g., DL RS(s)) used for at least one of transmission(s) and/or reception(s) of the cell are in a normal condition or not. It may be referred to as a beam failure if the current beam(s) are not in a normal condition. In an example, a wireless device may detect and/or determine the beam failure on at least one configured beam (e.g., DL RS) of the cell. For example, the at least one configured beam (e.g., DL RS) may be used for transmission (e.g., PUSCH and/or PUCCH) via one or more uplink radio resources of the cell in the Non-RRC_CONNECTED state. For example, the at least one configured beam (e.g., DL RS) may be used for reception via PDCCH and/or PDSCH the cell in the Non-RRC_CONNECTED state. For example, it may be referred to as at least one configured beam (e.g., DL RS) being failed. It may be referred to as a beam failure detection on the at least one configured beam if the wireless device may detect and/or determine a beam failure on at least one configured beam. A wireless device may determine the beam failure on the at least one configured beam based on a beam failure instance. For example, the wireless device may trigger and/or determine the beam failure instance based on a beam measurement quantity of the at least one configured beam. For example, the beam measurement quantity may be RSRP, RSRQ, and/or BLER of the at least one configured beam (e.g., the DL RS). For example, the wireless device may trigger, detect, and/or determine the beam failure instance on at least one configured beam (e.g., DL RS), e.g., if a beam measurement quantity value (e.g., an RSRP value and/or RSRQ value) of the at least one configured beam is lower than a threshold value. For example, the wireless device may trigger, detect, and/or determine the beam failure instance on at least one configured beam (e.g., DL RS), e.g., if a beam measurement quantity value (e.g., a BLER value) of the at least one configured beam is lower than a threshold value.

The at least one beam (e.g. DL RS) may be a configured beam for the beam failure detection of the cell. The at least one beam may be indicated by an identifier of a DL RS of the cell. For example, the DL RS may be a radio link monitoring RS configured by an RRC message that the wireless device receives from a base station (e.g., via the cell). For example, the DL RS may be an SSB and/or CSI-RS of the cell. For example, a wireless device may receive message(s) configuring the at least one beam for the beam failure detection and/or recovery procedures. The message(s) may indicate configuration parameters of the DL RS. For example, the configuration parameters may indicate a periodicity of the DL RS, a time offset, time domain allocation within a physical resource block (e.g., first OFDM symbol in time domain), frequency domain allocation (e.g., frequency domain allocation within a physical resource block, frequency band, and/or the like) of the DL RS, a reference power and/or a power offset of transmission of the DL RS. The DL RS may be DL BWP specific of the cell. The DL RS may be cell-specific. The wireless device may monitor the DL RS and/or determine the beam failure instance based on the configuration parameters.

A wireless device may trigger, detect, and/or determine a beam failure of a cell based on counting beam failure instance(s). For example, lower layer(s) (e.g., a physical layer) of the wireless device may send an indication of a beam failure instance to a higher layer (e.g., the MAC entity) of the wireless device. The indication may be referred to as a beam failure instance indication. The wireless device may determine to perform a beam failure recovery procedure, e.g., if a number of beam failure instance indications that the wireless device counts is larger than or equal to a counter threshold value (e.g., a beam failure instance max-count). For example, the wireless device may determine to perform and/or trigger the beam failure recovery procedure for the cell, e.g., if the wireless device determines at least one beam failure instance (e.g., higher layer such as MAC entity receives at least one beam failure instance indication from lower layer(s)).

In example embodiment(s), the wireless device may count the number of beam failure instance indications based on a timer (e.g., beam Failure Detection Timer). The wireless device may (re-)start the timer, e.g., if the number of beam failure instance indications increases by one. The wireless device may run the timer during a time interval. For example, the time interval may be a value of the timer (e.g., the beam failure detection timer). The wireless device may determine that the timer expires, e.g., if the timer runs for the time interval. The running time of the timer during the time interval may be continuous. The running time of the timer during the time interval may be non-continuous. For example, the wireless device may stop (and/or pause) the timer and run the timer one or more times. The value of the timer and/or the time interval may be predefined and/or semi-statically configured by an RRC message. For example, if an MAC entity of the wireless device receives a beam failure instance indication from lower layer(s) of the wireless device, the wireless device may increment a value of a counter (e.g., the BFI counter) by one and/or (re-)start the timer. The wireless device may determine whether the value of the counter is larger than or equal to a threshold value, e.g., when the wireless device increment the value of the counter. The wireless device may determine to perform a beam failure recovery procedure, e.g., if the value of the counter is larger than or equal to the threshold value. The beam failure recovery procedure may be triggered (determined by the wireless device), e.g., while the timer is running. The wireless device may (re-)set the value of the counter to an initial value (e.g., zero), e.g., if the timer expires. The wireless device may (re-)set the value of the counter to an initial value (e.g., zero), e.g., if the beam failure recovery procedure successfully completes. The wireless device may (re-)set the value of the counter to an initial value (e.g., zero), e.g., if the wireless device receives a message (re-)configuring at least one of configuration parameters of the beam failure detection and recovery procedures.

In example embodiment(s), the wireless device may receive, from a base station, a message configuring a beam failure indication (BFI) counter for a beam failure detection and/or recovery procedures for a cell in the Non-RRC_CONNECTED state. The wireless device may set a value of the BFI counter to an initial value (e.g., zero) for the beam failure detection and/or recovery procedures. For example, the wireless device may set a value of the BFI counter to an initial value (e.g., zero), e.g., when the wireless device receives the message comprising configuration parameters, e.g., a counter threshold value of the BFI counter (e.g., a beam failure instance max-count) and/or a value of the timer. The wireless device may (re-)start a beam failure detection timer, e.g., if a beam failure instance indication is triggered (e.g., has been received from lower layers). The wireless device may increment the BFI counter by one (e.g., example of the BFI counter in specification is up-counter). The value of the BFI counter may be larger than or equal to a threshold value (e.g., a beam failure instance max-count). The wireless device may trigger and/or perform a beam failure recovery procedure, e.g., if the value of the BFI counter may be larger than or equal to the threshold value. The wireless device may (re-)set the value of the BFI counter to an initial value (e.g., zero). For example, the wireless device may (re-)set the value of the BFI counter to an initial value (e.g., zero) if the beam failure detection timer expires. For example, the wireless device may (re-)set the value of the BFI counter to an initial value (e.g., zero) if beam failure detection timer, beam failure instance max-count, and/or any of the reference signals used for beam failure detection are reconfigured by upper layers. For example, the wireless device may (re-)set the value of the BFI counter to an initial value (e.g., zero) and/or may stop the beam failure recovery timer (e.g., if configured) if the wireless device receives a response of a beam failure recovery information (e.g., indication of a beam failure and/or identifier(s) of candidate beam(s)) transmitted based on a beam failure recovery procedure.

A wireless device may perform a beam failure recovery procedure for a cell, e.g., after or in response to a determination of a beam failure detection on the cell. The wireless device may switch, based on a beam failure recovery procedure, at least one beam (e.g., at least one DL RS of the cell) configured for transmission and/or reception to another beam(s) (e.g., another DL RSs of the cell). After or in response to the beam failure recovery procedure, the wireless device may perform the transmission and/or reception configured with the another beam(s) (e.g., the another DL RSs). The beam failure recovery procedure may comprise at least one of followings: transmitting (e.g., to a base station) one or more beam failure recovery request messages indicating a beam failure on the cell, identifier(s) of failed beam(s) (e.g., DL RS(s)) of the cell, and/or one or more candidate beams (e.g., candidate DL RSs) of the cell. The wireless device may receive one or more messages as response(s) to the one or more beam failure recovery request messages. For example, the one or more messages may indicate a reception of the one or more beam failure recovery request messages (e.g., an identifier of a contention resolution ID and/or an identifier of a preamble that the wireless device transmits), an uplink grant, and/or configuration parameters (e.g., reconfigured based on the one or more beam failure recovery request messages) of one or more beams for transmission and/or reception. The wireless device may determine that the beam failure recovery procedure successfully completes, e.g., after or in response to receiving the one or more messages.

In example embodiment(s), a wireless device may trigger and/or perform beam failure detection and/or procedures in a Non-RRC_CONNECTED state. Unless specified, the wireless device may trigger and/or perform the beam failure detection and/or procedures for a cell where one or more radio resources for transmission and/or reception in the Non-RRC_CONNECTED state.

A wireless device may determine a beam failure by counting a number of beam failure instance indications. For example, while a beam failure detection timer is running, a beam failure recovery procedure may be triggered if a number of beam failure instance indications that the wireless device counts is larger than or equals to a threshold value (e.g., a beam failure instance max-count).

In existing technologies, the wireless device may perform the beam failure detection and/or recovery procedures in an RRC_CONNECTED state. In the RRC_CONNECTED state, a trigger of the beam failure recovery procedure may be independent of uplink transmission. For example, the wireless device may trigger the beam failure recovery procedure in the RRC_CONNECTED state regardless of whether the uplink transmission is scheduled and/or whether there is at least one uplink grant received (and/or configured) for the uplink transmission. For example, the trigger of the beam failure recovery procedure may be based on PDCCH monitoring and/or based on monitoring radio link monitoring RS (and/or beam failure detection resource, e.g., DL RS(s)). For example, scheduling the PDCCH monitoring and/or monitoring the radio link monitoring RS may be configured by a message (e.g., RRC message) received by the wireless device. For example, scheduling the PDCCH monitoring and/or monitoring the beam failure detection DL RS(s) may be configured (by the message) independently of the uplink transmission. For example, the wireless device may monitor the PDCCH and/or the beam failure detection DL RS(s) on a regular basis (e.g., with a time interval, a periodicity, and/or configuration parameter scheduling the PDCCH monitoring) in an RRC_CONNECTED state. For example, in the RRC_CONNECTED state, a continuous PDCCH monitoring (e.g., with a time interval) may be required since uplink and/or downlink transmissions may occur in relatively short period of time (e.g., several milliseconds and/or seconds). If it is expected to schedule no uplink and/or downlink transmissions for a while (e.g., longer than several milliseconds and/or seconds), the wireless device may transition its RRC state from the RRC_CONNECTED state to a Non-RRC_CONNECTED state after or in response to receiving an RRC release message from a base station.

PDCCH monitoring may require high battery power consumption for the wireless device. In a Non-RRC_CONNECTED state, the wireless device may not monitor the PDCCH on a regular basis. For example, the wireless device may monitor the PDCCH, e.g., after or in response to performing uplink transmission via one or more radio resource. For example, the wireless device may monitor the PDCCH to receive a response of the uplink transmission.

A problem arises when the wireless device triggers a beam failure recovery procedure based on continuous PDCCH monitoring in a Non-RRC_CONNECTED state. In a Non-RRC_CONNECTED state, the beam failure detection and/or recovery procedures for a cell based on continuous PDCCH monitoring may be inefficient. For example, a wireless device may receive one or more grant(s) for transmission and/or reception (e.g., in the Non-RRC_CONNECTED state) via one or more radio resources of the cell. A time interval and/or a periodicity of two radio resources of the one or more radio resources may be long compared with that in an RRC_CONNECTED state. For example, the time interval and/or the periodicity may be in the scale of minutes, hours, and/or days. It may not be guaranteed that a candidate beam determined based on the triggered beam failure recovery procedure will not fail before a next/subsequent transmission. A failed beam that triggers the beam failure recovery procedure may resolve and transition back to normal/non-failed (e.g., its RSRP value is larger than a threshold value), e.g., before a next/subsequent transmission. An early trigger of the beam recovery procedure may result in unnecessary battery power consumption to the wireless device. For example, because the status of the beam (either failed or normal/non-failed) may be incorrect at the time of the next transmission, the wireless device may encounter and need to resolve beam errors—which increases delay and results in higher power consumption and processing. Thus, there is a need to enhance a mechanism to trigger the beam failure recovery procedure more efficiently in the Non-RRC_CONNECTED state.

Figure 25:
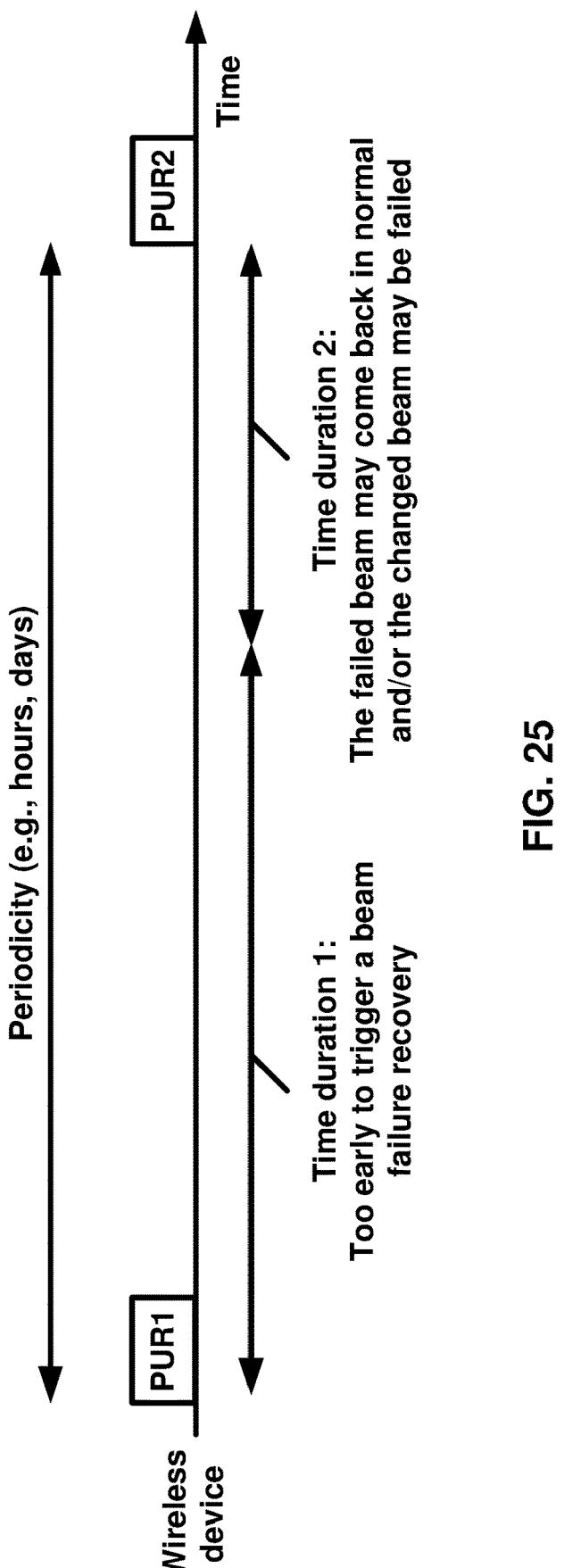
FIG. 25 illustrates an example of an early trigger of a beam failure recovery procedure in a Non-RRC_CONNECTED state, according to some embodiments.

FIG. 25 is an example of an early trigger of a beam failure recovery procedure in an Non-RRC_CONNECTED state as per an aspect of an embodiment of the present disclosure. A wireless device may receive, from a base station, an RRC message indicating one or more PURs, of a cell, comprising PUR1 and PUR2 in FIG. 25. The one or more PURs may be periodic radio resources with a periodicity configured by the RRC message. A time interval (e.g., the periodicity) between two PURs of the one or more PURs may be minute(s), hour(s), and/or day(s). For example, during the time interval in the Non-RRC_CONNECTED state, channel condition(s) of the cell between the wireless device and a base station change a plurality times, e.g., because of a location change of the wireless device, special events, vehicle traffic, and/or the like. In existing technologies, the wireless device may monitor the PDCCH of the cell and/or radio link monitoring RS of the cell that may be independent of the one or more PURs. The wireless device may determine a trigger of a beam failure recovery procedure for the cell. If the wireless device triggers the beam failure recovery procedure too early, e.g., during time duration 1 in FIG. 25, one or more decisions (e.g., a beam failure on a beam and/or a candidate beam) made by the wireless device (and/or the base station) may not for a next (or subsequent) grant and/or radio resource. For example, in FIG. 25, it may be inefficient to make an action and/or decision for Time duration 2 based on the one or more decisions that the wireless device makes during Time duration 1. For example, a beam failure determined during Time duration 1 may be back in normal during Time duration 2. In this case, switching beam based on the beam failure during Time duration 1 may be unnecessary and/or requires unnecessary battery power consumption of the wireless device. For example, a candidate beam determined based on the beam failure recovery procedure during Time duration 1 may be failed during Time duration 2, e.g., before PUR2. This may result in degrading performance of the uplink transmission via PUR2.

In example embodiment(s) in this specification, a wireless device may determine to trigger and/or perform a beam failure recovery procedure for a cell based on resource allocation of one or more radio resources used for transmission to and/or reception from the cell in a Non-RRC_CONNECTED state. For example, the wireless device may not trigger and/or may not perform the beam failure recovery procedure, e.g., until at least one of the one or more radio resource is within a time range. For example, the wireless device may trigger and/or may perform the beam failure recovery procedure, e.g., if at least one of the one or more radio resource is within the time range.

A broadcast and/or multicast message (e.g., system information) may not comprise (e.g., indicate) configuration parameters dedicated to the wireless device. The broadcast and/or multicast message (e.g., system information) may configure (e.g., provide) scheduling information of radio resources shared with a plurality of wireless devices. The broadcast and/or multicast message (e.g., system information) may not (e.g., may not be proper to) configure (e.g., provide) scheduling information of radio resources dedicated to the wireless device.

An RRC reconfiguration message may be a message that a wireless device receives in an RRC_CONNECTED state.

The RRC reconfiguration message may comprise configuration parameters, of SDT, dedicated to the wireless device. The RRC reconfiguration message may not indicate a release of connection from a network (e.g., base station). For example, the RRC reconfiguration message may not indicate a transition from the RRC_CONNECTED state to an Non-RRC_CONNECTED state. The RRC reconfiguration message may not trigger a (RRC) connection release procedure. The wireless device may receive an RRC release message, e.g., after receiving the RRC reconfiguration message. The wireless channel condition between the wireless device and the network (e.g., base station) may change after receiving the RRC reconfiguration message and/or before receiving the RRC release message. For example, it may be too early for the network (e.g., base station) to determine the configuration parameters of the SDT, e.g., if the RRC reconfiguration message comprises the configuration parameters of the SDT. Inaccurate values of the configuration parameters may increase a number of retransmissions and the battery power of the wireless device. Inaccurate values of the configuration parameters may degrade reliability and/or increase latency of the communications between the wireless device and the base station It is beneficial for the wireless device, e.g., if a particular type of a message indicates (and/or comprises) the configuration parameters of the SDT (e.g., configuration parameters of beam failure detection and/or beam failure recovery procedure in an Non-RRC_CONNECTED state, and/or one or more radio resources used in an Non-RRC_CONNECTED state) dedicated to the wireless device and/or a release of the connection form the network (e.g., base station). For example, the particular type of the message may be an RRC release message. The RRC release message may indicate a transition from the RRC_CONNECTED state to an Non-RRC_CONNECTED state, e.g., after or in response to receiving the RRC message. The wireless device may retrieve the configuration parameters of the RRC release message, e.g., when the wireless device initiates the SDT. The wireless device may use the configuration parameters of the SDT for transmission and/or reception of a cell in a Non-RRC_CONNECTED state. For example, the configuration parameters may comprise configuration parameters of beam failure detection and/or beam failure recovery procedure in an Non-RRC_CONNECTED state. The RRC release message may be one of the latest messages (e.g., dedicated to the wireless device) that the wireless device receives before initiating the SDT. For example, the configuration parameters of the RRC release message may be determined (by the base station) based on recent wireless channel conditions between the wireless device and the base station. For example, the configuration parameters determined based on the recent wireless channel conditions may reduce the battery power of the wireless device and/or improve the reliability and latency of the communications between the wireless device and the base station.

In an example implementation, the RRC release message may comprise configuration parameters of the SDT and/or configuration parameters of beam failure detection and/or beam failure recovery procedure in an Non-RRC_CONNECTED state. The configuration parameters may comprise a plurality of configured uplink resources (e.g., uplink grants). The RRC release message may indicate that each configured uplink resource, of the plurality of configured uplink resources, may be associated with a downlink reference signal (DL RS) of a plurality of DL RSs. The DL RS may be a synchronization signal block (SSB). The RRC release message may configure and/or use an index (or identifier) of the DL RS to indicate the DL RS. The RRC release message may configure and/or use an index (or identifier) of a configured uplink resource of the plurality of configured uplink resources to indicate the configured uplink. For example, the RRC release message may comprise an index (or identifier) of the DL RS (e.g., SSB), a time and frequency resource configuration of the configured uplink resource used for the SDT in Non-RRC_CONNECTED state, and/or the mapping indication (or association) between the DL RS and the configured uplink resource.

In the claimed invention, even if the RRC release message configures uplink resource for a DL RS, the wireless device measures the DL RS and/or validates the resource by measuring the DL RS. The wireless device may use the measured DL RS for the beam failure detection and/or beam failure recovery procedure in an Non-RRC_CONNECTED state. In an example embodiments, the RRC release message comprises configuration parameters of beam failure detection and/or beam failure recovery procedure in an Non-RRC_CONNECTED state, configuration parameters of one or more DL RSs (e.g., SSBs), one or more configured uplink resources for the SDT in the Non-RRC_CONNECTED state, and/or mapping indication (or association) between one of the one or more configured uplink resources and one of the one or more DL RSs.

The wireless device may receive, e.g., in a radio resource control (RRC) connected state, an RRC release message comprising configuration parameters for the SDT, the configuration parameters comprising: identifier of a first SSB among a plurality of SSBs of a cell and/or one or more resource parameters of a configured uplink resource, corresponding to the first SSB, for use in the Non-RRC_CONNECTED state. In an example, configurations in the RRC_CONNECTED state using RRC reconfiguration messages for configured grant uplink resources in the RRC_CONNECTED state may not be valid and/or may not be usable by the wireless device in the Non-RRC_CONNECTED state. Using the RRC release message instead of other message(s) (e.g., RRC reconfiguration message, broadcast message, multicast message, and/or system information) provides additional benefits, because the RRC release message is one of the latest messages received (by a wireless device and from a base station) before initiating the SDT in the Non-RRC_CONNECTED state. A base station may transmit configuration parameters of the first SSB and the uplink resources in the RRC release message to configure resources for the SDT and transition the wireless device to the Non-RRC_CONNECTED state.

Figure 26:
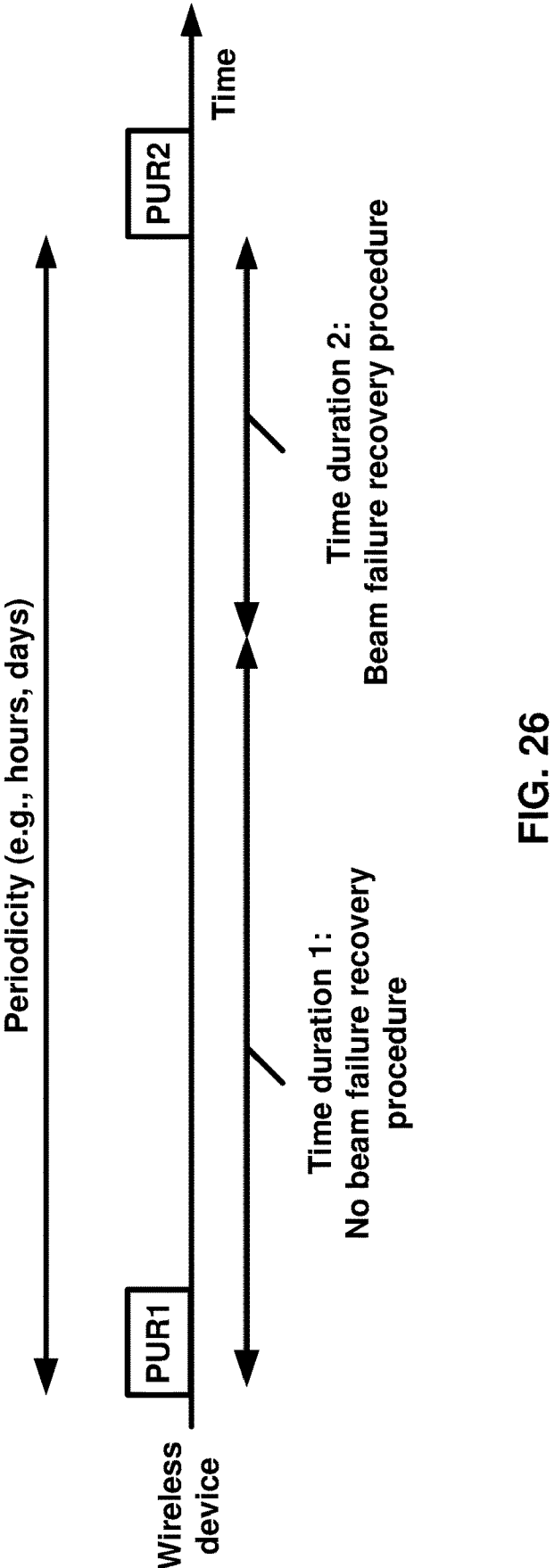
FIG. 26 illustrates an example of a trigger of a beam failure recovery procedure in a Non-RRC_CONNECTED state, according to some embodiments.

FIG. 26 is an example of a trigger of a beam failure recovery procedure in an Non-RRC_CONNECTED state as per an aspect of an embodiment of the present disclosure. A wireless device may receive, from a base station, an RRC message indicating one or more PURs, of a cell, comprising PUR1 and PUR2 in FIG. 26. The one or more PURs of the cell may be periodic radio resources with a periodicity configured by the RRC message. A time interval (e.g., the periodicity) between two PURs of the one or more PURs may be minute(s), hour(s) and/or day(s). For example, during the time interval in the Non-RRC_CONNECTED state, channel condition(s) between the wireless device and a base station change a plurality times, e.g., because of a location change of the wireless device, special events, vehicle traffic, and/or the like. The RRC message may indicate one or more time range/duration. For example, in FIG. 26, the RRC message may indicate time values of Time duration 1 and/or Time duration 2. For example, the wireless device may not trigger and/or perform a beam failure recovery procedure during Time duration 1. For example, the wireless device may trigger and/or perform a beam failure recovery procedure during Time duration 2. A determination of triggering the beam failure recovery procedure based on the resource allocation of one or more radio resources used for transmission and/or reception in a Non-RRC_CONNECTED state may reduce battery power consumption and/or avoid unnecessary beam switching.

In example embodiment(s), a time duration that a wireless device may trigger and/or perform a beam failure recovery procedure may be determined based on a timer value of a timer. For example, the timer may be defined as a beam failure recovery prohibit timer (or window). The beam failure recovery prohibit timer may be referred to as a configured grant timer, PUR timer, and/or the like. For example, the timer value of the beam failure recovery prohibit timer may indicate a time duration of Time duration 1 in FIG. 26. For example, the wireless device may not trigger and/or perform the beam failure recovery procedure while the beam failure recovery prohibit timer is running. For example, the wireless device may start the beam failure recovery prohibit timer (or window), e.g., after or in response to a first radio resources of one or more radio resources used for transmission and/or reception in a Non-RRC_CONNECTED state. For example, the wireless device may start the beam failure recovery prohibit timer (or window), e.g., after or in response to a transmission via the first radio resources. For example, the beam failure recovery prohibit timer may starts based on CORESET that the wireless device is configured to receive PDCCH. For example, the beam failure recovery prohibit timer may starts at a particular symbol (e.g., a first symbol) of a particular (e.g., the earliest) CORESET that the wireless device is configured to receive PDCCH for a particular search space set (e.g., a particular type of PDCCH common search space (CSS) and/or wireless device search space sets), that may be at least one symbol, after a particular symbol (e.g., the last symbol) of the first radio resource.

In example embodiment(s), a wireless device may not monitor radio link monitoring RSs and/or beam failure detection resources (or DL RSs) while the beam failure recovery prohibit timer is running. For example, the wireless device may not generate one or more beam failure instance indications while the beam failure recovery prohibit timer is running. For example, the wireless device may not trigger and/or perform a beam recovery procedure while the beam failure recovery prohibit timer is running. The wireless device may start to monitor the radio link monitoring RSs and/or the beam failure detection resources (or DL RSs) after or in response to an expiry of the beam failure recovery prohibit timer. For example, the wireless device may start to generate one or more beam failure instance indications, e.g., after or in response to an expiry of the beam failure recovery prohibit timer. For example, the wireless device may trigger and/or perform a beam recovery procedure after or in response to an expiry of the beam failure recovery prohibit timer. The wireless device may stop to monitor the radio link monitoring RSs and/or the beam failure detection resources (or DL RSs), e.g., after or in response to (re-)starting the beam failure recovery prohibit timer. For example, the wireless device may stop to generate one or more beam failure instance indications, e.g., after or in response to (re-)starting the beam failure recovery prohibit timer.

Figure 27A:
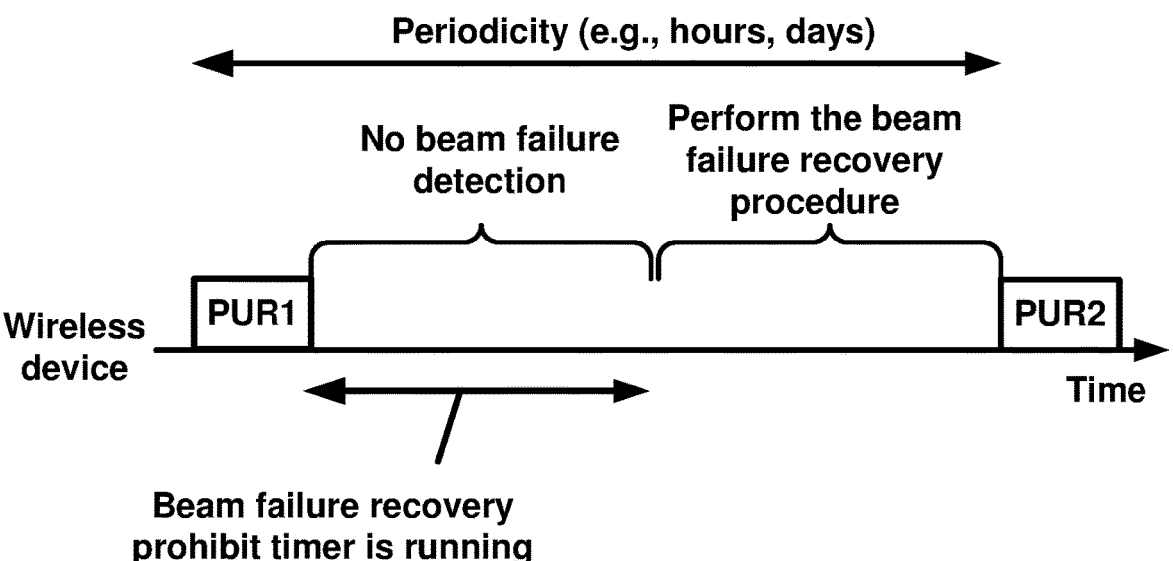
FIG. 27A illustrates an example of a beam failure detection and/or recovery procedures in a Non-RRC_CONNECTED state, according to some embodiments.

FIG. 27A is an example of a beam failure detection and/or recovery procedures in a Non-RRC_CONNECTED state as per an aspect of an embodiment of the present disclosure. A wireless device may receive an RRC message from a base station. The RRC message may configure and/or indicate one or more radio resources used for transmission and/or reception in the Non-RRC_CONNECTED state. The one or more radio resources may comprise PUR1 and PUR2 with a periodicity as shown in FIG. 27A. The wireless device may start a beam failure recovery prohibit timer in response to PUR1 as disclosed example embodiment(s) in this specification. The wireless device may not perform a beam failure detection and/or recovery procedure while the beam failure recovery prohibit timer is running. The wireless device may start to trigger and/or perform the beam failure detection and/or recovery procedures after or in response to an expiry of the beam failure recovery prohibit timer.

In example embodiment(s), a wireless device may trigger a beam recovery procedure while the beam failure recovery prohibit timer is running. The wireless device may perform a beam failure detection procedure while the beam failure recovery prohibit timer is running. For example, the wireless device may perform the beam failure detection procedure regardless of whether the beam failure recovery prohibit timer is running. For example, the wireless device may monitor radio link monitoring RSs and/or beam failure detection resources (or DL RSs) for the beam failure detection procedure, e.g., while the beam failure recovery prohibit timer is running. For example, the wireless device may generate one or more beam failure instance indications, e.g., while the beam failure recovery prohibit timer is running. The wireless device may determine a beam failure based on example(s) of a beam failure detection procedure in this specification. For example, the wireless device may determine the beam failure based on a counter value of a BFI counter as disclosed in example embodiment(s) of this specification. The wireless device may reset (e.g., set to an initial value) the BFI counter based on a beam failure detection timer. The wireless device may reset the beam failure detection timer based on the counter value of the BFI counter as disclosed in example embodiment(s) of this specification. The wireless device may determine a trigger of a beam failure recovery procedure after or in response to the determined beam failure. The wireless device may determine the triggered beam failure recovery procedure as pending. For example, the wireless device may determine the triggered beam failure recovery procedure as pending until it is canceled and/or the wireless device determines that the triggered beam failure recovery procedure successfully completes. The wireless device may not perform the triggered and/or pending beam failure recovery procedure while the beam failure recovery prohibit timer is running. The wireless device may start to perform the triggered and/or pending beam failure recovery procedure after or in response to an expiry of the beam failure recovery prohibit timer.

Figure 27B:
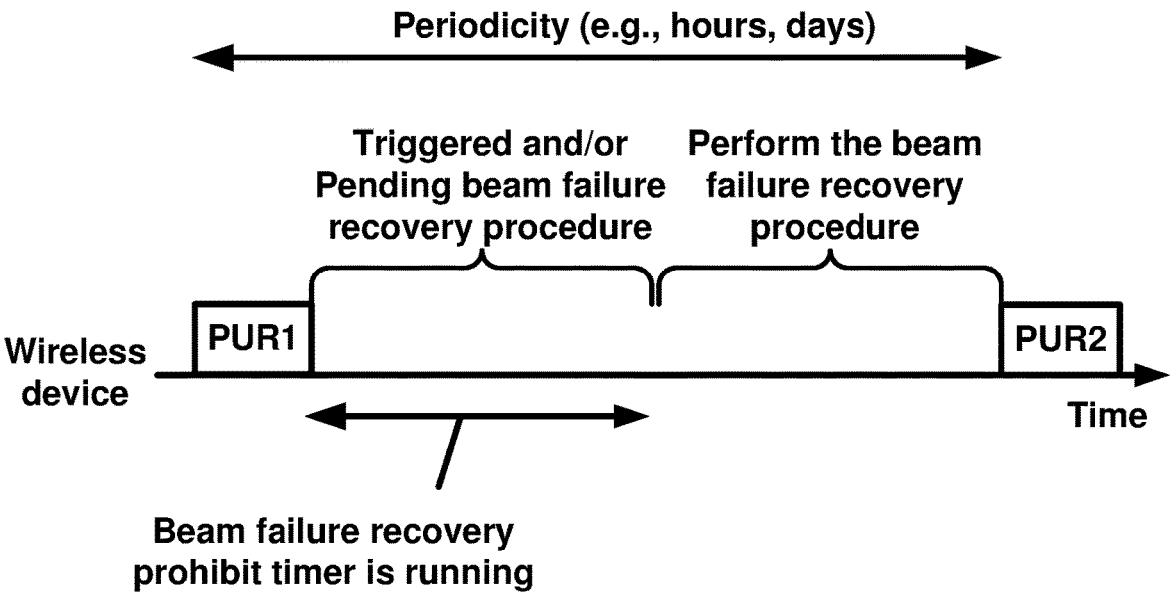
FIG. 27B illustrates an example of a beam failure detection and/or recovery procedures in a Non-RRC_CONNECTED state, according to some embodiments.

FIG. 27B is an example of a beam failure detection and/or recovery procedures in an Non-RRC_CONNECTED state as per an aspect of an embodiment of the present disclosure. A wireless device may receive an RRC message from a base station. The RRC message may configure and/or indicate one or more radio resources used for transmission and/or reception in the Non-RRC_CONNECTED state. The one or more radio resources may comprise PUR1 and PUR2 with a periodicity as shown in FIG. 27B. The wireless device may start a beam failure recovery prohibit timer in response to PUR1 as disclosed example embodiment(s) in this specification. The wireless device may perform a beam failure detection procedure while the beam failure recovery prohibit timer is running. The wireless device may determine a beam failure based on the beam failure detection procedure. The wireless device may determine a trigger of a beam failure recovery procedure in response to the determined beam failure. The wireless device may determine the triggered beam failure recovery procedure as pending, e.g., if the beam failure recovery prohibit timer is running. The wireless device may determine the triggered beam failure recovery procedure as pending, e.g., if the beam failure recovery prohibit timer is running. The wireless device may perform the triggered (and/or pending) beam failure recovery procedure after or in response to an expiry of the beam failure recovery prohibit timer.

In example embodiment(s), a time duration that a wireless device may trigger and/or perform a beam failure recovery procedure may be determined based on a timer value of a timer. For example, the timer may be defined as a beam failure recovery enable timer (or window). The beam failure recovery enable timer may be referred to as a configured grant timer, PUR timer, and/or the like. For example, the timer value of the beam failure recovery enable timer may indicate a time duration of Time duration 2 in FIG. 26. For example, the wireless device may not trigger and/or perform the beam failure recovery procedure, e.g., if the beam failure recovery enable timer is not running and/or does not start. For example, the wireless device may trigger and/or perform the beam failure recovery procedure while the beam failure recovery enable timer is running. For example, the wireless device may start the beam failure recovery enable timer (or window), e.g., after or in response to a first radio resources of one or more radio resources used for transmission and/or reception in a Non-RRC_CONNECTED state with a time offset. For example, the time offset may comprise a timer value of the beam failure recovery prohibit timer. For example, the timer offset may be semi-statically configured. For example, the time offset may start after or in response to a transmission via the first radio resources. For example, the time offset start after or in response to an expiry of the beam failure recovery prohibit timer. For example, the beam failure recovery enable timer may starts based on CORESET that the wireless device is configured to receive PDCCH. For example, the beam failure recovery enable timer may starts at a particular symbol (e.g., a first symbol) of a particular (e.g., the earliest) CORESET that the wireless device is configured to receive PDCCH for a particular search space set (e.g., a particular type of PDCCH common search space (CSS) and/or wireless device search space sets), that may be at least one symbol, after a particular symbol (e.g., the last symbol) of the first radio resource. For example, the beam failure recovery enable timer may starts at a particular symbol (e.g., a first symbol) of a particular (e.g., the earliest) CORESET that the wireless device is configured to receive PDCCH for a particular search space set (e.g., a particular type of PDCCH common search space (CSS) and/or wireless device search space sets), that may be at least one symbol, after the time offset.

In example embodiment(s), the beam failure recovery enable timer may starts before (prior to) a first radio resource of one or more radio resources used for transmission and/or reception in a Non-RRC_CONNECTED state. For example, the wireless device may determine the first radio resource starting from a particular symbol of a slot in a SFN. The wireless device may start the beam failure recovery enable timer before the particular symbol. For example, a timer value of the beam failure recovery enable timer is X symbol(s) and/or corresponding to X symbol(s). The wireless device may start the beam failure recovery enable timer at least X symbol(s) before the particular symbol.

In example embodiment(s), a wireless device may not monitor radio link monitoring RSs and/or beam failure detection resources (or DL RSs) while the beam failure recovery enable timer does not run (or start). For example, the wireless device may not generate one or more beam failure instance indications while the beam failure recovery enable timer does not run (or start). For example, the wireless device may trigger and/or perform a beam recovery procedure while the beam failure recovery enable timer is running. The wireless device may start to monitor the radio link monitoring RSs and/or the beam failure detection resources (or DL RSs) after or in response to starting the beam failure recovery enable timer. For example, the wireless device may start to generate one or more beam failure instance indications, e.g., after or in response to starting the beam failure recovery enable timer. For example, the wireless device may trigger and/or perform a beam recovery procedure after or in response to starting the beam failure recovery enable timer. The wireless device may stop to monitor the radio link monitoring RSs and/or the beam failure detection resources (or DL RSs), e.g., after or in response to an expiry of the beam failure recovery enable timer. For example, the wireless device may stop to generate one or more beam failure instance indications, e.g., after or in response to an expiry of the beam failure recovery enable timer.

Figure 28A:
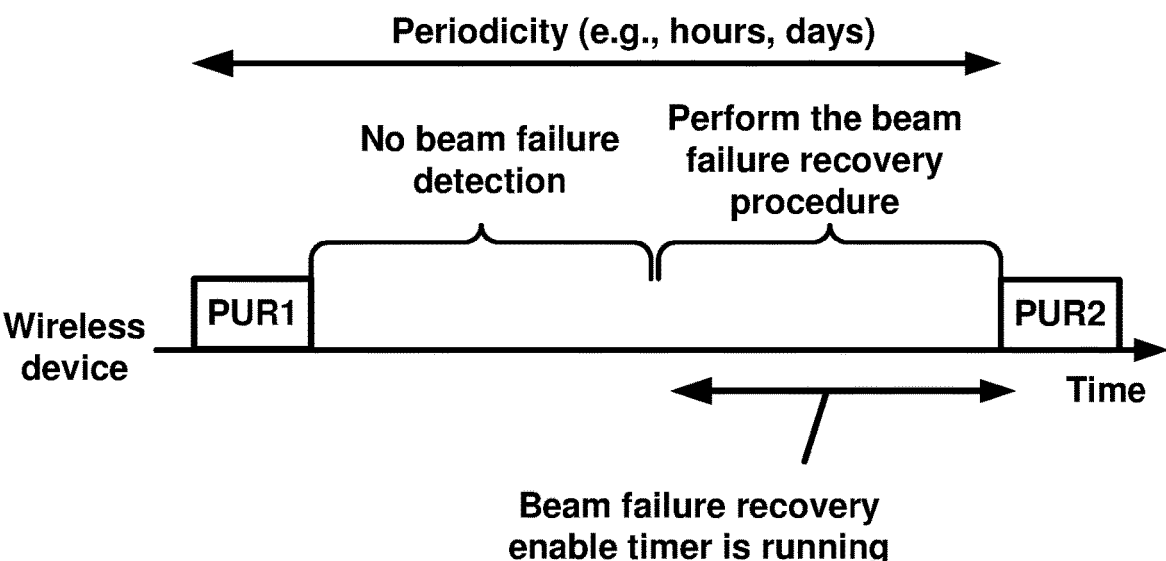
FIG. 28A illustrates an example of a beam failure detection and/or recovery procedures in a Non-RRC_CONNECTED state, according to some embodiments.

FIG. 28A is an example of a beam failure detection and/or recovery procedures in a Non-RRC_CONNECTED state as per an aspect of an embodiment of the present disclosure. A wireless device may receive an RRC message from a base station. The RRC message may configure and/or indicate one or more radio resources used for transmission and/or reception in the Non-RRC_CONNECTED state. The one or more radio resources may comprise PUR1 and PUR2 with a periodicity as shown in FIG. 28A. The wireless device may start a beam failure recovery enable timer after or in response to PUR1 and/or before PUR2 as disclosed example embodiment(s) in this specification. The wireless device may not perform a beam failure detection and/or recovery procedure, e.g., if the beam failure recovery enable timer does not run (or start). The wireless device may start to trigger and/or perform the beam failure detection and/or recovery procedures after or in response to starting the beam failure recovery enable timer.

In example embodiment(s), a wireless device may trigger a beam recovery procedure while the beam failure recovery enable timer does not run. The wireless device may perform a beam failure detection procedure while the beam failure recovery enable timer does not run. For example, the wireless device may perform the beam failure detection procedure regardless of whether the beam failure recovery enable timer is running. For example, the wireless device may monitor radio link monitoring RSs and/or beam failure detection resources (or DL RSs) for the beam failure detection procedure, e.g., while the beam failure recovery enable timer does not run. For example, the wireless device may generate one or more beam failure instance indications, e.g., while the beam failure recovery enable timer does not run. The wireless device may determine a beam failure based on example(s) of a beam failure detection procedure in this specification. For example, the wireless device may determine the beam failure based on a counter value of a BFI counter as disclosed in example embodiment(s) of this specification. The wireless device may reset (e.g., set to an initial value) the BFI counter based on a beam failure detection timer. The wireless device may reset the beam failure detection timer based on the counter value of the BFI counter as disclosed in example embodiment(s) of this specification. The wireless device may determine a trigger of a beam failure recovery procedure after or in response to the determined beam failure. The wireless device may determine the triggered beam failure recovery procedure as pending. For example, the wireless device may determine the triggered beam failure recovery procedure as pending until it is canceled and/or the wireless device determines that the triggered beam failure recovery procedure successfully completes. The wireless device may not perform the triggered and/or pending beam failure recovery procedure, e.g., if the beam failure recovery enable timer does not run (and/or start). The wireless device may start to perform the triggered and/or pending beam failure recovery procedure after or in response to starting the beam failure recovery enable timer.

Figure 28B:
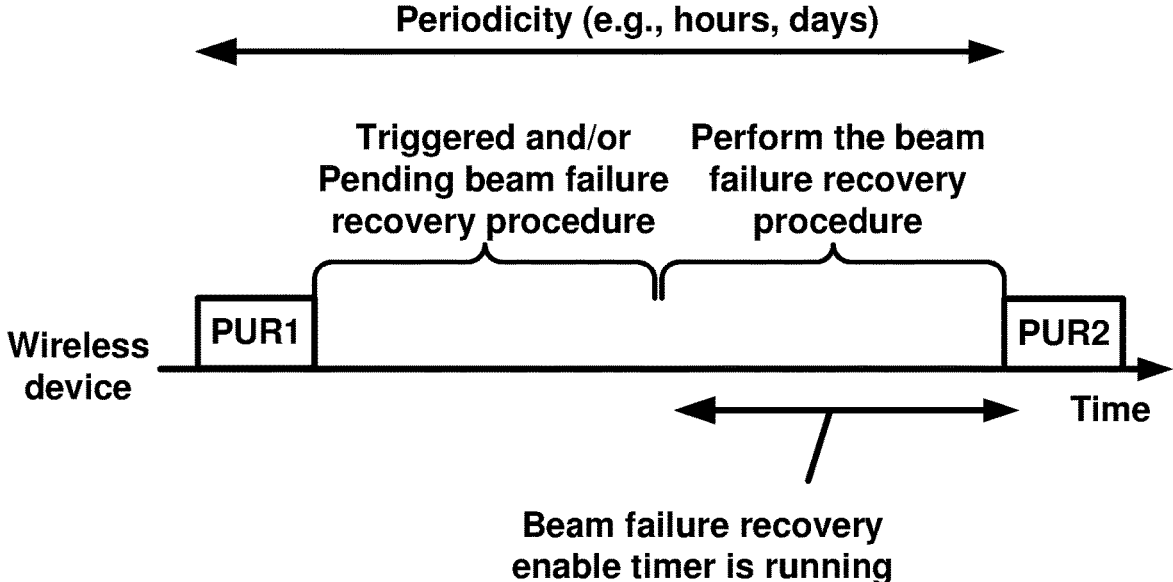
FIG. 28B illustrates an example of a beam failure detection and/or recovery procedures in a Non-RRC_CONNECTED state, according to some embodiments.

FIG. 28B is an example of a beam failure detection and/or recovery procedures in an Non-RRC_CONNECTED state as per an aspect of an embodiment of the present disclosure. A wireless device may receive an RRC message from a base station. The RRC message may configure and/or indicate one or more radio resources used for transmission and/or reception in the Non-RRC_CONNECTED state. The one or more radio resources may comprise PUR1 and PUR2 with a periodicity as shown in FIG. 28B. The wireless device may start a beam failure recovery enable timer after or in response to PUR1 (or before PUR2) as disclosed example embodiment(s) in this specification. The wireless device may perform a beam failure detection procedure while the beam failure recovery enable timer does not run. The wireless device may determine a beam failure based on the beam failure detection procedure. The wireless device may determine a trigger of a beam failure recovery procedure in response to the determined beam failure. The wireless device may determine the triggered beam failure recovery procedure as pending, e.g., while the beam failure recovery enable timer does not run. The wireless device may determine the triggered beam failure recovery procedure as pending, e.g., if the beam failure recovery enable timer does not run. The wireless device may perform the triggered (and/or pending) beam failure recovery procedure after or in response to starting the beam failure recovery enable timer.

In example embodiment(s), a wireless device may receive an RRC message (e.g., RRC release message) indicating timer values of a beam failure recovery prohibit timer and/or a beam failure recovery enable timer. At least one of the timer values may be defined as absolute time value in terms of millisecond(s), second(s), minute(s), hour(s), day(s), and/or any combination thereof. At least one of the timer values may be defined in terms of TTIs, a number of symbols, a number of slots, a number of subframes, a number of SFNs, a number of H-SFNs, and/or any combination thereof.

In example embodiment(s), a wireless device may receive an message (e.g., RRC release message) indicating timer values of a beam failure recovery prohibit timer and/or a beam failure recovery enable timer. At least one value of the timer values may be defined based on a periodicity of one or more radio resources used for transmission and/or reception in a Non-RRC_CONNECTED state. For example, the message may indicate the value of the periodicity. For example, the at least one value may be smaller than and/or equal to a value of the periodicity. The wireless device may not expect that the message indicates the at least one value larger than the value of the periodicity. For example, it may be guaranteed that the wireless device receives the message indicating the at least one value smaller than and/or being equal to the value of the periodicity.

In example embodiment(s), the at least one value may be a function of the periodicity of the one or more radio resources. For example, the at least one value may be defined as multiple(s) of the value of the periodicity. For example, the at least one value $\{1, 2, 3, \ldots\}$ (or any value format indicating 1, 2, 3) may indicate that the at least one value is the same as, twice larger than, three times larger than the value of the periodicity, respectively. For example, the at least one value may be a fraction of the value of the periodicity. For example, the at least one value $\{1, 0.5, 0.25, \ldots\}$ (or any value format indicating 1, 0.5, 0.25) may indicate that the at least one value is the same as, a half of, a quarter of the value of the periodicity, respectively.

In example embodiment(s), a wireless device may transmit one or more messages and/or signals (e.g. preamble) during a beam failure recovery procedure. The one or more messages and/or signals may comprise an identifier (e.g., C-RNTI, PUR-RNTI, and/or S-TMSI) of the wireless device, an indication of a beam failure, one or more identifiers (e.g., comprising identifier(s) of SSB, CSI-RS, TCI state, and/or spatial information relation) of candidate beams. For example, the wireless device may transmit the one or more messages and/or signals via a random access procedure. For example, the wireless device may transmit the one or more messages and/or signals via PUCCH. The wireless device may cancel one or more pending and/or triggered beam failure recovery procedures, after or in response to transmitting the one or more messages and/or signals (e.g. preamble). The wireless device may receive one or more responses to the one or more messages and/or signals (e.g. preamble). The wireless device may determine, based on the one or more responses, that the beam failure recovery procedure successfully completes. The wireless device may cancel one or more pending and/or triggered beam failure recovery procedures, after or in response to a determination that the beam failure recovery procedure successfully completes.

In example embodiment(s), a wireless device may receive a message comprising configuration parameters of one or more preconfigured uplink resource (PURs) of a cell. The one or more PURs may comprise a first PUR. The wireless device may determine, during a time window starting based on the first PUR, a trigger of a beam failure recovery request. the wireless device may transmit, to the cell, the beam failure recovery request. The transmission of the beam failure recovery request may be based on the trigger being as pending and/or an expiry of the time window.

For example, the wireless device may transmit a transport block (TB) via the first PUR. For example, the time window may start in response to transmitting the transport block via the first PUR. For example, a value of the time window may be smaller than a value of a periodicity of the one or more first PURs. For example, the wireless device may determine the trigger being as pending in response to the determination of the trigger. For example, the determination of the trigger may be based on a measurement quantity value of a downlink reference signal. For example, the measurement quantity value may be a block error rate (BLER), a reference signal received power (RSRP), and/or a reference signal received quality (RSRQ). For example, the wireless device may, in response to transmitting the beam failure recovery request, cancelling the trigger. For example, the wireless device may receive a response to the beam failure recovery request. For example, the wireless device may cancel the trigger in response to receiving the response. For example, the wireless device may transmit a second TB via a second PUR of the one or more PURs. For example, the second PUR may be allocated after the first PUR in a time domain. For example, the wireless device may transmit the beam failure recovery request during a second time window starting in response to the expiry of the time window.

In example embodiment(s), a wireless device may receive a message comprising configuration parameters of one or more preconfigured uplink resource (PURs) of a cell, wherein the one or more PURs comprising a first PUR. For example, the wireless device may determine a trigger of a beam failure recovery request. For example, the wireless device may start a time window with a time offset before the first PUR. For example, the wireless device may transmit, to the cell during the time window, the beam failure recovery request in response to the trigger being as pending.

For example, the wireless device may determine the trigger as pending in response to the timer window not running. For example, the wireless device may, in response to transmitting the beam failure recovery request, cancel the trigger. For example, a value of the time window may be smaller than a value of a periodicity of the one or more first PURs. For example, the wireless device may transmit a transport block (TB) via the first PUR. For example, the wireless device may determine the trigger being as pending in response to the determination of the trigger. For example, the wireless device may, in response to transmitting the beam failure recovery request, cancel the trigger. For example, the wireless device may receive a response to the beam failure recovery request. For example, the wireless device may cancel the trigger in response to receiving the response. For example, the starting the time window may be based on an expiry of a second time window starting in response to a second PUR of the one or more PURs. For example, the wireless device may determine the trigger during the second time window.

In example embodiment(s), a wireless device may receive a message comprising configuration parameters of one or more preconfigured uplink resource (PURs) of a cell, wherein the one or more PURs comprising a first PUR. For example, the wireless device may determine one or more beam failure instances after or in response to an expiry of a time window starting based on the first PUR. For example, the wireless device may determine a trigger of transmission of beam failure recovery request based on the one or more beam failure instances. For example, the wireless device may transmit, to the cell, the beam failure recovery request.

In example embodiment(s), a wireless device may receive a message comprising configuration parameters of one or more preconfigured uplink resource (PURs) of a cell, wherein the one or more PURs comprising a first PUR. For example, the wireless device may start a time window with a time offset before the first PUR. For example, the wireless device may determine one or more beam failure instances during the time window. For example, the wireless device may determine trigger of a beam failure recovery request based on the one or more beam failure instances. For example, the wireless device may transmit, to the cell, the beam failure recovery request in response to the trigger.

What is claimed is:

1. A method comprising:
   receiving, by a wireless device in a radio resource control (RRC) connected state, an RRC release message indicating a configured grant for use in an RRC inactive state;
   starting a configured grant timer in response to a data transmission via the configured grant;

measuring, in the RRC inactive state and based on the configured grant timer, a downlink signal for detection of a beam failure instance;
   detecting, in the RRC inactive state and based on the measuring the downlink signal, the beam failure instance while the configured grant timer is running; and
   transmitting, based on the detecting the beam failure instance while the configured grant timer is running, a beam failure recovery request.

2. The method of claim 1, wherein the measuring the downlink signal is based on the configured grant timer running.

3. The method of claim 1, wherein the measuring the downlink signal is based on starting the configured grant timer.

4. The method of claim 1, further comprising transitioning, based on the release message, the wireless device from the RRC connected state to the RRC inactive state.

5. The method of claim 1, wherein a timer value of the configured grant timer is smaller than a value of a periodicity of a plurality of configured grants comprising the configured grant.

6. The method of claim 1, wherein the RRC inactive state comprises an RRC idle state.

7. The method of claim 1, wherein the measuring the downlink signal is based on a measurement quantity value of a downlink reference signal.

8. A wireless device comprising:
   one or more processors; and
   memory storing instructions that, when executed by the one or more processors, cause the wireless device to:
      receive, in a radio resource control (RRC) connected state, an RRC release message indicating a configured grant for use in an RRC inactive state;
      start a configured grant timer in response to a data transmission via the configured grant;
      measure, in the RRC inactive state and based on the configured grant timer, a downlink signal for detection of a beam failure instance;
      detect, in the RRC inactive state and based on the measuring the downlink signal, the beam failure instance while the configured grant timer is running; and
   transmit, based on the detecting the beam failure instance while the configured grant timer is running, a beam failure recovery request.

9. The wireless device of claim 8, wherein measuring the downlink signal is based on the configured grant timer running.

10. The wireless device of claim 8, wherein measuring the downlink signal is based on starting the configured grant timer.

11. The wireless device of claim 8, wherein the instructions further cause the wireless device to transition, based on the release message, the wireless device from the RRC connected state to the RRC inactive state.

12. The wireless device of claim 8, wherein a timer value of the configured grant timer is smaller than a value of a periodicity of a plurality of configured grants comprising the configured grant.

13. The wireless device of claim 8, wherein the RRC inactive state comprises an RRC idle state.

14. A non-transitory computer-readable medium comprising instructions that, when executed by one or more processors of a wireless device, cause the wireless device to:

receive, in a radio resource control (RRC) connected state, an RRC release message indicating a configured grant for use in an RRC inactive state;

start a configured grant timer in response to a data transmission via the configured grant;

measure, in the RRC inactive state and based on the configured grant timer, a downlink signal for detection of a beam failure instance;

detect, in the RRC inactive state and based on the measuring the downlink signal, the beam failure instance while the configured grant timer is running; and transmit, based on the detecting the beam failure instance while the configured grant timer is running, a beam failure recovery request.

15. The non-transitory computer-readable medium of claim 14, wherein measuring the downlink signal is based on the configured grant timer running.

16. The non-transitory computer-readable medium of claim 14, wherein measuring the downlink signal is based on starting the configured grant timer.

17. The non-transitory computer-readable medium of claim 14, wherein the instructions further cause the wireless device to transition, based on the release message, the wireless device from the RRC connected state to the RRC inactive state.

18. The non-transitory computer-readable medium of claim 14, wherein a timer value of the configured grant timer is smaller than a value of a periodicity of a plurality of configured grants comprising the configured grant.

19. The non-transitory computer-readable medium of claim 14, wherein the RRC inactive state comprises an RRC idle state.

20. The non-transitory computer-readable medium of claim 14, wherein measuring the downlink signal is based on a measurement quantity value of a downlink reference signal.

* * * * *